United States Patent [19]
Kikukawa et al.

[11] Patent Number: 5,220,368
[45] Date of Patent: Jun. 15, 1993

[54] DATA RECORDING DEVICE AND A CAMERA THEREFOR

[75] Inventors: Yoshiiku Kikukawa, Kishiwada; Masayuki Nakasa, Sennan; Tadahiro Yoshida, Takatsuki; Mashio Kitaura, Tondabayashi; Masaaki Nakai, Kawachinagano; Takanobu Omaki, Sennan; Nobuyuki Taniguchi, Tondabayashi, all of Japan

[73] Assignee: Minolta Camera Kabushiki Kaisha, Osaka, Japan

[21] Appl. No.: 896,873

[22] Filed: Jun. 10, 1992

Related U.S. Application Data

[60] Continuation of Ser. No. 653,415, Feb. 11, 1991, abandoned, which is a division of Ser. No. 421,619, Oct. 13, 1989, Pat. No. 4,922,820, which is a division of Ser. No. 328,551, Mar. 24, 1989, Pat. No. 4,935,766, which is a continuation of Ser. No. 820,656, Jan. 21, 1986, Pat. No. 4,816,853.

[30] Foreign Application Priority Data

Jan. 21, 1985 [JP] Japan ................... 60-9717
Feb. 13, 1985 [JP] Japan ................... 60-27398

[51] Int. Cl.$^5$ ............................................. G03B 17/24
[52] U.S. Cl. ..................................................... 354/106
[58] Field of Search ............... 354/105, 106, 456–464, 354/266, 21

[56] References Cited

U.S. PATENT DOCUMENTS

| | | | |
|---|---|---|---|
| 3,983,571 | 9/1976 | Russo | 354/105 |
| 4,074,294 | 2/1978 | Fujita et al. | 354/106 |
| 4,085,412 | 4/1978 | Yoshino | 354/106 |
| 4,086,603 | 4/1978 | Kozuki et al. | 354/266 X |
| 4,179,203 | 12/1979 | Hirohata et al. | 354/106 |
| 4,312,581 | 1/1982 | Miyagawa et al. | 354/106 |
| 4,327,979 | 5/1982 | Tominaga et al. | 354/105 |
| 4,368,967 | 1/1983 | Imura | 354/106 |
| 4,449,805 | 5/1984 | Sakurada et al. | 354/105 |
| 4,470,677 | 9/1984 | Tsujimoto et al. | 354/106 |
| 4,588,274 | 5/1986 | Kazumi | 354/105 |
| 4,693,574 | 9/1987 | Ohnuki et al. | 354/21 |
| 4,702,579 | 10/1987 | Ogihara et al. | 354/21 |

FOREIGN PATENT DOCUMENTS

| | | |
|---|---|---|
| 55-28050 | 7/1980 | Japan . |
| 55-111934 | 8/1980 | Japan . |
| 56-130731 | 10/1981 | Japan . |
| 58-43440 | 3/1983 | Japan . |

*Primary Examiner*—W. B. Perkey
*Attorney, Agent, or Firm*—Burns, Doane, Swecker & Mathis

[57] ABSTRACT

A camera system including a camera body and a camera accessory attachable to the camera body, such as an interchangeable back lid, an interchangeable lens, a flash device and so on, is disclosed. In the system, a plurality of circuits provided in plurality of camera accessories are controlled by a microcomputer provided in the camera body. Data transmitted between the microcomputer and the circuits using a serial data bus and synchronizing clock line connected therebetween. The circuit to receive the data sent from the microcomputer, or the circuit which should send the data to the microcomputer are selected by the microcomputer through chip select lines provided between the microcomputer and each circuit.

8 Claims, 47 Drawing Sheets

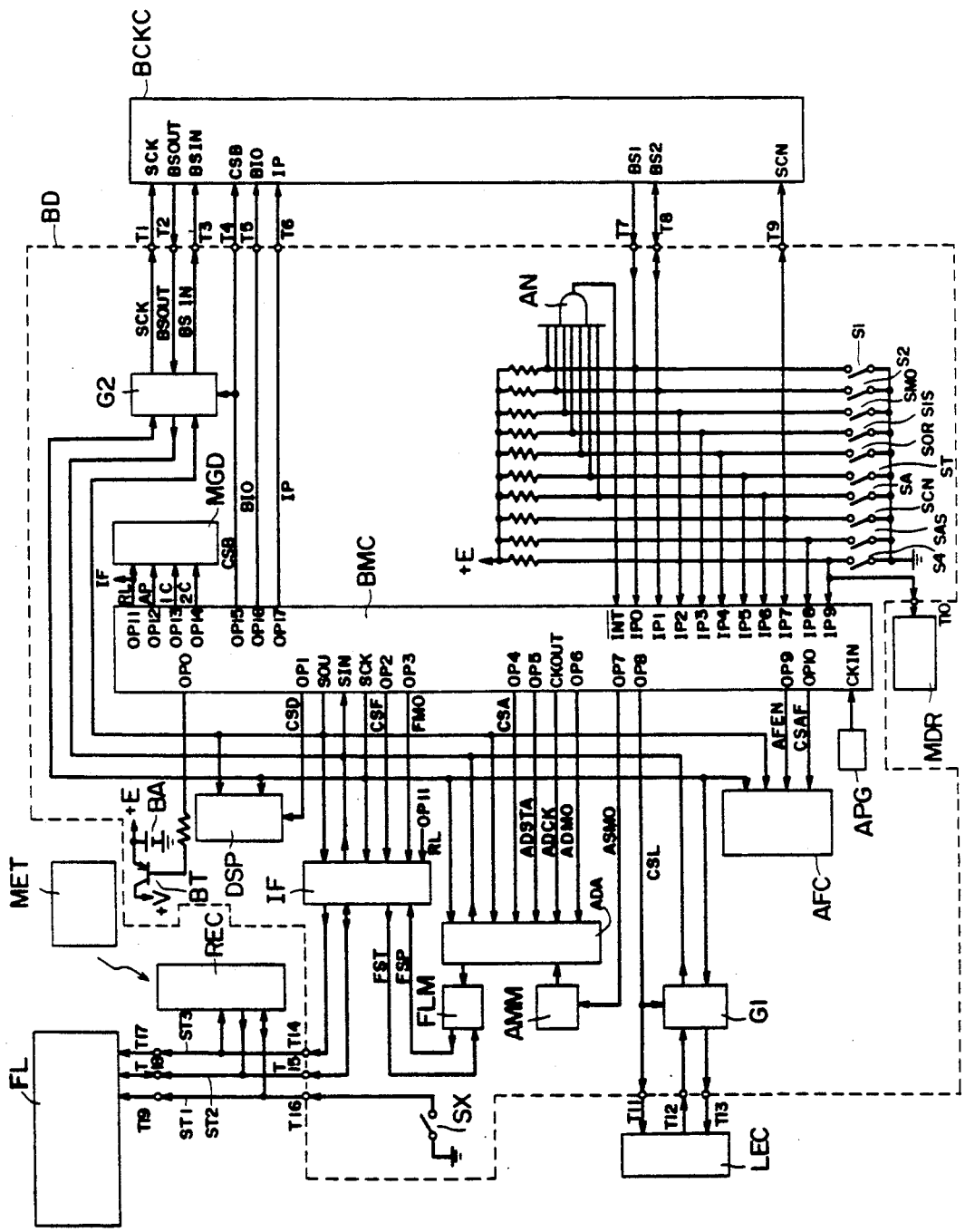
FIG. I

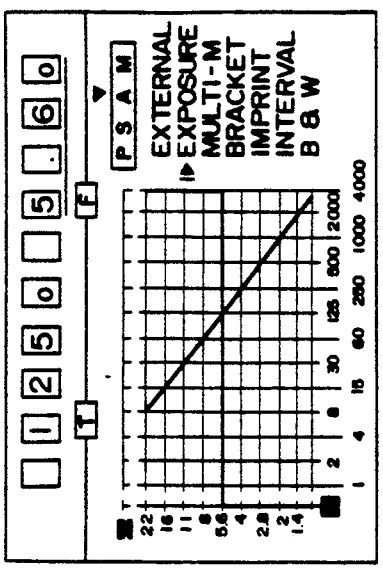
FIG.21
FIG.22
FIG.23
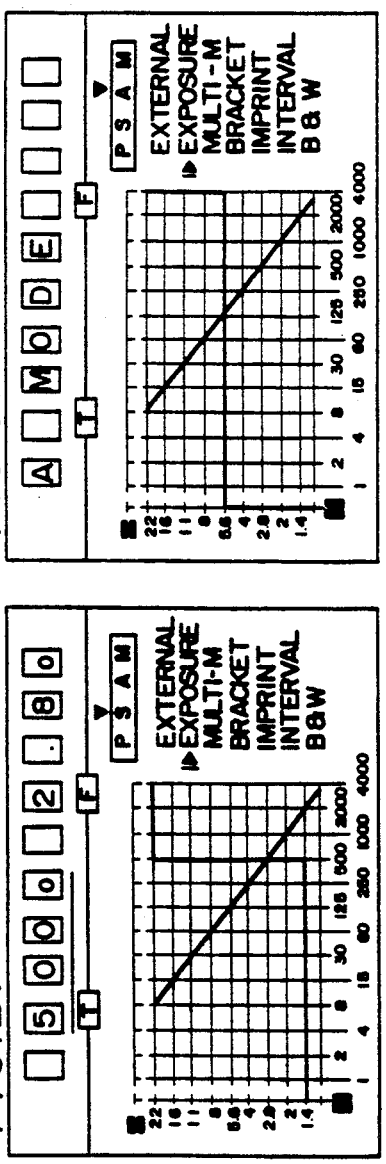
FIG.24
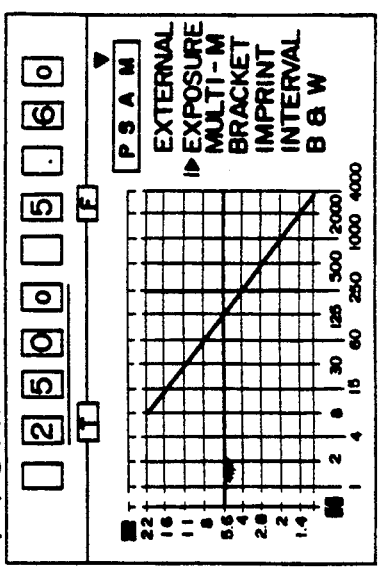
FIG.25
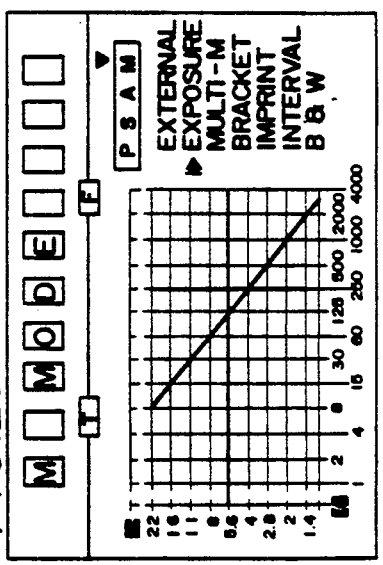
FIG.26
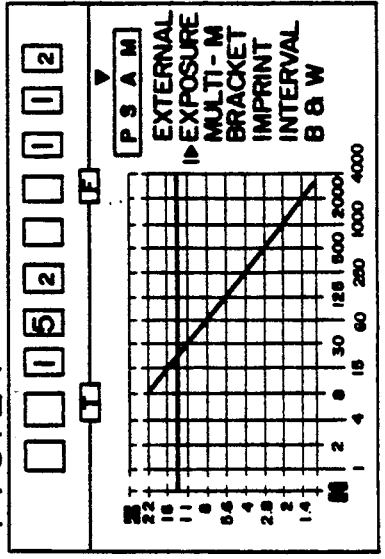

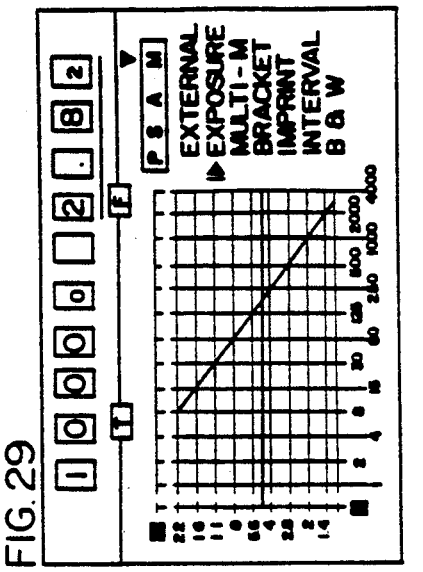
FIG. 27
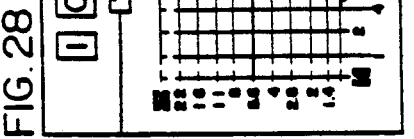
FIG. 28
FIG. 29
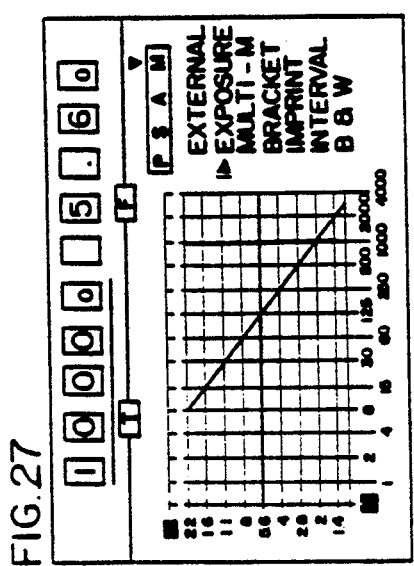
FIG. 30
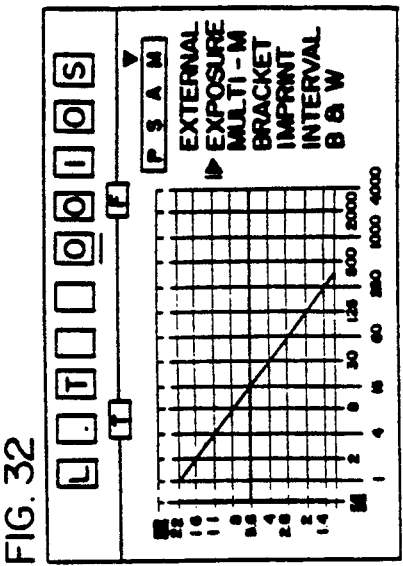
FIG. 31
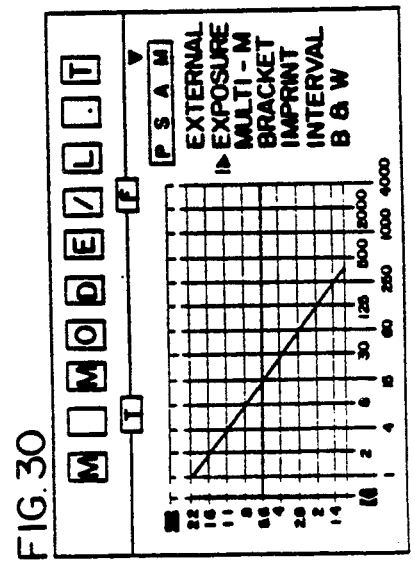
FIG. 32

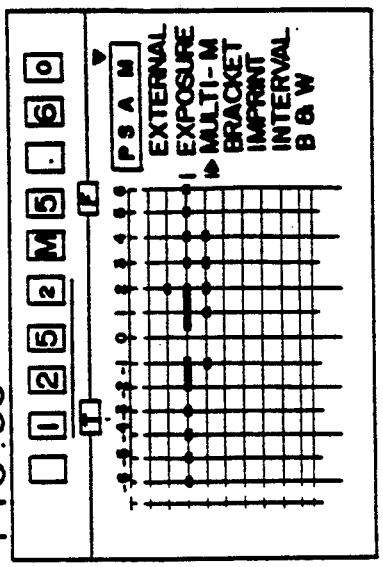
FIG.51
FIG.52
FIG.53
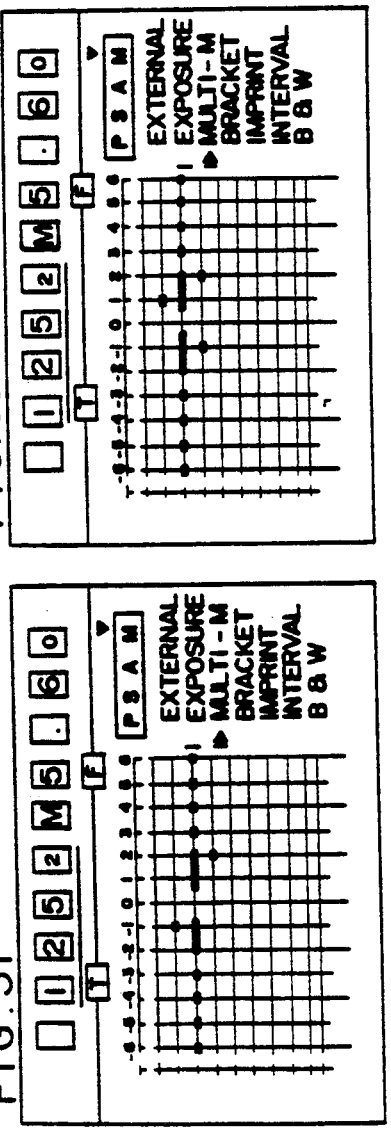
FIG.54
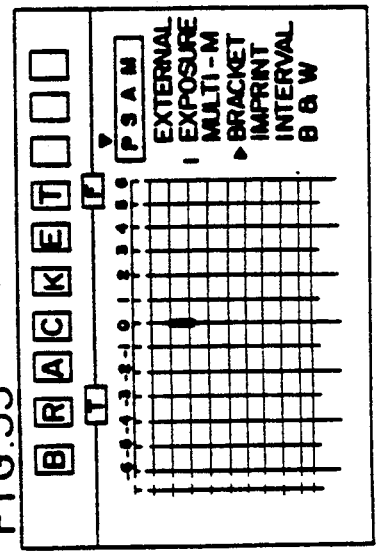
FIG.55
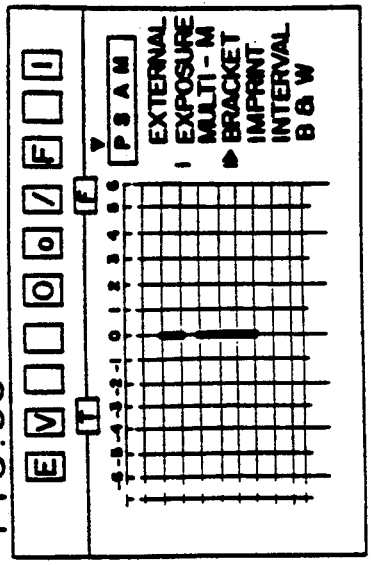
FIG.56
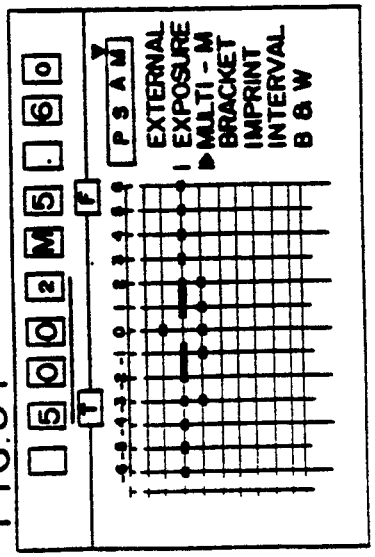

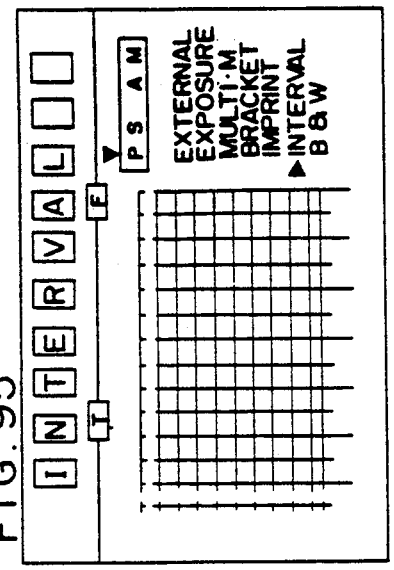
FIG.93 FIG.94 FIG.95
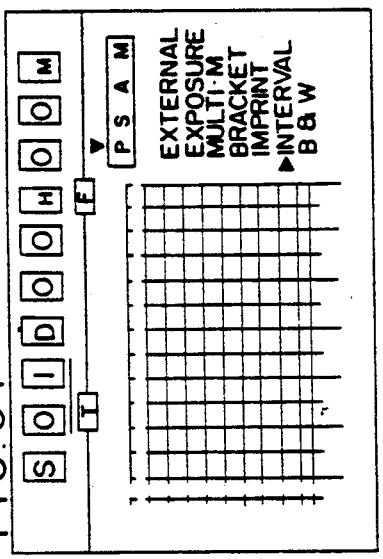
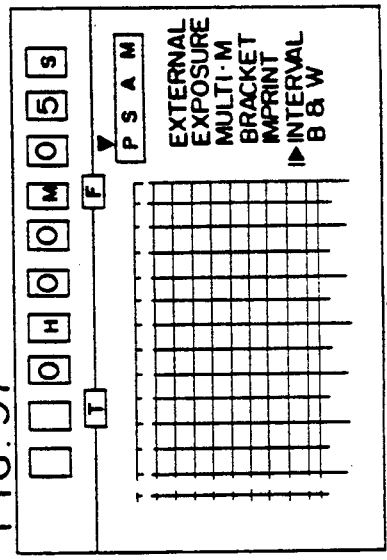
FIG.96 FIG.97
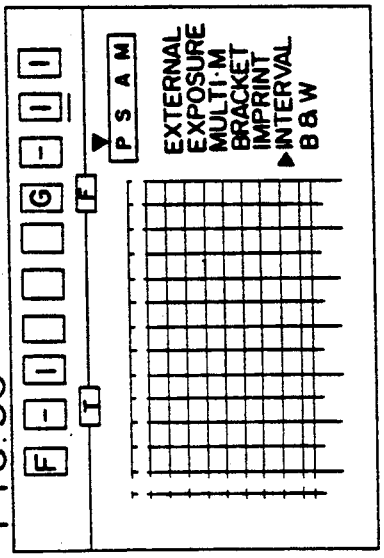
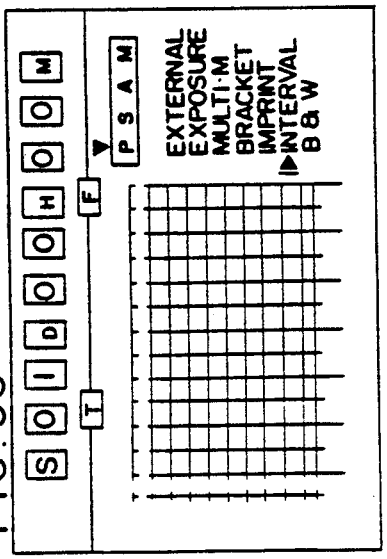

FIG. 111
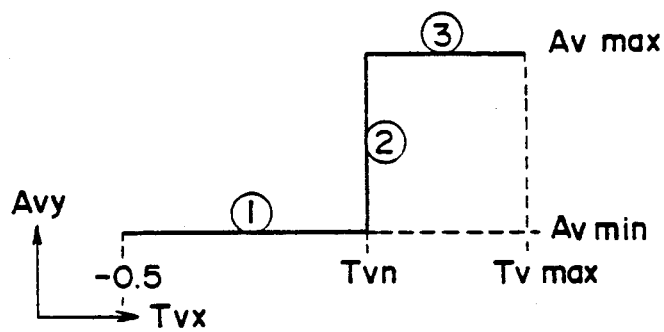
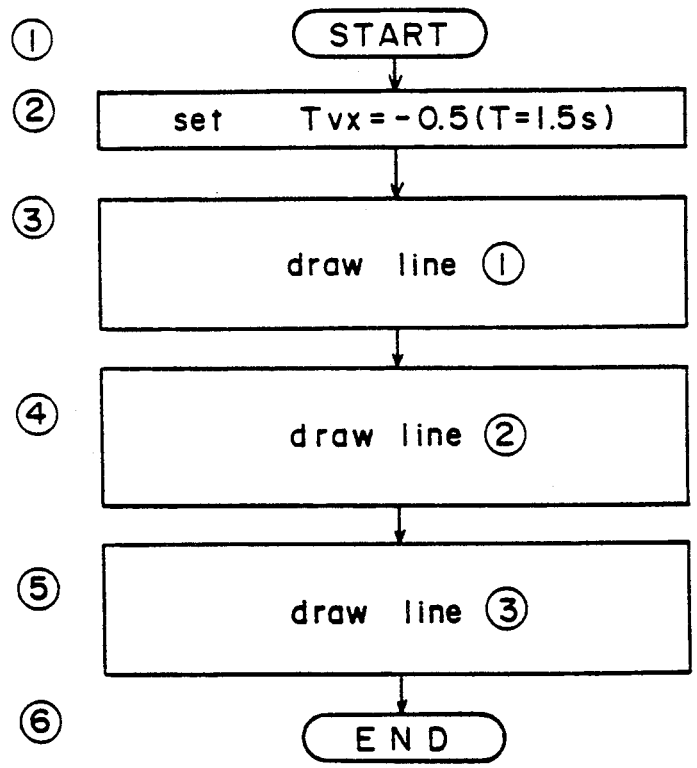

DATA RECORDING DEVICE AND A CAMERA THEREFOR

This application is a continuation of application Ser. No. 07/653,415, filed Feb. 11, 1991, now abandoned, which is a divisional of application Ser. No. 07/421,619, filed Oct. 13, 1989, now U.S. Pat. No. 4,922,820, which is a divisional of application Ser. No. 07/328,551, filed Mar. 24, 1989, now U.S. Pat. No. 4,935,766 which is a continuation of application Ser. No. 06/820,656, filed Jan. 21, 1986, now U.S. Pat. No. 4,816,853.

BACKGROUND OF THE INVENTION

1. Field of the Invention

The present invention relates a camera's exposure control system capable of performing exposure computations for exposure control, simultaneously performing these exposure computations, for example, by means of camera accessory or adaptor, such as an interchanageable camera back lid for the exposure control.

2. Description of the Prior Art

In recent years, photographic cameras with exposure control devices in the camera main body that have plural exposure control modes, such as an aperture priority automatic exposure control mode (A mode), a shutter speed priority automatic exposure control mode (S mode), and a programmed automatic exposure control mode (P mode), and that freely permit the photographer to select a desired mode have been proposed, and some have already been placed on the market. The kinds of exposure control modes that can be incorporated into a camera are, however, limited. For users who wish to take photographs by using exposure control modes other than those incorporated in the camera's main body, a camera with an interchangeable back lid on which plural programmed lines (including S mode and A mode) are set and displayed by means of the programmed line setting means so that a desirable mode can be selected from the available modes is proposed in Japanese laid-open patent publications No. Sho 54-139732 and U.S. Pat. No. 4,455,068.

Conventional cameras proposed have a back lid mounted with only a data setting device, so the microcomputer incorporated in the camera body is programmed to meet the needs for different settings. For this reason, a micro-computer with a large program capacity must be used, resulting in an expensive camera body. Further, users who do not wish to buy such a camera with plural exposure computation functions are nevertheless compelled to purchase it. Although the equipment or the system related to the above devices are proposed in Japanese laid-open patent Publication No. Sho 54-58529 and U.S. Pat. Nos. 4,165,929, 4,165,929 and 4,206,987 all are not capable of being generally used, or they are insufficient in their flexibility.

OBJECTS OF THE INVENTION

Accordingly, an essential object of the present invention is to provide a camera system that is free of these shortcomings.

Another object of the present invention is to provide a camera system capable of simple diagnosis of a malfunction and checking out any malfunction while the overall system is operating.

These and other objects of the present invention will become apparent from the following description taken in conjunction with preferred embodiments thereof with reference to the accompanying drawings.

BRIEF DESCRIPTION OF THE DRAWINGS

FIG. 1 is a block diagram showing one preferred embodiment of the digital camera system according to the present invention.

FIGS. 19, 20 and 21 are diagrams showing relationships between key manipulations and indications under S mode.

FIGS. 22, 23 and 24 are diagrams showing relationships between key manipulations and indications under A mode.

FIGS. 25, 26, 27, 28 and 29 are diagrams showing relationships between key manipulations and indications under M mode.

FIGS. 30, 31, 32, 33, 34 and 35 are diagrams showing relationships between key manipulations and indications under S mode.

FIGS. 49, 50, 51, 52, 53 and 54 are diagrams showing relationships between key manipulations and indications when M mode has been selected by means of the multifunction key.

FIGS. 55, 56, 57, 58, 59, 60, 61, 62, 63, 64, 65, 66, 67, and 68 are diagrams showing relationships between manipulations and indications and between a photographer's operation of the mechanism and indications through bracket function.

FIGS. 89, 90, 91, 92, 93, 94, 95, 96, and 97 are diagrams showing relationships between key manipulations and indications and between a photographer's operations of the mechanism and indications in internal mode.

FIG. 111 is a flow chart describing how the program lines are displayed under S mode.

DETAILED DESCRIPTION OF THE PREFERRED EMBODIMENTS

Figure 2A:
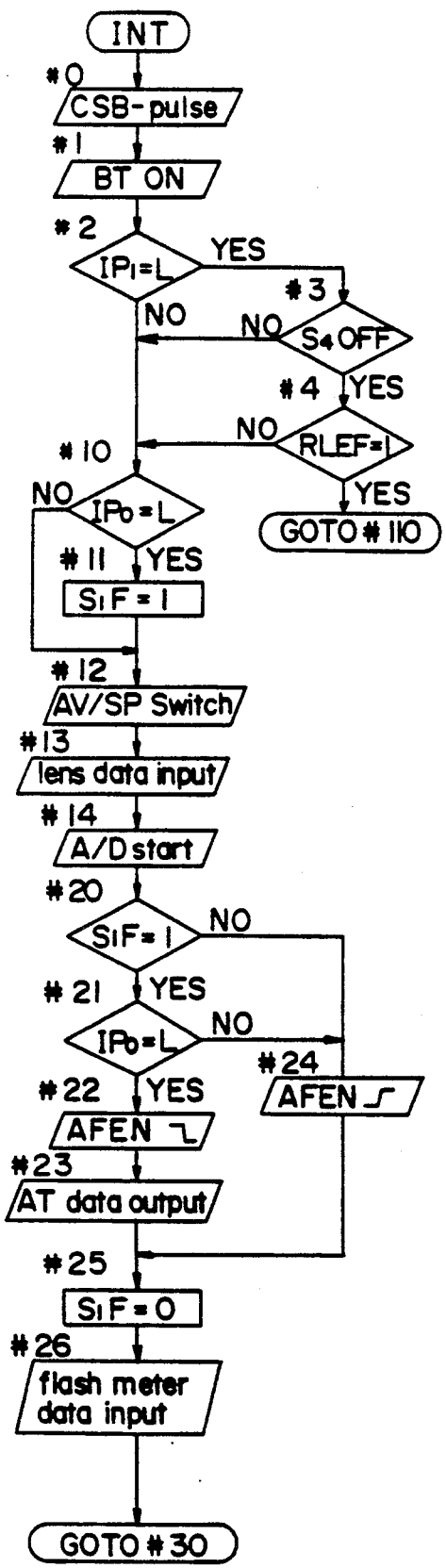
FIGS. 2(a), 2(b), 2(c), 3(a), and 3(b) are flow charts showing the operations of the camera body BD's microcomputer BMC.

FIG. 1 is a block diagram of one embodiment of an overall camera system of the present invention. The portion encircled by the broken line is the camera main body BD.

BCKC, which is electrically connected with this camera body BD via terminals T1 through T9, is a circuit capable of performing data receiving, interval photographing, and the calculation for exposure control of the camera main body BD. This circuit is installed on the camera back lid and hereafter is called the back circuit. The camera back lid on which the back circuit BCKC is installed is also called the back BCK. This back BCK is designed to be mountable to and detachable from the body BD so that different interchangeable backs BCK may be used; a back BCK with only data receiving and interval photographing functions or a back BCK with a circuit having no such functions can be attached to the body BD. Note that the structures, functions, and the BCKCs of the BCKs are described in the latter part of this application.

Motor drive MDR is a motor drive device (hereafter simply referred to as the motor drive) that is connected with the BCK through switch S4 and terminal T10 of the camera main body BD. When switch S4 has been turned ON upon completion of exposure control operation, the motor in motor drive MDR will start rotating, causing the system to wind the film and charge the exposure control mechanism through a mechanical interlinking mechanism. When the charge has been completed, making switch S4 turn OFF, the motor in the motor drive MDR will stop. This motor drive MDR is attached to the bottom of the camera main body BD through the interlinking mechanism, and when this motor drive MDR is not attached, the charging of the exposure control mechanism and film winding is performed by a manual winding lever. Note that this motor drive MDR can be installed inside the camera body BD. Circuit LEC connected with the camera body BD via terminals T11, T12, and T13 is a data output circuit installed inside the interchangeable lens. This circuit LEC will be electrically connected with the camera body when the interchangeable lens is attached to it. When the terminal CSL of the camera body BD renders a low level, this circuit will be activated, thereby sequentially outputting in series specific different data to the interchangeable lens, based on the clock pulses for reading from the camera body BD. Among these specific data are the data for making sure that the interchangeable lens is securely connected with the camera body, full aperture value data, minimum aperture value data, focal distance data, and characteristic data for automatic focusing. The details and data of this circuit are described in the U.S. Pat. Nos. 4,560,267 and 4,509,842, and the description of them is hereby omitted.

MET is an exposure meter (hereafter called the meter) divided from the camera main body BD. Circuit REC, which is connected with its terminals T14, T15, and T16 to camera body BD, is a receiver that receives infrared light signals sent from the meter MET. Also, the receiver REC, terminals T17, T18, and T19, and circuit FL connected to the receiver REC through terminals T17, T18, and T19 are a flash device. The receiver REC is attached to the hot shoe of the camera body, and if a flash device FL is installed on the other hot shoe of receiver REC, the flash device FL is rendered into a connected state as illustrated in FIG. 1. Note that only receiver REC or only the flash device FL may be attached to the hot shoe of the camera body BD.

Further, another method of connecting a flash device to the camera is to prepare an exposed terminal at a part of camera body BD other than where the hot shoe is located (for example, at the bottom of the camera) for signal lines ST1, ST2, and ST3, then directly connect either the flash device FL or receiver REC with the hot shoe, and connect the other with the camera main body BD through an adaptor at the exposed terminal.

The meter MET can be used either as the incident light measuring means or as the reflected light measuring means, and it is further designed to be capable of measuring ambient light and flash light. It computes the exposure control data based on the measured values and emits these data in serial optical data by means of an infrared light emitting device. Among the emitted data other than these data are those that indicate whether to make the flash device emit test light, or, further, those that indicate whether control data are being sent from the meter MET. The infrared light data sent from meter MET is read by the receiver REC and is latched by it as electrical signals.

Next, the functions of flash device FL and receiver REC related to signal lines ST1, ST2, and ST3 in conjunction with the functions of camera body BD are described. First, terminal ST1 is for the transmission of the light emission starting signal, and when contact X (SX) in the camera body BD has been closed upon completion of travel of the first shutter curtain 1C of focal plane shutter, the flash device FL will start flashing. Also, when receiver REC has received the test light emitting signal, it will change this terminal ST2 to a low level, thereby causing the flash device to start flashing. Signal line ST2 is besides transmitting data from camera body BD to the flashing device FL, a two-directional serial data bus for transmitting data from the flash device FL and receiver REC to the camera body BD, and from camera body BD to the flash device FL. And further, the signal line ST2 is for transmitting the signal that indicats that the flash device FL has started flashing in accordance with the contact X (SX) being closed in the camera body BD.

Signal line ST3 has such functions as a function to input data from flash device FL and receiver REC to camera body BD, a function to output data from camera body BD to flash device FL, a function to transmit information in different time width so that the camera body will start exposure control operations from the camera body BD to the flash device and receiver, a function to transmit synchronizing clock pulses to receive and send the data from camera body BD to the flash device FL and receiver REC, and still another function to transmit the signal for stopping the flashing of flash device FL from camera body BD to the flashing device.

In the camera body BD, if the microcomputer BMC (hereafter referred to as the micon) renders line CSF a low level, interface circuit IF will become ready to receive and send data. When camera body BD attempts input data, micon BMC outputs a pulse with the first time width into the flash device FL and receiver REC via signal line ST3, making both devices to become in output mode. Subsequently, when clock pulses for reading data are output from the terminal SCK of micon BMC, they will be output to signal line ST3 via interface circuit IF.

When micon BMC is ready to receive data, flash device FL outputs one byte data to signal line ST2, these data will be read by the data input terminal SIN of micon BMC through interface circuit IF. Among these data are signal that indicate the state of the exclusive flash device for the system, signals that indicate whether the charging voltage for the main capacitor exceeds the predetermined value, and signal that indicate whether automatic light control of the flash device have been performed. The second, third, and fourth byte signals will be output from receiver REC, and these data will also be read by the input terminal SIN of micon BMC. The second byte signal includes test light emitting signal and signal that indicate that the exposure control data are being sent from meter MET. The third byte signal includes exposure time data from the meter MET and the fourth byte signal includes aperture value data from the meter MET. When the input of these data has been completed, signal line CSF will be rendered at a high level, and the data giving and receiving between flash device FL and receiver REC will be stopped.

When attempting to transmit data from camera body BD to flash device FL, micon BMC makes signal line CSF low level and output the pulse with the second time width to signal line FMO. Then the flash device FL will come into the data input mode and will read three byte data from the data output terminal SOU of micon BMC, based on the synchronizing clock pulses from the camera body BD. The three-byte signal consists of the first byte signal comprising aperture control value AV and exposure control mode; the second byte signal comprising data SV+CV, which is the sum total of film sensitivity value SV and exposure correction data CV; and the third byte signal, which is the focal distance fv of interchangeable lens. The first and second byte data are used for the computations and displays of photographing distance ranges for which corrections are made to ensure proper exposure by means of flashing. The third byte data serve to make the light emitting range of flash device FL correspond to the photographic angle of view of interchangeable lens.

When the camera body BD starts the exposure control operations, the first signal line CSF will be changed low level, and then the pulses with the third time width will be output from the signal line FMO. Subsequently, these pulses will be read by flash device FL through the signal line ST3, and the flash device FL will be made to the light emitting mode for exposure control. When actual exposure control operation start, a low-level pulse will be output to signal line RL, and interface circuit IF will give signal from signal line ST2 to flash light amount control circuit FLM via signal line FST, simultaneously outputting signal being input from circuit FLM via line FSP to signal line ST2. The signal line ST2 outputs a low-level signal until the flash device FL has started flashing, and when the flash device FL starts flashing, its outputting signal will be changed to a high level. In the light-emitting amount control circuit FLM, a light detector that receives light reflected from the object that has passed through the photographic lens is installed. When the signal lines ST2 and FST are changed from high level to low level, the integration of the output current of this photo detector will be started. Subsequently, when the integrated amount reaches a value corresponding to an analog signal of SV+CV, which is the sum total of film sensitivity SV and exposure correction amount CV that are being input from the A-D/D-A conversion circuit ADA, the light-emitting amount control circuit FLM will output a high level pulse to signal line FSP. This pulse will be input into the flash device FL via signal line ST2 resulting in the stoppage of flashing.

Also, when a pulse is input into the flash device FL from signal line ST3 for giving and receiving data, the flash device FL is capable of charge-up operation for a fixed period (for example, 15 minutes) from when this pulse have been input. Therefore, whenever the data giving and receiving has taken place between the flash device FL and camera body BD, the charge-up operation will be performed for a certain period from that moment. When flash photography at time intervals is attempted using this function, the system is designed in such a way that a signal that activates the camera body BD will be input to it from the back circuit BCKC for a fixed time (for example, 1 minute) before photographic operation starts. When the camera body BD is activated, the data giving and receiving will be taking place between the flash device FL and the camera body BD, and charge-up operations will be performed. Therefore, even when attempting interval photography by means of flash photography with intervals of more than 15 minutes, the main capacitor of flash device FL will be rendered into a completely charged state before photographing.

The detailed constructions of meter MET, receiver REC, flash device FL, interface circuit IF, and flash light amount control circuit FLM are described in Japanese patent application No. Sho 59-201381, and the description of them in this application is omitted. Besides this publication, the detailed constructions related to flash device FL, interface circuit IF, and flash light amount control circuit FLM are described in the Japanese laid-open patent publication No. Sho 59-48435 and U.S. Pat. No. 4,573,786.

Next, the inside of camera body BD encircled by the broken line in FIG. 1 is described. BMC is a microcomputer, the operations of which are shown in the flow charts in FIGS. 2 and 3.

BA is a power supply battery, and power is fed directly from this battery BA to circuits via power supply line +E, except for light-measuring circuit FLM and AMM, and A-D/D-A conversion circuit ADA. The ON and OFF of transistor BT is controlled by signals from the output port OPo of micon BMC, and when transistor BT is turned ON, power will be fed via power supply line +V to light-measuring circuits FLM and AMM, A-D/D-A conversion ADA, and lens circuit LEC. DSP is a display circuit that displays the light measuring mode, exposure control mode, control exposure time, control aperture value, film sensitivity, exposure correction amount, and state of flashing device. Also an LED (not shown) for indicating over a predetermined exposure limit or over a predetermined aperture limit is flashed when proper exposure cannot be obtained with the controllable exposure range. When signal line CSD is rendered at a low level, this display circuit DSP reads the serial data being sent from the data output terminal SOU of micon BMC in synchronization with the clock pulse from terminal SCK, and performs display based on these data.

AMM is a light-measuring circuit for ambient light with photo detectors for partial light measuring and average light measuring. The switching between these two photo detectors can be performed through the High and Low of signal line ASMO. The light measuring circuit AMM outputs a voltage signal by means of the logarithmic compression of the output current of the photo detectors. When a low level pulse is output to signal line ADSTA, A-D/D-A conversion circuit ADA will perform the A-D conversion of the output of light-measuring circuit AMM based on the clock pulses from the terminal CKOUT of micon BMC. Also, when signal line CSA is at low level and signal line ADMO is at high level, the ADA will send the data for which A-D conversion has been performed in synchronization with the clock pulses sent from terminal SCK, and on the other hand, when signal line CSA is at low level and signal line ADMO is at low level, it will read the aforementioned data SC+CV from output terminal SOU and will output these data to light amount control circuit FLM after performing their D-A conversion. Note that when signal line CSA is at high level, no data giving and receiving between A-D/D-A conversion circuit and micon BMC will be performed. G1 is a gate circuit, and when signal line CSL is rendered to be low level, it will be activated, and data transfer from lens circuit LEC to micon BMC will become possible.

AFC is an automatic focusing circuit, and when signal line AFEN has been rendered low level, it will be activated; when the AFEN has been rendered high level, it will be closed. Also, when signal line CSAF is at low level, AFC will read data from micon BMC. An embodiment of this automatic focusing circuit AFC is shown in the Japanese laid-open patent publication No. Sho 59-140408, the detailed description of which is hereby omitted.

APG is a means that outputs pulses corresponding to the moving amount of the diaphragm member, and these pulses are input into the terminal CKIN of micon BMC. The pulses that are input into this terminal CKIN is then input into the event counter in the micon BMC, where subtraction is performed with respect to the present diaphragm-stage data based on these pulses. When the contents of the counter becomes zero, the aperture setting will have been completed according to predetermined aperture setting, thereby activating counter interruption that results in a stoppage of stopping down the aperture diaphragm because of pulses to stop aperture setting that are output from output port OP12.

MGD is a magnet circuit, and when a low-level pulse is output to signal line RL, the release magnet will be activated, thereby activating the aperture setting and mirror up operations. When a low-level pulse is output to signal line AP, the diaphragm magnet will be activated, resulting in the aperture-setting operation. When a low-level pulse is output to signal line 1C, the first shutter curtain fastening release magnet will be activated, causing the first shutter curtain to start traveling. When a low level pulse is output to signal line 2C, the second shutter curtain fastening release magnet will be activated causing the second shutter curtain to start traveling.

G2 is a gate circuit and will be activated when signal line CSB has been rendered into a low level, thereby making data giving and receiving between back circuit BCKC and micon BMC possible. Signal line CSB is capable of activating back circuit BCKC: when the activated camera body BD attempts to perform data giving and receiving between it and back circuit BCKC, the back-circuit BCKC will also be activated. Further, while a data printing to exposed film is being performed in back circuit BCKC, signal-line CSB will output a low level pulse to prevent film winding when the second shutter curtain starts traveling. When this pulse is input into this back circuit BCKC, the BCKC will stop its printing operation which continues within time corresponding to the film sensitivity data sent from camera body BD. When signal line BIO is at a high level, it will send data from the camera body BD to the back circuit BCKC, and when it is at low level, it will send data from the back circuit BCKC to camera body BD. The data printing pulse is output to signal line IP. This pulse is output from when exposure control operation have started and is made to have a time width corresponding to film sensitivity.

Switch S1 is a light-measuring switch that is turned ON when the release button is pressed down to the first stage, resulting in the start of light-measuring calculation. Also, signal line BS1 is input from the back circuit BCKC in parallel with this switch S1, so that micon BMC can be activated from the back circuit BCKC. There are two different cases in which start signal is input from back circuit BCKC via signal line BS1. One is when the back circuit BCKC is activated through the operation of the back circuit BCKC, and the other, as previously described, is when the camera body is activated to start charge-up of the flash device FL one minute before the start of interval photographing. Switch S2 is a release switch that is turned ON when the release button is pressed down to the second stage, and when this switch S2 is turned ON, exposure control will be activated. Also, signal line BS2 is connected in parallel with this switch S2 from the back circuit BCKC so that a signal to start photographing to camera body BD can be transmitted from the back circuit BCKC when performing the predetermined number of photographing (hereafter referred to as the bracket photography), each frame of which is shifted by a fixed exposure value with respect to interval photography and optimum exposure. Further, when the predetermined number of photographing (hereafter referred to as the number of frames) has been completed during bracket photography, the system is designed so that the shifting to exposure control will be prohibited from the back circuit BCKC even if the release switch S2 of the camera body BD has been turned ON. If the release switch S2 of the camera body BD has been turned OFF, the shifting to the next bracket photography will become possible. Therefore, the back circuit BCKC is designed so that it can send data to camera body BD to prohibit shifting to exposure control operation by watching the status of release switch S2 of the camera body BD, if the release switch S2 is found to have been turned ON after completion of the predetermined frame number of photography by means of bracket photography. Note that when interval photography is being performed, the back circuit BCKC is capable of setting the photography starting time, number of frames to be photographed, and how many frames are being exposed in what time intervals and in how many times (hereafter referred to as the number of groups). When the photographing starting time arrives, this back circuit BCKC will start continuously outputting a low-level signal for exposure control until the photographing of the predetermined number of photographies has been completed. When the photographing of one group has been completed, the BCKC will make signal line BS2 high level, will count time of the predetermined time intervals, and will display the remaining time. When the remaining time becomes zero second, the BCKC will make BS2 low level again to perform the photographing of the predetermined number of frames. When these operations have been completed, the interval photography mode set will be released. Note that even when the back circuit BCKC is performing interval photography mode operation, if the release switch S2 of the camera body BD has been turned ON, photographing operation will be performed regardless of the preset photographing starting time and time intervals. That is, even before the photographing starting time, if the release switch S2 has been turned ON resulting in the start of photographing operation, the back circuit BCKC will maintain signal line BS2 at a low level until the photographing of the predetermined number of frames has been completed. The BCKC will also perform identical operation even when the release switch S2 has been turned ON before the present time intervals have elapsed. Note that the number of photographics performed in the camera body BD is discriminated by counting the number of pulses input for data transfer from signal line IP.

The switch SMO provided in the camera body BD is a switch to change exposure control mode. Whenever the position of this switch SMO is changed from OFF to ON, the mode will be changed. Among the exposure control modes of a photographic camera are programmed exposure control mode (P mode), exposure priority aperture automatic control mode (S mode), aperture priority exposure automatic control mode (A mode), and exposure and aperture manually setting mode (M mode). These modes vary in the order of P→A→M→S→P→ - - - . Switch SIS is used to set the film sensitivity, and whenever the position of this switch is changed from OFF to ON, the film sensitivity will be varied at the step of ⅓ EV. When the position of switch SIS is changed from OFF to ON after the value of film sensitivity has reached its upper limit value, the value of film sensitivity will be varied to the lower limit value. If the position of switch SIS is changed from OFF to ON again, the value of film sensitivity will start increasing again. SOR is a switch that is used to set the exposure correction amount, and whenever the position of this switch SOR is changed from OFF to ON, the exposure correction amount will vary in the order of 0→½→1→1½→2→2½→3→3½→4→ −4→ −3½→ −3→ −2½→ −2→ −1½→ −½→0 - - - .

ST is a switch that is used to set the exposure time, and whenever the position of this switch ST is changed from OFF to ON, the exposure setting will be varied toward reduced exposure time at the rate of 1 EV per step. When under the S mode, the exposure time will be varied in the order 32 sec→16 sec→8 sec→ . . . →1/1000 sec→1/2000 sec→1/4000 sec→32 sec - - - . When under the M mode, it will be varied 32 sec→16 sec→ - - - →1/2000 sec→1/4000 sec→bulb→32 sec→ - - - . Therefore, when under the M mode, the bulb mode setting is possible by manipulating switch ST. Switch SA is used to set the aperture value, and when the position of switch SA is changed from OFF to ON, if under the A or M mode, the aperture setting will be varied from minimum F number toward maximum F number at the rate of ½ EV per step. When the aperture setting has reached the maximum F number, the setting will start varying toward minimum F number. Each of these switches SMO, SIS, SOR, ST, and SA are operated by operating corresponding key switches provided on the camera body BD. Also, switches S1, S2, SMO, SIS, SOR, and SA are connected with the interruption terminal INT of micon BMC through AND circuit AN. Therefore, when the data setting key on the outside of the camera is manipulated, when the release button is manipulated, or when a low-level signal is input into micon BMC from back circuit BCKC via signal lines BS1 and BS2, if micon BMC is inactivated, it will start operating upon receiving this interruption signal.

Switch SCN is interlocked with a mechanical film counter. Switch SCN will remain ON until the film counter has come to a position indicating the frame number 1, and thereafter switch SCN will be in the OFF position. The signal from switch SCN is input into back circuit BCKC via terminal T9 and into the input port IP7 of micon BMC. The micon BMC will perform exposure control at the shortest exposure time and minimum F number while the switch SCN remains ON. On the other hand, the back circuit BCKC will not perform data printing operation while switch SCN remains ON even if it receives pulse signals from the signal line IP. Although the back circuit BCKC is capable of adding or subtracting 1 from a set value at each pulse input from signal line IP and is capable of printing these added or subtracted data, it will not perform addition and subtraction while the switch SCN remains ON. Note that if the system is designed so that no pulse will be output to signal line IP while switch SCN remains ON, the back circuit BCKC is not required to judge whether data printing is necessary or whether addition or subtraction needs to be performed by watching the status of switch SCN. The terminal T9 also is not required. An electrical film counter may be used instead of the mechanical film counter so that a low-level signal will be output to terminal T9 before the film has wound at the regular photographing frame position (counter indication 1). Further, the system can be designed so that no pulse will be output to signal line IP.

Switch SAS is turned ON and OFF in accordance with operation of light measuring mode switching member provided on the camera exterior section. This signal is input into the input port IP8 of micon BMC, and when low level signal has been input into the micon BMC, it will output the low-level signal to signal line ASMO rendering the system to partial light measuring mode, simultaneously having display section DSP display the partial light measuring mode. Conversely, if a high-level signal has been input into input port IP8, the micon BMC will output a high-level signal to the signal line ASMO rendering the system to average light measuring mode, simultaneously sending data to the display section DSP to display the average light measuring mode. Switch S4 will be turned ON when the exposure control mechanism has completed its operation and turned OFF when charge of the exposure control mechanism has completed its operation.

The signal from this switch S4 enters the input port IP9 of micon BMC. The micon BMC will not shift to exposure control operation when it has received low-level signals from switch S4 even if release switch S2 has been turned ON.

Although micon BMC is designed to output pulse with a time width corresponding to film sensitivity to signal line IP, the back circuit BCKC shown in FIG. 1 by itself generates a time corresponding to the film sensitivity read from the camera body BD and performs the data printing for only this time width. Therefore, the pulse from signal line IP is used as a signal only for starting the printing operation. However, a back lid without an ability to read film sensitivity data sent from the camera body to create time corresponding to these data, but that does have a data printing section that can perform data printing while pulses are being input from signal line IP, is sometimes attached to camera body BD, which is the reason why micon BMC is provided with such output pulse function. Note that the back circuit BCKC is capable of printing the exposure time and aperture value for exposure control sent from the camera body. Because of this reason, the micon BMC always sends exposure time and aperture value to the back circuit BCKC before entering exposure control flow to send pulses to signal line IP. To minimize the probability that the second shutter curtain may be started before the data printing operation of proper time copying is completed, the back circuit BCKC is constructed to start its data printing operation when detecting the exposure control time data and diaphragm value data sent from camera body BD.

Hereafter, based on the flow charts in FIGS. 2(a), 2(b), 2(c), 3(a) and 3(b), the operation of the camera system in FIG. 1 is described. When one of the switches S1, S2, SMO, SIS, SOR, ST, and SA is turned ON, or when a low signal of signal lines BS1 and BS2 of back circuit BCKC is input, AND circuit AN is rendered low level, and therefore, interruption terminal INT of micon BMC will fall to a low level. The micon BMC will then start its operating from number zero step #0 in FIG. 2(a). First, at number zero step #0, a low-level pulse will be output to signal line CSB to activate back circuit BCKC, and at #1 step, transistor BT will be turned ON and power will begin to be fed to light-measuring circuits FLM and AMM, A-D/D-A conversion circuit ADA, and lens circuit LEC. At #2 step, whether a low-level signal is input into input port IP1 by turning ON of switch S2 ON or by release signal from the signal line BS2 of the back circuit BCKC, is judged. If the micon BMC detects that a low signal is being input to input port IP1, it will shift to #3 step. At #3 step, the micon BMC will judge whether switch S4 has been turned OFF by the charge completion of exposure control mechanism. If switch S4 has not been turned OFF, the system will shift to #10 step because the exposure control cannot be started unless this switch is turned OFF. When switch S4 is turned ON at #3, the system will judge whether the flag RLEF is 1 at #4 step. This flag RLEF will be set at 1 unless the exposure control data TV and Av have been ready and the release prohibition signal has been input from the back circuit BCKC, and will be reset at 0 when the data preparation has not been completed or when the release prohibition signal (this signal is input upon completion of bracket photography) has already been input. If flag RLEF has already become 1 at #4 step, the system will shift to the flow of exposure control that begins from #110 step, and if flag RLEF is 0, it will shift to #10 step. Also, if a low signal has not yet been input into input port IP1 at #2 step, the system will move to #10 step.

At #10 step, the system judges whether a low-level signal has been input into input port IPo, and if this input has been already made, flag S1 F will be set at 1 at #11 step, if not, the system will move to #12 step with the S1 F remaining at 0. These are preparatory activities to judge whether a low-level signal has been input into input port IPo by means of switch S1 or by back-circuit BCKC. Next, at #12 step, one of two photo detectors, partial and average photo detectors inside the light-measuring circuit AMM, will be selected in accordance with the condition of switch SAS, and the operation will move to #13 step. At this step, signal line CSL will be made at a low level, and the micon BMC reads varieties of data from lens circuit LEC by repeating serial input and output operations several times. Next, at #14 step, the clock output terminal CKOUT starts outputting clock for A-D conversion and micon BMC outputs a low level pulse to signal line ADSTA to start the A-D conversion of the output of light-measuring circuit AMM by means of the A-D/D-A conversion circuit ADA.

Next, at #20 step, judgment is made as to whether the flag S1 F has been set at 1 at #11 step; if so, the operation will shift to #21 step if not, it will move to #24 step. If the flag S1 F has not been set, it means that this status has not resulted from the operation of switch S1 or that of the signal line BS1 of the back circuit BCKC. At this time, to prevent the camera objective lens from inadvertently moving by automatic operation, the micon BMC makes signal line AFEN high level, reset flag S1 F at 0 at #25 step, (in this case the flag S1 F has already been reset at 0), and move to #26 step. On the other hand, when flag S1 F is at 1 at #20 step, whether input port IPo still remains at low level is judged at the next step #21. This is because the system is designed to output a low-level pulse to signal line BS1 so that the back circuit BCKC can start the charge-up operation of a flash device one minute before the start of interval photography, or what the camera body can be activated when the back circuit BCKC has started the calculation of exposure. It is undesirable that the lens is inadvertently moved for automatic focusing when the camera body BD is activated by back circuit BCKC. To prevent this from happening, when the back circuit BCKC activates the camera body BD, the micon BMC will input a low-level pulse with a length of time shorter than the time from when an interruption signal has been input into micron BMC until #21 step starts and longer than the length of time until #10 step starts, to signal line BS1. When the input port IPo has been judged as being at low level at #21 step, signal line BS1 will not output a low-level signal. In such case, the micon BMC will make signal line AFEN high level at #24 step to prohibit automatic focusing, and the operation will then shift to #26 step via #25 step. In the meantime, if the input port IPo has been judged as being low level at #21 step, it means that the light-measuring switch S1 should be ON position. At this time, the micon BMC sets signal line AFEN at low for activating automatic focusing circuit AFC, sets signal line CSAF at Low to send data for automatic focusing to automatic focusing circuit AFC, and after that, resets flag S1 F at 0 at #25 step after the signal line CSAF has been returned to High, and subsequently moves to #26 step.

At #26 step, the data from flash device FL and receiver REC will be read. As previously described, signal line CSF will be made Low, and the pulse with the first time width will be input into signal line FMO through this operation. When the serial input and output operation is performed, first, the flash device FL will output the previously described first byte data, and subsequently, receiver REC will sequentially output the previously described data read from the meter MET in the order of the second byte data, third byte data, and fourth byte data. These data will all be read. Subsequently, the signal line CSF will be rendered High, thereby completing the operation of #26 step.

Figure 2B:
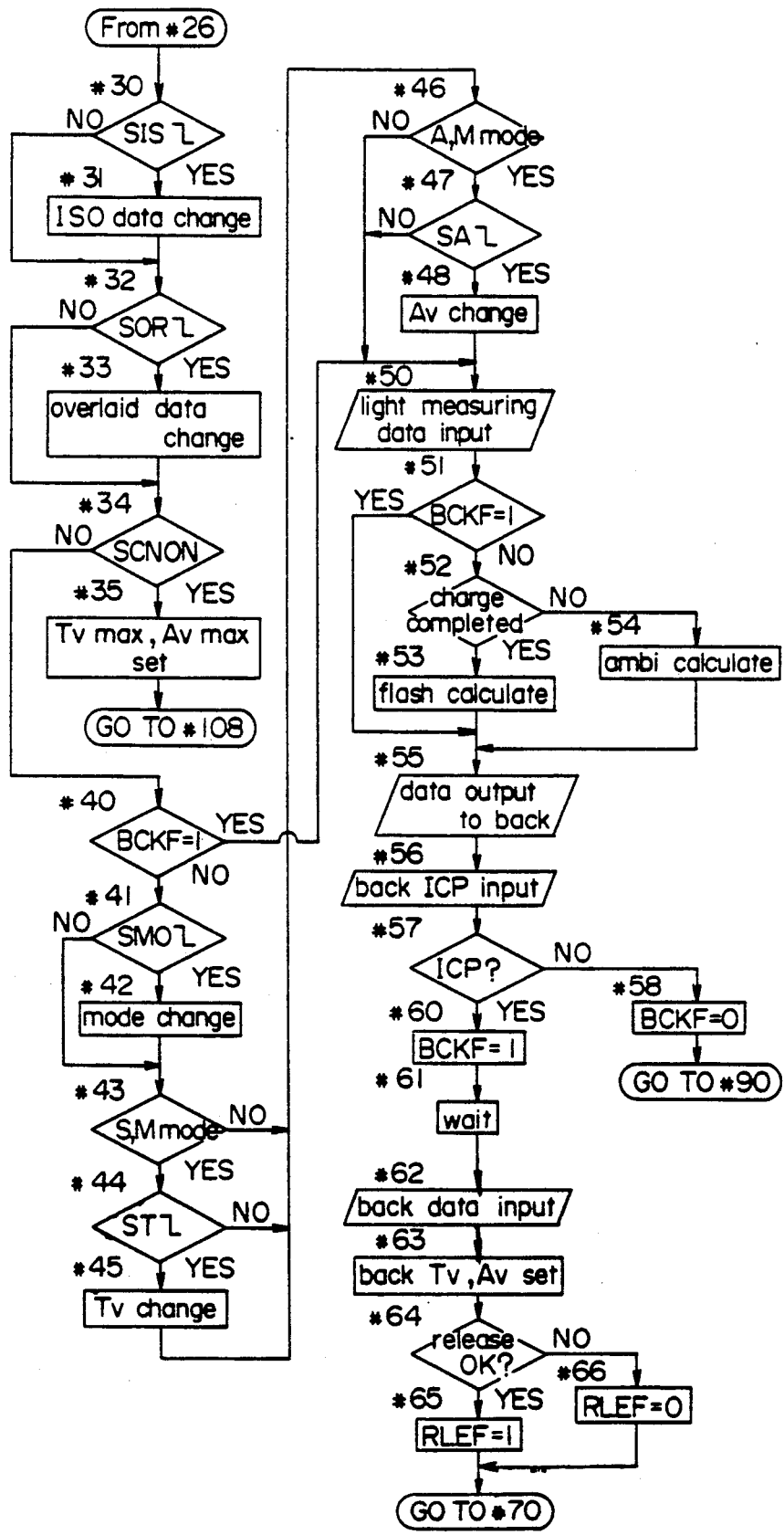
Figure 2C:
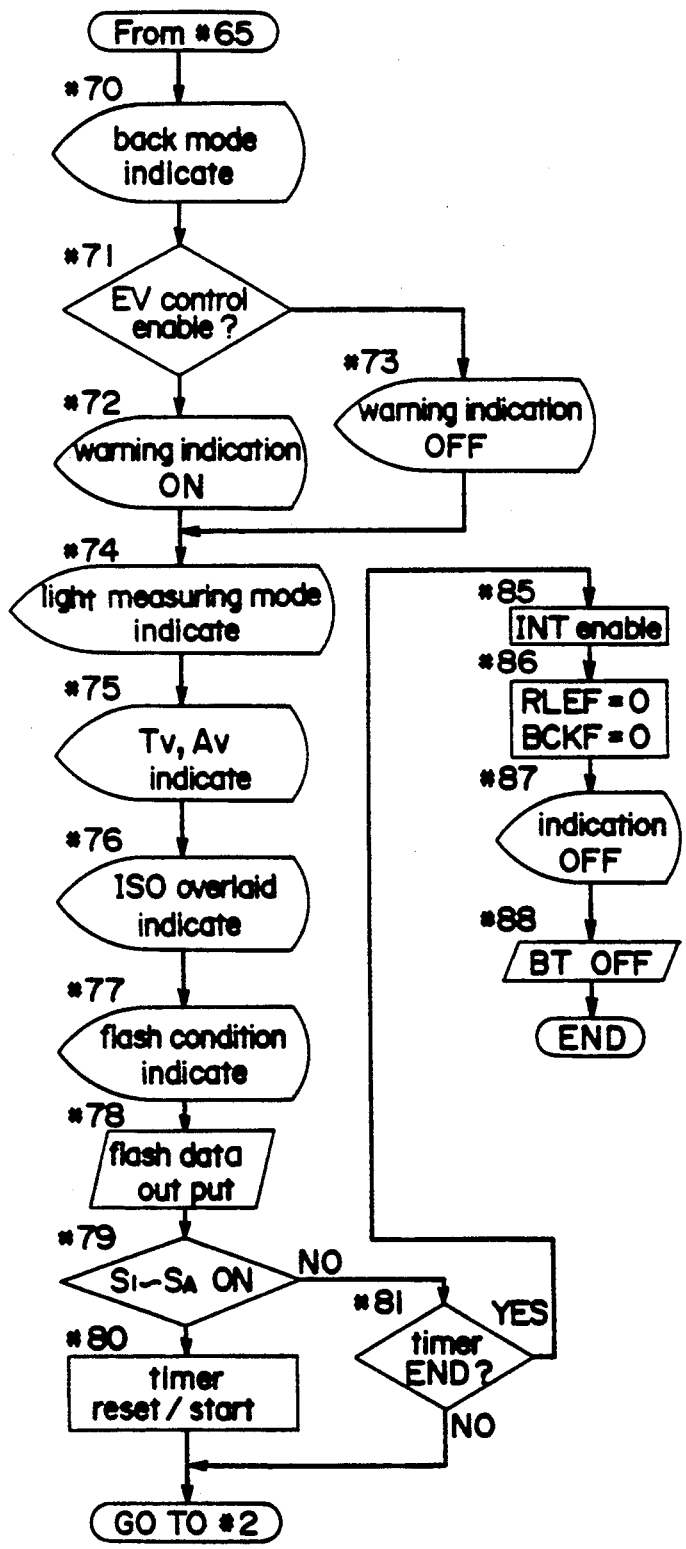

Next, at #30 step shown in FIG. 2(b), whether the position of film sensitivity switch SIS has been changed from OFF to ON is judged. If the position is judged to have been changed, the film sensitivity data will be increased by ⅛ Ev at #31 step, and the operation will move to #32 step. If no change in the switch position is detected, the operation will immediately be moved to #32 step, and the system will judge whether the position of exposure correction amount (overlay) setting switch SOR has changed from OFF to ON. If the change is detected, an exposure correction amount of ½ Ev will be increased at #33 step, and the operation will move to #34 step; if not, it will move straightly to #34 step.

At #34 step, whether switch SCN is ON is judged and if it is OFF, the operation will proceed to step #40. On the other hand, if switch SCN is ON, the film counter is not in a status that indicates the regular frame number (1), and indicates (S . . . ), the operation will proceed to #35 step. At #35 step, the maximum aperture value AV max that corresponds to minimum F number and the shortest exposure time TV max are set for the purpose of control, and the operation will proceed to #75 step after flag RLEF has been set at 1 at #108 step. Even when the camera body reads control data from back circuit BCKC, or from meter MET through receiver REC, it will disregard them and continue exposure control at TV max and AV max until the regular frame number has been indicated. Note that at this time, neither exposure computation is performed nor are film sensitivity and exposure compensation accepted in the camera body. Also, even if data that prohibit exposure control are input from back circuit BCKC, they will be disregarded.

At #40 step, whether flag BCKF is 1 is judged. The back circuit BCKC is capable of performing exposure calculation in regard to exposure control data and sends these data to camera body BD. When the camera body has read these data (hereafter shown in back ICP) for exposure control, this flag BCKF will be set at 1, if not, it will be reset at 0. Therefore, the flag BCKC is always reset at 0 at the beginning of its operation, and the operation will proceed to #41 step. On the other hand, when the exposure control is performed based on the data from the back circuit BCKC (BCKF=1), steps #43 to #48 for data changing will not be performed and the operation will proceed directly to #50 step. Therefore, even if switches SMO, ST, and SA are manipulated, no data change will be made.

At #41 step, whether the position of mode switch SMO has been changed from OFF to ON is judged, and if the change is detected, the exposure control mode will be altered at #42 step. Conversely, if switch SMO is judged to have remained in the ON or OFF position, the exposure control mode will remain unchanged, and the operation will proceed to #43 step. At #43 step, whether the operation has shifted to S or M mode, and because in S or M mode the alteration in exposure time is acceptable, the operation will proceed to #44 step. On the other hand, if the photographing mode is not set in the S or M mode, the operation will immediately proceed to #46 step. At #44 step, whether the position of switch ST has changed from OFF to ON is judged, and if the change is detected, exposure time will be increased by 1 Ev. Conversely, if no change in the position of switch ST is detected, the operation will immediately proceed to #46 step. Note that as previously described, when the position of switch ST has changed from OFF to ON after the shortest exposure time (1/4000 sec), the exposure time will be changed to the longest exposure time (32 sec) when under the S mode; it will be changed to bulb when under the M mode.

At #46 step, whether the operation is under A mode or M mode is judged; when neither under A mode nor under M mode, no diaphragm value setting will be accepted and the operation will proceed straightly to #50 step. If under the A or M mode, the change in the position of switch SA is judged at #47 step. If no change is detected, the operation will directly proceed to #50 step, and if the change in position of switch SA from OFF to ON is detected, the operation will proceed to the #50 step after increasing the diaphragm value by ½ Ev at #48 step. Note that the detection of the change in the position of switches from OFF to ON at #30, #32, #41, #44, and #47 steps, can be made by having signals memorize the state of the switch at each step so that they can be compared with the state of the switch the next time in the same step.

At #50 step, signal line CAD is rendered Low, the serial input and output operation is performed to read the data in series for which A-D conversion has been achieved, the signal line CSA is rendered High, the clock output from clock output terminal CKOUT is stopped, and the operation will proceed to #51 step. At #51 step, whether flag BCKF is 1 is judged; if it is 1, the operation will proceed to #55 step without passing through the calculation steps of #52, #53, and #54. On the other hand, if flag BCKF is 0, the operation will proceed to #52 step, and the system judges whether the charge completion signal has been input from the flash device FL. If the charge completion signal has been input, the exposure computation for flash photography will be performed at #53 step, and if the charge completion signal has not been input, the exposure computation for ambient light photography will be performed. When these calculation have been completed, micon BMC will proceed to #55 step. The detailed explanation of calculation at #53 and #54 steps are described in the U.S. Pat. Nos. 4,509,843 and 4,550,996, and their description is thus omitted.

At #55 step, data will be transferred to back circuit BCKC with signal line CSB rendered Low and signal line BIO remaining High. The camera body BD will send the data shown below. First, the first byte signal is the data sent from the flash device FL, and the second byte, the third byte, and the fourth byte signals are data sent from meter MET through receiver REC. Note that when the back circuit BCKC judges that exposure control data from the meter MET has been input, it will perform displays based on these data and will send back these data as control data to camera body BD. This function is called the external function. In the condition that function of back circuit BCKC that performs has already been activated (hereafter referred to as the exposure function) when the exposure control data from meter MET has been input, even if what mode has been selected among three kinds of P mode, S mode, A mode, M mode, and manual long-time mode M/LT, they will become the external function, and the external function will perform the exposure control based on the data from the meter MET. Also, when the exposure function has been activated, the back circuit BCKC is set to the function that memorizes several measured values from the camera (hereafter referred to as multifunction). This multifunction comprises a mode that determines an average value of several memorized light measuring values $$\left(\sum_{i=1}^{N} BVi/N\right)$$

(called an average mode); a mode that determines an intermediate value (BV max + Bv min)/2) between memorized maximum and minimum light-measuring values (hereafter referred to as the center mode); a mode that determines the value (BV max − 2.3) that reproduces the maximum value at the upper limit of the film latitude (highlight mode); and a mode that determines the value (BV min + 2.7) that reproduces the minimum value at the lower limit of latitude (shadow mode). Even when this multifunction has been activated, if the exposure control data has been input from the meter MET, they will all become the external function, and the multifunction will become invalid. Also, when the exposure function has been activated, the function that performs bracket photography (bracket function) can also become activated. At this time, if the system judges that the exposure control data has been input from the meter MET, the bracket photography based on the exposure control data from the meter MET will be performed.

The fifth byte data sent from the camera body BD to back circuit BCKC are light measuring data BV-AVo (AVo: maximum aperture value) read from A-D/D-A conversion circuit ADA; the sixth byte data are the maximum aperture value data AVo read from lens circuit LEC, and the seventh byte data are the maximum diaphragm value data (AV max). Further, the 8th byte data are the shortest exposure time data (TV max), the 9th data the longest exposure time data (TV min), the 10th byte data synchronizing limit exposure time data, for flash photography TVx, the 11th byte data the exposure time data TV determined at the camera body BD, and the 12th byte data the diaphragm value data AV determined at the camera body. The 13th byte data are film sensitivity data SV and the 14th byte data are exposure correction amount data CV. When all these data transfers have been completed, the micon BMC of the camera body BD will proceed to #62 step, thereby making signal line BIO Low. Then the back circuit BCKC will send 1-byte data. These data are the previously described back ICP. When the exposure function has been selected, the back circuit BCKC will, for example, send "80H" (H indicates hexadecimal number) data. When the exposure function has not been selected, the back circuit BCKC will not perform this output operation, and the camera body BD will read "00H". When this back ICP data reading has been completed, micon BMC will make signal lines CSB and BIO High and will proceed to #57 step.

At #57 step, whether back ICP is "80H" is determined; if not, it means that a back lid without the back circuit BCKC is attached to the camera body BD or the exposure function has not been selected at the back circuit BCKC. At this time, to perform calculation in the camera body or to perform calculation based on the meter MET, the system will reset flag BCKF at 0 at #58 step, and the operation will proceed to #90 step. If back ICP has been judged to be "80H" at #57 step, it means that the exposure function has been selected and the operation will shift to #60 step, thereby making flag BCKF as 1. Based on the data sent to back circuit BAKC, the system will wait to operate at #61 step until this back circuit BCKC spends sufficient time to compute the exposure control data. During this period, the back circuit BCKC first calculates the light-measuring value based on the data sent. Note that during this period, line CSB remains at low level. At this time, if the multi-function has not been selected, the system will perform only the computation of (BV−AVo)-+AVo=BV, but if it has been selected, the system will perform computations in accordance with the mode selected from the previously described average mode, center mode, highlight mode, and shadow mode. Note that when under the multifunction mode, although exposure calculation based on data sent from the camera body BD is performed whenever the light-measuring data from camera body BD are renewed unless the memory operation (pressing of the memory key) is performed. When the memory operation is performed, thereafter, the calculation based on the memorized light measuring data is performed, while the data from the camera body BD are just for display. For the light-measuring data thus obtained, exposure calculation will be performed corresponding to the photographing mode set, and control data will be computed. Three kinds of computing methods are available in regard to the programmed mode; a 2/1 weighted programmed mode mathematically $AV = \frac{2}{3} \cdot EV$, $TV = \frac{1}{3} \cdot EV$), which is P1 mode of $BV + SV = EV$ divided at the rate of 2:1 into diaphragm value and exposure time; a P2 mode weighted to 1/1 programmed mode ($AV = \frac{1}{2} \cdot EV$, $TV = \frac{1}{2} \cdot EV$); and a P3 mode weighted to $\frac{1}{2}$ programmed mode ($AV = \frac{1}{3} \cdot EV$, $TV = \frac{2}{3} \cdot EV$). In S mode, AV is calculated by $EV - Tv = AV$ using TV set in the back circuit BCKC, while TV is calculated by $EV - AV = TV$ using AV set in the back circuit BCKC. In M mode, TV and AV set are calculated as control data. If the calculated AV is over AV max, system will compute $EV - AV$ max $= TV$, and if the calculated AV is less than AVo, $EV - AVo = TV$ will be computed, and either of set of TV and AV max or set of TV and AVo, will be taken to be the computed values. Similarly, where $TV < TV$ min, TV min and $EV - TV$ min $= AV$ will be taken to be the computed values, and where $TV > TV$ max, TV max and $EV - TV$ max $= AV$ will be taken as being the computed values. Also, when under the P1, P2, and P3 modes, the diaphragm is controlled by means of the manually set AV1 and AV2 that render the system as being $AV0 < AV1$ and $AV2 < AV$ max.

Further, when under the M/LT mode, it is possible to set exposure time longer than the longest exposure time (TV min) that can be set on the camera body. When such time is set, the bulb data will be sent to camera body BD, causing the camera body to become in the bulb mode, and this period is counted by back circuit BCKC. During this period, signal line BS2 will be rendered Low level to prohibit movement of the second shutter curtain; when the counting has been terminated, BS2 will be rendered high level to have the second shutter curtain move. Note that instead of the bulb display data, the setting-time display data will be sent to the camera body. If the multifunction has not been selected, the exposure control diagram of each mode and the line of EV value are graphically displayed in a graph with diaphragm value on the vertical axis and exposure time on the horizontal axis. Also, if the multifunction has been selected, each memorized values and present value based on the exposure control value will be graphically displayed.

Also, if the bracket function has been selected, the system computes the control value that is shifted by the shifting amount set corresponding to the number of frames based on the computed control value. Note that the graphic display at this time shall be made to indicate the present position of photographic operation by means of a bar graph. The details of displays by the above exposure functions will be described below.

Further, when the charge completion signal is detected in the back circuit BCKC from the data of the flash device that have been input via the camera body, the back circuit will not perform the above computational displays, but TV and AV from camera body BD are displayed, and these data will be used as the control data. This is because a mechanism with fairly advanced functions is used for the computations for flash photography (#53 step) in the camera body as shown in the U.S. Pat. Nos. 4,509,842 and 4,550,996; no specific computations for flash photography in the back circuit BCKC are necessary. Note that an alternative is, for example, to cope with the camera body that has no function for flash photography as previously described. The back circuit may be designed so that it can perform the same computations as those performed in #53 step. When the charge completion signal has been input and if the exposure function has been selected, the flashing function will be automatically selected to perform computations corresponding to the exposure setting mode for sending the control data to the camera body. Another alternative is to prepare a set of exposure calculations combining the multifunction, the bracket function, and the flash function so that the results of these operations can be sent to the camera body BD.

When sufficient time has elapsed to complete these computations, micon BMC will shift to #62 step, rendering signal line BIO Low level to perform serial input and output operation, and read the data from back circuit BCKC. Among these data, the first byte data are control exposure time data (when under the M/LT mode, it indicates a bulb); the second byte data are diaphragm data for control and display; the third byte data are exposure time data for display (when under the M/LT mode, it is exposure setting time); the fourth byte data are the exposure mode set at back circuit (The P mode comprises P1 mode, P2 mode, and P3 mode, the M mode comprises M and M/LT modes, and the meter light measuring mode under an external function). In addition, there are the data indicating that the first or second byte data is limited to marginal value because EV is over or under a predetermined proper range (warning data), and the data that prohibit the exposure control operation (release prohibition data) and so on. When the data reading of these four bytes have been completed, the micon BMC will render signal lines CSB and BIO High level, and the read TV and AV is set as the controlled data at #63 step. Then, whether the release prohibition data have been read will be judged at #64 step, if it has been read, and flag RLEF will be set at 1 at #65 step; if not, flag RLEF will be reset at 0 at #66 step, and the operation will shift to #70 step.

At #70 step, an exposure mode will be displayed (when under the meter light measuring mode, use the M mode) in accordance with the data of the mode read, and at #71 step, whether the warning data has been read is judged. If the data have been read, a warning display will be made at #72 step; if not, this warning display will not be made at #73 step, and the operation will shift to #74 step. At #74 step, whether the meter light measuring mode is average light measuring mode or partial light measuring mode is displayed. At #75 step, both control exposure time and aperture value are displayed. Note that if extended exposure time data are being sent from back circuit BCKC, the bulb data will be sent for the purpose of control. These extended exposure data will be displayed, they are sent for this purpose. Next, at #76 step, the film sensitivity and the exposure correction amount (overlay) will be displayed, and subsequently, the camera will display whether flash photography will be performed based on the data sent from the flash device FL. Next, at #78 step, signal line CSF will be rendered Low level, and a pulse with the second time width will be output to signal line FMO. If the flash device FL receives this pulse, the device FL is ready to read the data. In micon BMC, the first byte consists of control aperture value and exposure control mode, the second byte consists of the data (SV+CV), which is the sum total of the film sensitivity SV and exposure correction amount (overlay) CV, and the third byte consists of the focal distance data fv of the interchangeable lens are outputted to the flash device FL. The use of the data is as described above.

Upon completion of these operations, whether at least one of the switches S1, S2, SMO, SIS, SOR, ST, and SA has been turned ON is judged at #79 step. When even one of these switches is found to have been turned ON, the micon BMC reset and start a timer included therein, and operation returns to #2 step for repeating the aforementioned operations. On the other hand, if all of the above switches are OFF, whether the timer counting time (10 sec) that started at #80 step has terminated is judged at #84 step. If not, the camera operation will return to #2 step again. In the meantime, when all the above switches have been turned OFF and 10 seconds have elapsed, the operation will move to #85 step. At 85 step, the interruption of interruption terminal INT will be permitted, flags RLEF and BCKF are reset at 0 at #86 step, display made reset to OFF at step #87, power-supplying transister BT turned OFF at step #88, and micon BMC inactivated.

When the back ICP is judged not to be "80H" at #57 step, flag BCKF will be reset at 0 at #58 step, and the operation will move to #90 step in FIG. 3(b). At #90 step, receiver REC reads the exposure control data from meter MET, and whether the camera body BD has read these data is judged. When the camera body has read these data, the operation will shift to #91 step, if it has not, it will shift to #100 step. At #91 step, with respect to the read data from meter MET, the range of aperture value will be limited to between the maximum aperture value and the minimum F number, and the range of exposure time in the ambient light photography mode is limited to between the shortest and longest exposure time. In the flash photography mode, the range of exposure time will be limited to between the synchronizing limit exposure time and the longest exposure time. The data from meter MET thus determined are set as control values, namely the M mode as the exposure control mode and the meter light measuring mode as the light measuring mode are indicated at #92 and #93 steps, the operation will then proceed to #105 step. On the other hand, at #90 step, when the data from meter MET has not been read, the data computed at #53 step or #54 step are set at the control data at #100 step. Note that the control aperture value settings at #63, #92, and #100 steps correspond to diaphragm stopping down setting (AV−AVo). At #101 step, the exposure control mode of camera body BD is displayed, and further, the light measuring mode is displayed at #102 step, and the operation will shift to #105 step. When the control data have been limited to the marginal data, the warning display will be turned ON at #106 step; if not, the warning display will be turned OFF at #107 step. Then, flag RLEF set at 1 at #108 step, and the operation will shift to #75 step in FIG. 2(c).

Figure 3A:
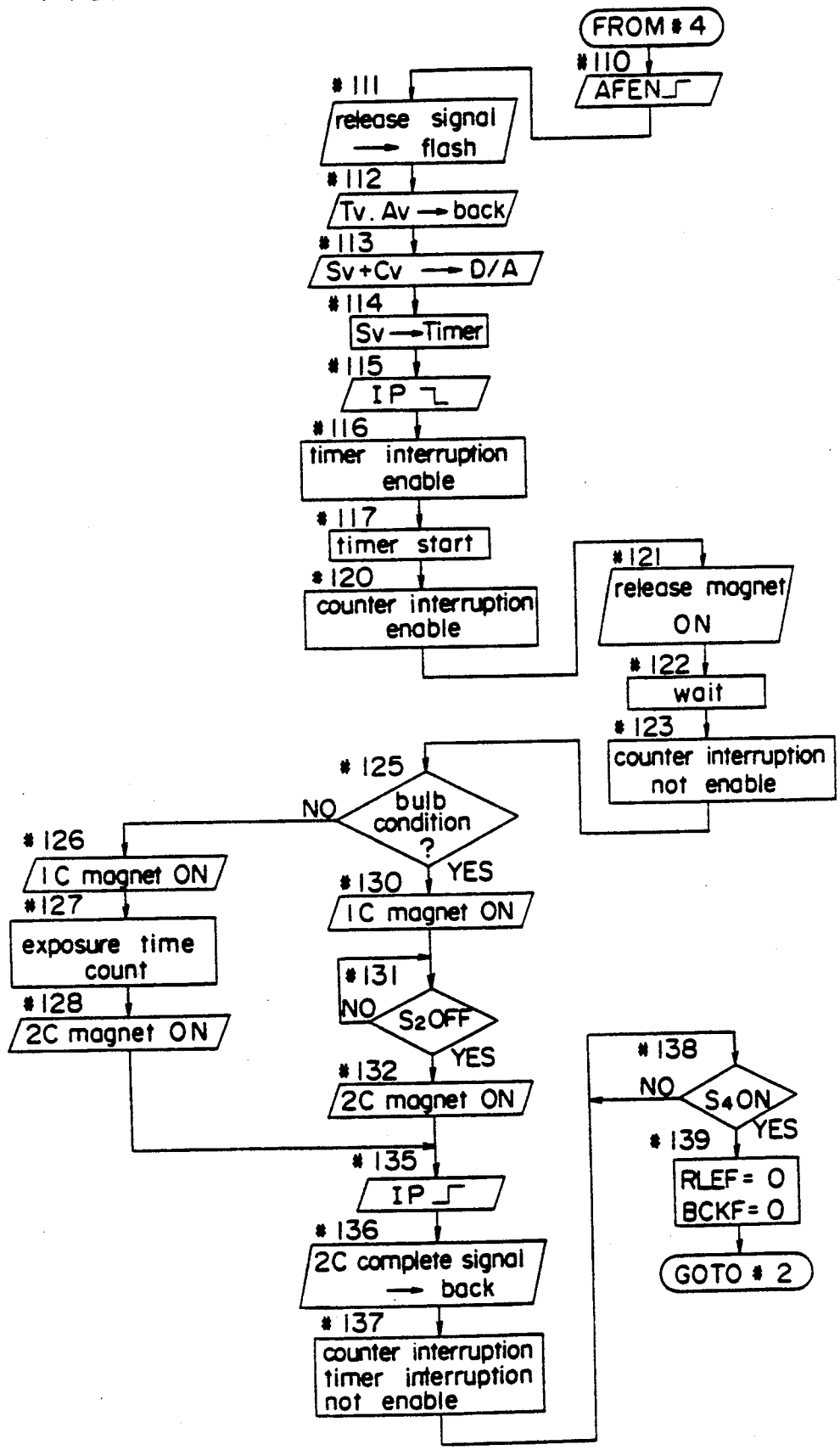
Figure 3:
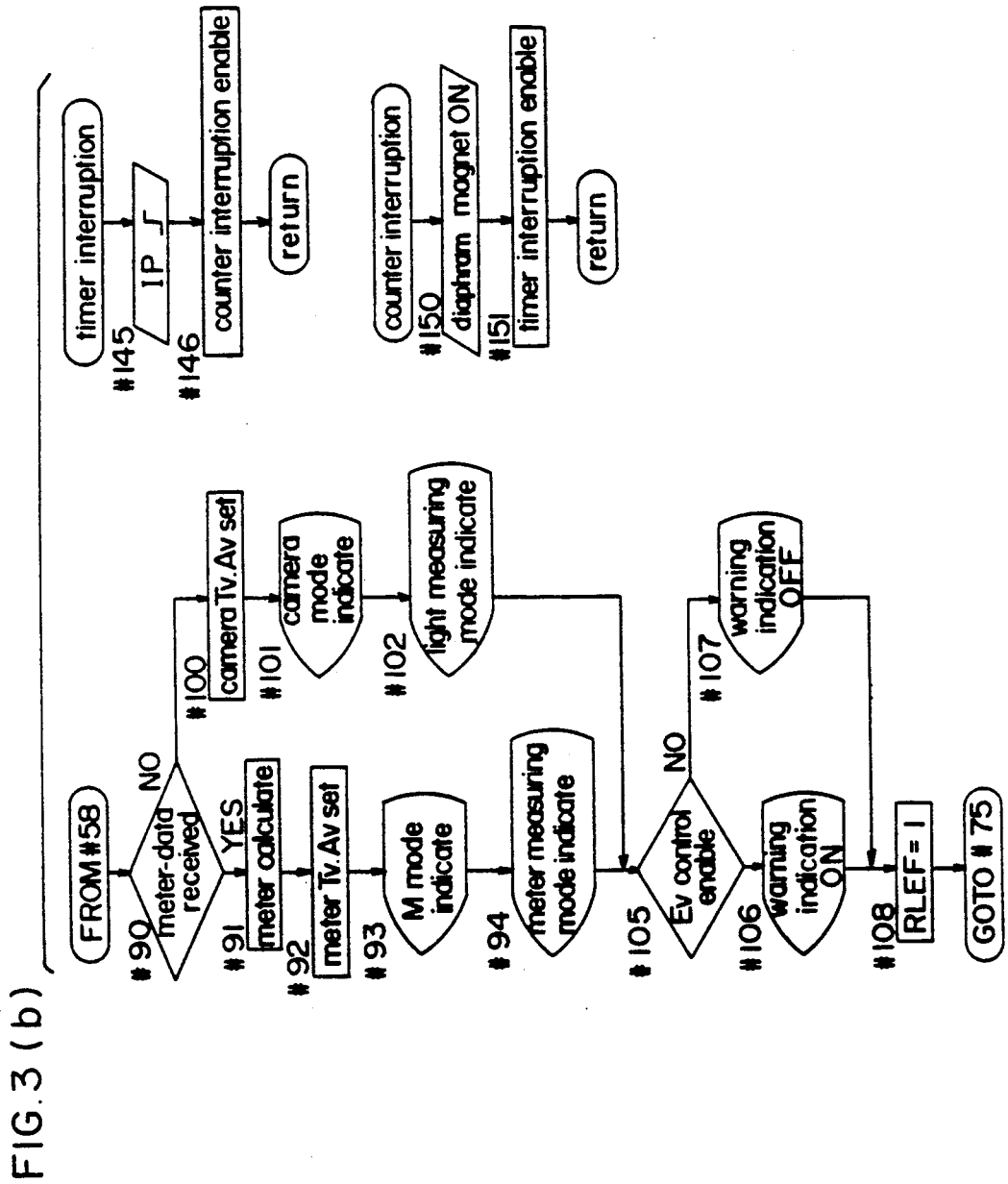

At #2 step, when input port IP1 is rendered to be Low level, and if switch S4 is OFF at #3 step, and flag RLEF is 1 at #4 step, the camera will perform the exposure control operation from #110 step in FIG. 3(a). First, at #110 step, signal line AFE will be rendered High level causing automatic focusing circuit AFC to stop, and then micon BMC transmits the release signal to flash device FL. This operation will render signal line CSF Low level, output a pulse with the third time width to signal line FMO, and render signal line CSF High level again. When flash device FL has judged that this pulse with the third time width has been input, the device FL becomes the light-emitting mode for flash photography. Next, signal line CSB will be rendered Low level, and the control exposure time data and control aperture value data are sent to back circuit BCKC at #112 step. These data are used as printing data at back circuit BCKC, and when these data are input, if the printing function has been selected by the back circuit, the printing operation will start. Among the printing functions are, control data printing mode; year/month/date printing mode; month/day/year printing mode; day/month/time printing mode; month/day/time printing mode; day/time/minute printing mode; time/minute/second printing mode; count-up printing mode; count-down printing mode; and fixed data printing mode. When under the control data printing mode, the control data (only when the exposure function has been selected) computed in back circuit BCKC, or the control data being sent from camera body BD at #112 step, will be printed. When one of the year/month/day printing mode, month/day/year printing mode, day/month/year printing mode, month/day/time printing mode, day/time/minute printing mode, and time/minute/second printing mode is selected, the data of mode name from the calendar circuit of back circuit BCKC in the specified order of the mode name will be printed. In the count-up printing mode or count-down printing mode the numerical value will be printed, which was determined by adding 1 to the preset fixed value at each shooting or by subtracting 1 from it. In the fixed data printing mode the present numerical value will be printed.

Micon BMC subsequently renders signal lines CSA and ADMO Low level at #113 step and sends the data (SV+CV), the sum total of the film sensitivity and exposure correction amount to A-D/D-A conversion circuit ADA. When circuit ADA has read these data of SV+CS, the digital data SV+CV is converted to analog signals to subsequently output them into flash light amount control circuit FLM. Next, the camera sets the film sensivity on the timer to control the printing time at #114 step, and at #115 step, it will activate the printing operation of the data-printing device that is capable of judging to start data printing like back circuit BCKC, but it is provided with no printing time control function. Subsequently, it will permit the interruption by means of the time at #116 step and will also permit the timer to start counting at #117 step. Then, micon BMC permits the count interruption at #120 step, and outputs a low pulse to signal line RL for activating the release magnet at #121 step, causing the diaphragm stopping down and mirror-up operations to start. The camera will wait for sufficient time for mirror-up operation to complete at #122 step. During this period, the pulses from aperture pulse output circuit APG are input into the clock input terminal CKIN, and the diaphragm stopping down value preset in the down counter will be subtracted at each pulse input. When the contents of the counter become zero, the counter interruption is activated, and the operation at #150 step shown in FIG. 3(b) will be performed. At this step, a low-level pulse is output to signal line AP2 for activating the diaphram magnet causing diaphragm stopping down operation to stop.

The micon BMC then permits the timer interruption at #151 step and subsequently returns to the main routine. Also, when an interchangeable lens incapable of diaphragm control is mounted, or when no interchangeable lens is mounted, the counter interruption may not work. Therefore, if a certain time has elapsed at #122 step, the system will shift to #123 step, thereby making the counter interruption impossible, and subsequently will shift to #125 step.

At #125 step, whether the exposure control time data is the bulb is judged. If it is not, the operation will shift to #126 step. At #126 step, a low-level pulse will be output to signal line 1C for activating the first shutter curtain magnet to start the traveling of the first shutter curtain. Next, the exposure time is counted at #127 step, and when the counting has been terminated, a low-level pulse will be output to signal line 2C. Then the second shutter cutain magnet is activated causing the traveling of the second shutter curtain to start at #128 step, and the operation will shift to #135 step. When the bulb condition is detected at #125 step, the operation will shift to #130 step, causing the traveling of the first shutter curtain to start. The system then waits for the input signal to input port IP1 to become High level. At this time, if back circuit BCKC has not been attached, the system will wait for turning OFF of switch S2 by releasing the release button. When switch S2 has been turned OFF at #131 step, the second shutter curtain starts traveling. Conversely, when the back lid having back circuit BCKC is mounted on the camera body BD, and if the M/LT mode has been selected, the back circuit BCKC may have started time counting from when signal line IP has become Low level causing signal line BS2 to become Low level. When the counting by back circuit BCKC has terminated, signal line BS2 will be rendered High level, and the camera body BD will start the movement of the second shutter curtain upon receiving this signal. Thus, when under the M/LT mode, the back circuit BCKC starts counting the exposure time upon receiving the input signal from camera body BD via signal line IP instead of when the first shutter curtain has started the traveling. Furthermore, although it is not a precision exposure time control because the control is made with 1 second at its minimum unit, a fairly long over-all exposure time does not affect the size of exposure error.

Normally, before step #135, the timer counting corresponding to the film sensitivity may have terminated. When the timer counting has terminated, the timer interruption may start working, rendering signal line IP High level at #145 step shown in FIG. 3(b), causing the printing operation to stop and permitting the counter interruption at #146 step; subsequently, the operation will return to the main routine. At #135 step, when the exposure time is set at the shorter time, signal line IP will sometimes remain at Low level even after the second shutter curtain traveling has started. Therefore, to forcibly stop the printing operation (to prevent the printing operation during film winding), the system will operate to render signal line IP High level. Also, at #136 step, to stop the printing operation in back circuit BCKC, a low-level pulse with a certain time width will be output to signal line CSB, and back circuit BCKC will stop the printing operation when it has received this pulse from signal line CSB. Then the camera will make itself reject the counter interruption and timer interruption and waits for the completion of second shutter curtain traveling causing switch S4 to become turned ON at #137 step. When switch S4 has been turned ON at #138 step flags RLEF and BCKF are set at 0 at #139 step, and the operation will return to #2 step and will perform the operation mentioned above.

When the continuous photographing mode, such as interval function and bracket function have been selected in back-circuit BCKC, the low-level signal remains being input in signal line BS2. Even during film winding, the above exposure control preparation will be continued, and when the film winding has been completed and switch S4 has become turned OFF, the next exposure control operation will be promptly performed. Also, even when release switch S2 remains turned ON, such continuous photographing will be performed.

When camera body BD is activated by means of the signal from the signal line BS1 of back-circuit BCKC, the camera will not perform the automatic focusing operation. The camera may be designed in such a way that pulses with different widths are used to start the charging-up of flash device FL and to start back-circuit BCKC through key manipulation, and when back-circuit BCKC is operated through key manipulation, the automatic focusing operation may be performed. Besides these devices buzzers and other devices to warn of camera vibration is not operating when the system is started through the key manipulation of back-circuit BCKC but operating when the system is started by means of light-measuring switch S1. Also, to judge which starting signal is used by micon BMC, the signals from the back circuit BCKC are made to have less than a certain fixed time width. If these pulses are designed to enter a separate input port, such a measure to restrict the pulse width may become unnecessary.

Note that in back-circuit BCKC, only when in the M/LT mode, the exposure time control for a longer period than the longest exposure time of the camera body is possible. If, however, the exposure function has been selected, extended exposure time control can be made possible in any mode, and further, even when the external function has been selected, extended exposure time control can be made possible.

Also, this camera is designed to send the starting signal to camera body BD one minute before the start of one group of interval photographing operation so that the charge-up of flash device FL can be started through the data giving and receiving between camera body BD and flashing device FL. However, since the flash device keeps its charge-up condition for 15 minutes after it has started the charge-up operation, in many cases the charge-up condition continues even after the shootings of one group has been completed. If the intervals between groups are extremely long, the charge-up after the termination of the shootings of one group will become useless, resulting in waste of battery power. This can be eliminated through the following measures. When the shootings of one group has been terminated, the data indicating this will be sent from back-circuit BCKC to the camera body (for example, the lowest bit of back ICP is set at 1). When camera body BD has received these data, it will send the charge prohibition signal to flash device FL (among three-byte data to be sent to the flash device FL use the vacant bit or use the fourth byte). The flash device FL will stop the charge operation when it has received these data input.

Next, the relations between the functions and displays of back BCK and detailed explanation of back-circuit BCKC will be described.

Figure 4:
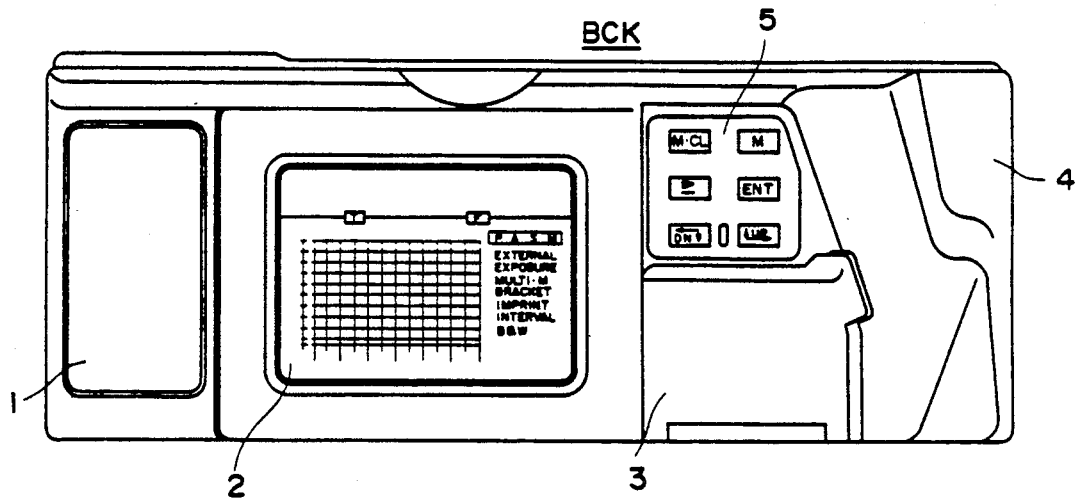
FIGS. 4 and 5 are the exterior appearances of the camera back BCK.

FIG. 4 shows the exterior view of back BCK. Numeral 1 is a battery cover of the battery room section and numeral 2 the external display section, and the illustration shows the non-operating state. Numeral 3 is a key cover to protect part of the keys of the operating key section. Numeral 4 shows the grip section, and numeral 5 the operating key section.

Figure 5:
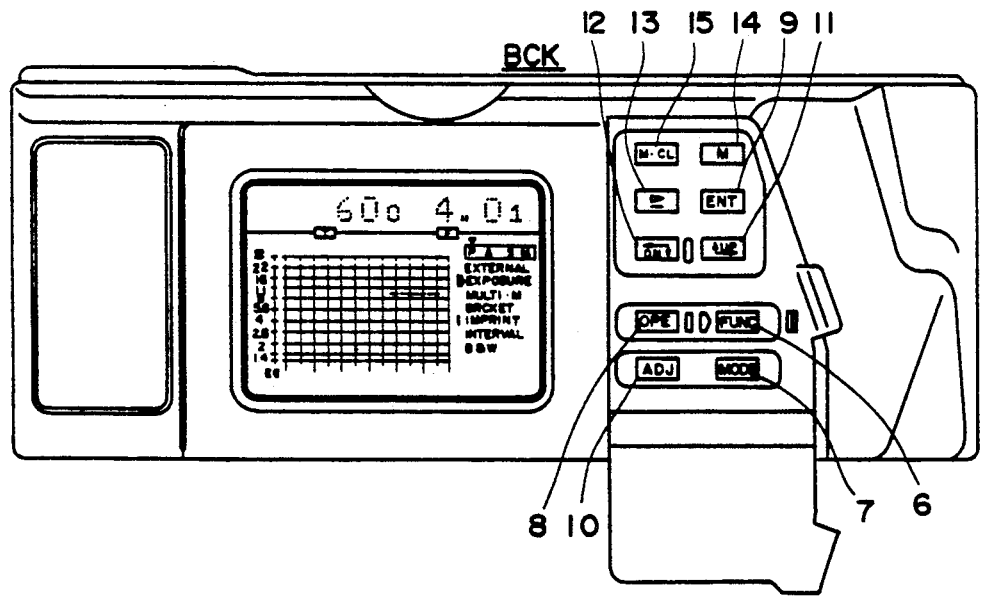

FIG. 5 shows when the external display section is operating with the key cover 3 opened. Next, the function of each key is described. Numeral 6 is the function key for selecting each function. Numeral 7 is the mode key for selecting the mode in each function. Numeral 8 is the operation key for switching between execution and nonexecution of each function. Numeral 9 is the enter key that sequentially changes the external display 10 is the adjust key that changes the external display from control status to numerical value setting status or from numerical value setting status to control status. Numeral 11 is the up key, and numeral 12 the down key, and both change numerical value in each mode and shift each program line. Numeral 13 is the cursor key that sequentially sends each digit to be changed when changing numerical value in each mode. Numeral 14 is the memory key used for taking in the light measuring data from the camera. Numeral 15 is the memory clear key that clears all light measuring data taken in by means of the memory key.

Figure 6:
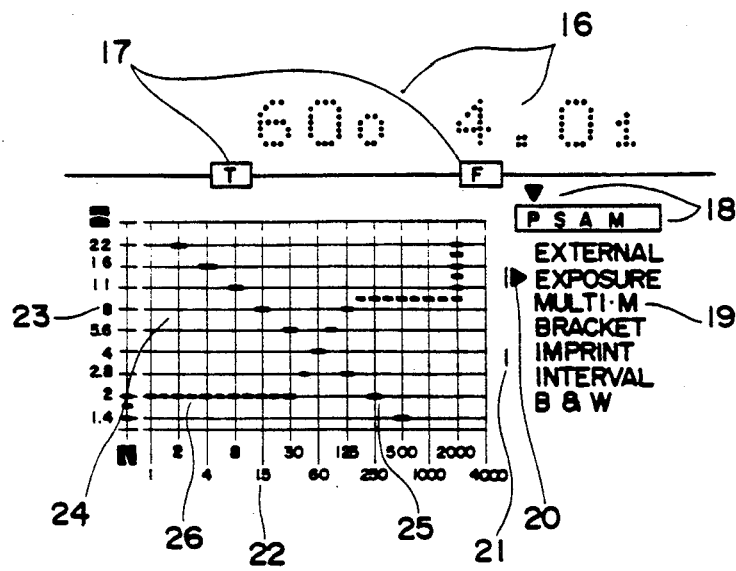
FIG. 6 is an example of indicator section 2 under P1 mode.

FIG. 6 shoes the indication on external display section 2 when the back circuit BCKC is operating, the P1 mode of the exposure function is displayed. Each display portions will be described. Numeral 16 is the character display portion using a 10-digit liquid crystal display of 5×7 dots and displays the shutter speed value, aperture value, mode name, and the messages related to operating procedure. Numeral 17 shows the display portion of the shutter speed value T and aperture value F. Numeral 18 displays the mode selected in the exposure function. Numeral 19 shows each function name, and whenever function key 6 is depressed, the display will be changed as EXPOSURE→MULTI.M→ BRACKET→IMPRINT→INTERVAL→B&-W→EXPOSURE→- - - . When the exposure function has not been executed, it is impossible to select the multi-function and the bracket function by jumping over MULTI.M, and BRACKET. Also, the EXTERNAL function can be executed only when the exposure function is being executed, and if the control data from meter MET through camera body BD has been input, the selection by means of the function key is impossible. Numeral 20 is the mark that shows the selected function in the external display section. Numeral 21 is the mark that shows each function is being executed. Numeral 22 is an index indicating the shutter speed value and numeral 23 is an index indicating the aperture value. When the shutter speed value is less than two seconds and the aperture value is more than F32, they will be indicated by the "◼◀" mark. Numeral 24 is the graphic display portion, and numeral 25 shows the light measuring line, and hereafter is called the EV line because it shows an equal EV value. Numeral 26 shows the 2/1 slope P1 mode that is a high-speed program in the programmed lines. The maximum aperture setting is controlled to F/1.4 and the minimum aperture setting is controlled to F/22 depending on lens mounted on camera body, and an optional aperture limiting is being performed between F/2 and middle of F/8 and F/11. In the character display portion 16, small numerals show ⅓ EV unit and indicate the control point of (1/60, F/4+⅓ EV) that is an intersecting point of the programmed line and the EV line.

Figure 7:
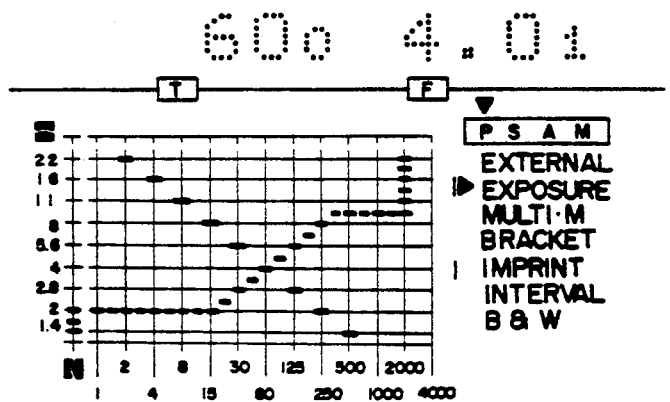
FIG. 7 is an example under P2 mode.
Figure 8:
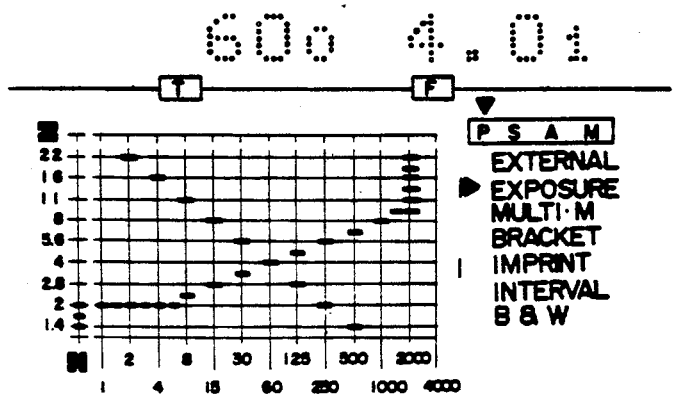
FIG. 8 is an example under P3 mode.

FIG. 7 shows the P2 mode with a 1/1 slope programmed line, and FIG. 8 shows the P3 mode with a ½ slope programmed line. As seen from these diagram, when under the P1 and P3 mode, the dots are graphically displayed in a straight line with its F value side made to 1 EV pitch or its exposure time side made to 1 EV pitch. Table 1 shows the changes of each functions and modes. The modes in a double frame are those that need to be initialized when the camera is reset upon the replacement of the battery. Next, the operating procedure of each function at each mode is described.

Figure 9:
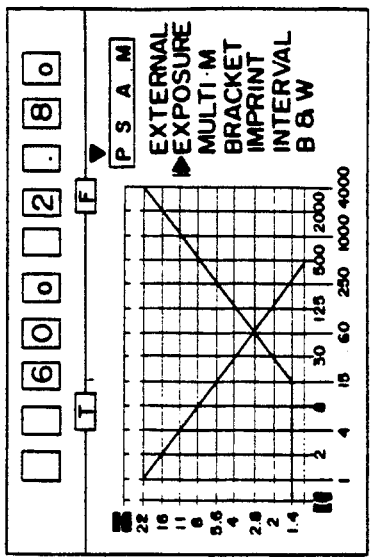
FIGS. 9, 10, 11, 12, 13, 14, 15, 16, 17 and 18 are diagrams showing typical relationships between key manipulations and indications under P mode.
Figure 10:
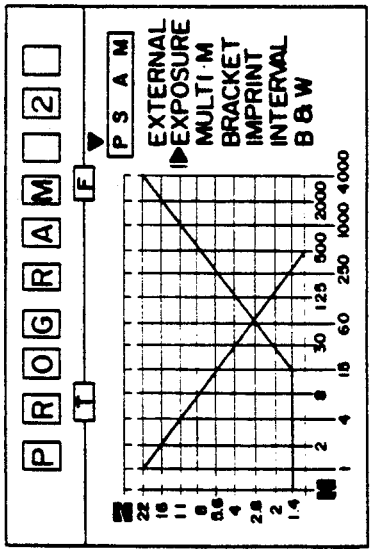
Figure 11:
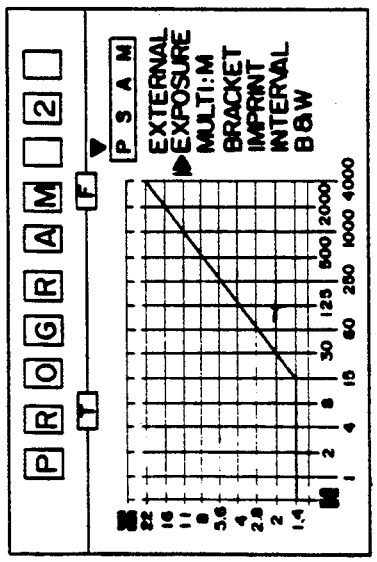
Figure 12:
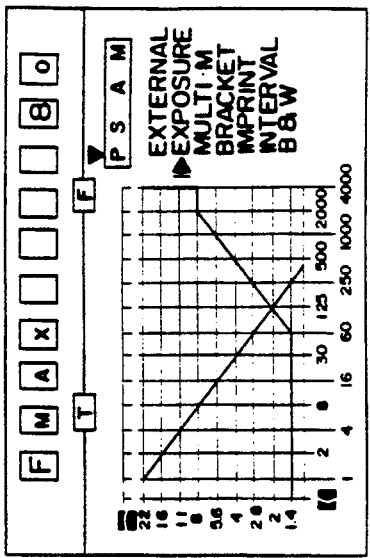
Figure 13:
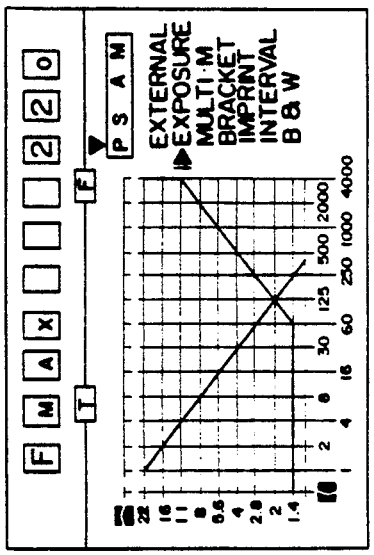
Figure 14:
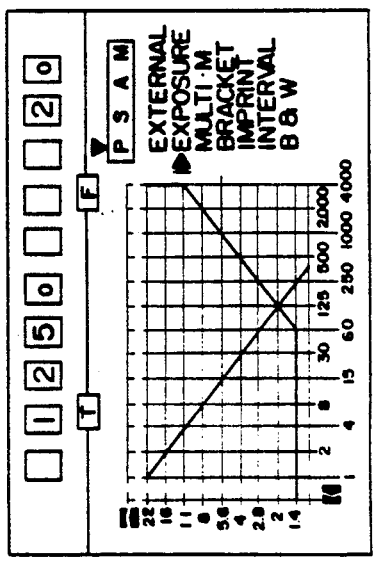
Figure 17:
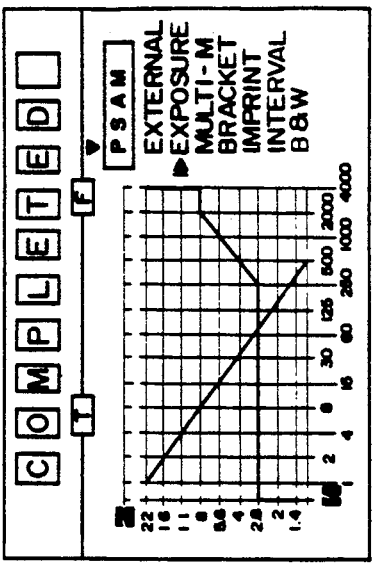
Figure 16:
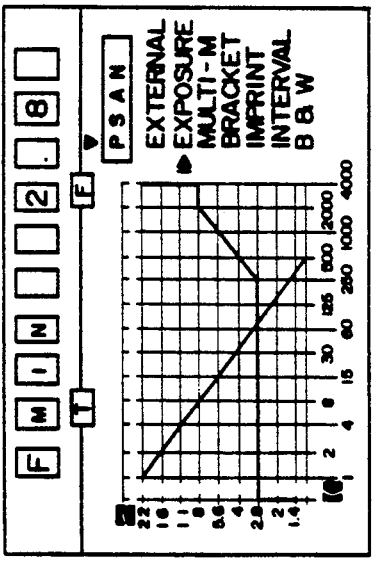
Figure 15:
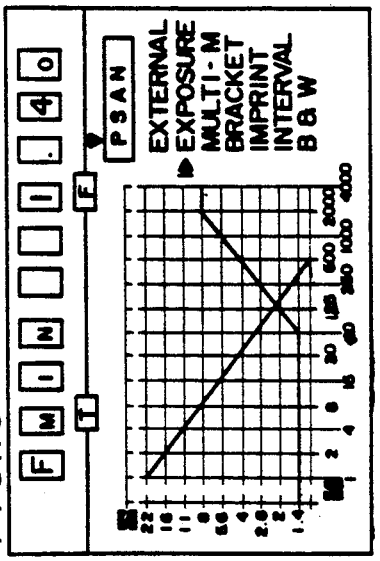
Figure 18:
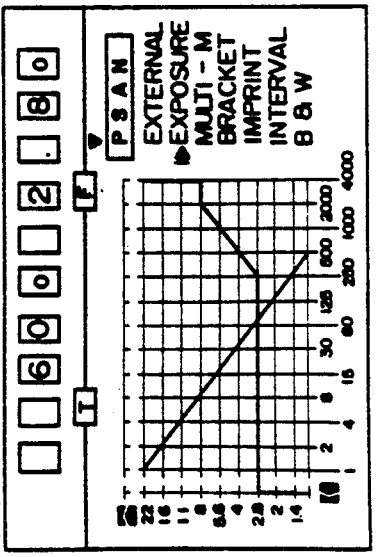

FIG. 9 shows the condition under the P2 mode of the exposure function. The "▶" mark 20 is shifted to select "EXPOSURE" by activation of function key 6, and next, mode key 7 is operated to display the mode name "PROGRAM 2" on the character display portion 16 for setting the P2 mode. At this time, the "▼" mark is shifted to above the "P" in mode display portion 18. In the graphic display 24, the programmed line 26 is restricted to the camera's shutter speed controllable range between 1/4,000 sec and 1/15 sec and to the lens' controllable range between F/1.4 and F/22. Also, the inclined section of the programmed line passes through the point of 1/250 sec and F/5.6 according to the initialization. Next, if OPE key 8 is depressed, the exposure function will be activated, the "◼" mark 21 is indicated as illustrated in FIG. 10, EV line 25 is also indicated. Next, if ENT key 9 is depressed, the mode name display of "PROGRAM 2" is changed in display portion 18 to a control display (hereafter referred to as "OUTPUT display") as shown in FIG. 11. The shutter speed value of 1/60 sec and the aperture value F/2.8 which is the intersecting point of the programmed line and the EV line is indicated on the character display portion 16 (FIG. 11). In the OUTPUT display, the inclined section of the programmed line 26 can be shifted by means of UP key 11 and DOWN key 12. FIG. 12 shows a state when the inclined section of the programmed line has been shifted to the right by means of UP key 11. Next, if ADJ key 10 is depressed, the mode of the display portion 16 will be changed as shown in FIG. 1 to the setting display (hereafter referred to as "INPUT display"), and the back BCK will inquire about the FMAX value shown. In FIG. 13, the FMAX value is F/22 according to initialization. If the FMAX value is lowered to F/8 by means of DOWN key 12, as shown in FIG. 14, the inclined section of the programmed line 26 stops at F 8, and restriction is applied to the programmed line. When the FMAX value setting has been completed, the operation will proceed to FMIN by means of ENT key 9. In FIG. 15, the character display portion 16 is changed to show the FMIN value setting. According to the initialization, F/1.4 is displayed as FMIN. Change the FMIN value is performed by means of UP key 11. FIG. 16 shows a state in which F/2.8 has been set. Next, if ENT key 9 is depressed, the character display portion 16 displays "COMPLETED" to indicate the completion of setting. When the aforementioned completion display appears, the display portion 16 can be changed to the OUTPUT display by means of the ADJ key, and the camera's control values are indicated on the character display portion 16 (FIG. 18).

Figure 20:
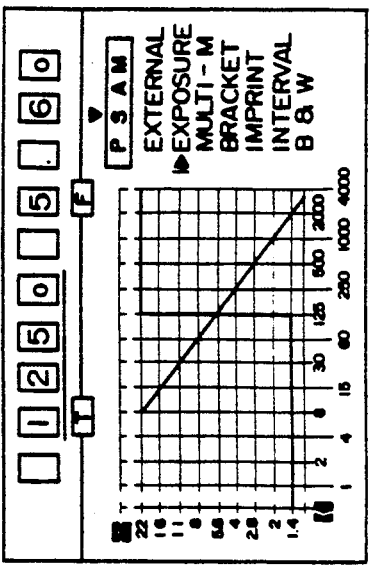
Figure 19:
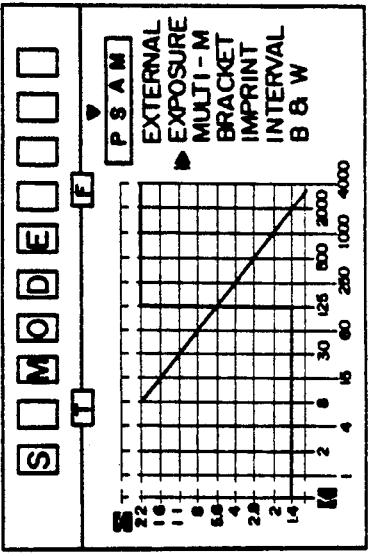

Next, the S mode (shutter speed priority mode) of exposure function is described. When the S mode is selected (with "S MODE" displayed on the character display portion 16) by means by mode key 7, a display will be made as shown in FIG. 19. Here, the camera is ready to be operated by means of OPE key 8. (Also, the program is subject to restriction at F/1.4 and F/22 depending on the lens). When the display is changed to the "OUTPUT display", an underline (cursor) appears in the shutter speed display part 17 of character display portion 16 (FIG. 20). The underline indicates that the numerical value displayed can be changed by means of UP key 11 or DOWN key 12. If the numerical value is changed from 1/125 sec to 1/500 sec by means of UP key 11, the display becomes as illustrated in FIG. 21. At the same time, the aperture value display is changed to be an optimum exposure value.

Next, the A mode of (aperture priority mode) exposure function is described. When the A mode is selected (with "A MODE" displayed on the character display portion 16), a display will be made as shown in FIG. 22. The camera is ready to be operated by means of OPE key 8. Also, the program is subject to restriction at 30 sec (the " ■◀ " display section) and 1/4,000 sec depending on the camera. When the display is changed to the "OUTPUT display" by means of ENT key 9, an underline will be displayed on the aperture value display part of character display portion 16 showing that the numerical value displayed can be changed (FIG. 23). If F/5.6 is changed to F/11+2/4 EV by means of UP key 11, the display becomes as shown in FIG. 24. Simultaneously, the shutter speed value display is also changed for an optimum exposure value.

Next, the M mode (manual mode) of exposure function is described. When the M mode is selected (with "M MODE" displayed on the character display portion 16), display is made as shown in FIG. 25. The camera is ready to be operated by means of OPE key 8. Also, the program is subject to restriction with respect to the shutter speed and aperture value depending on the camera and lens. When the display is changed to the OUTPUT by means of ENT key 9, the display state becomes as shown in FIG. 26. At this time, an underline will appear on the shutter speed value display part 13 indicating that the numerical values displayed can be changed (FIG. 26). If 1/250 sec is changed to 1/1000 sec by means of UP key 11, the display state becomes as shown in FIG. 27. Next, if the underline (cursor) is shifted to the aperture value display part 17 by means of cursor key 13, shown in FIG. 29, and F/5,6 is changed to F/2.8+2/4 EV by means of DOWN key 12, the display state becomes as shown in FIG. 29. If cursor key 13 is manipulated again, the underline will be moved back to the shutter speed value display part 17, and the shutter speed will again become ready to be changed.

Figure 33:
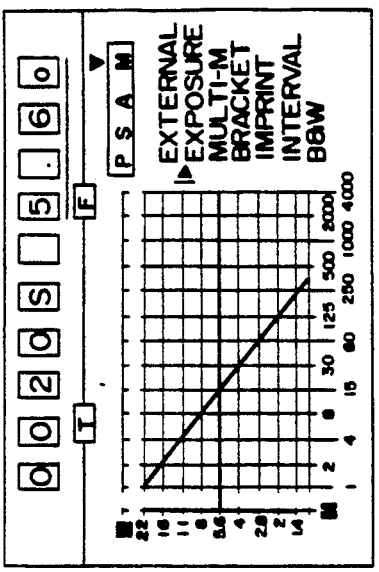
Figure 34:
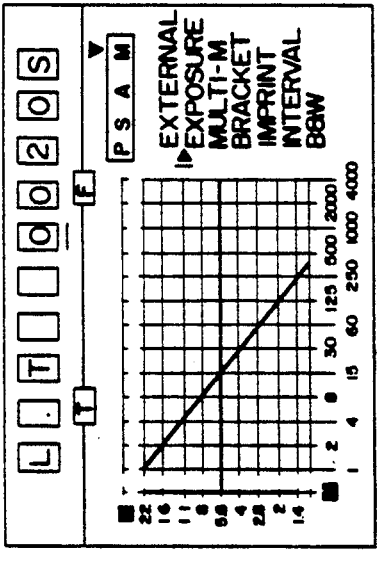
Figure 35:
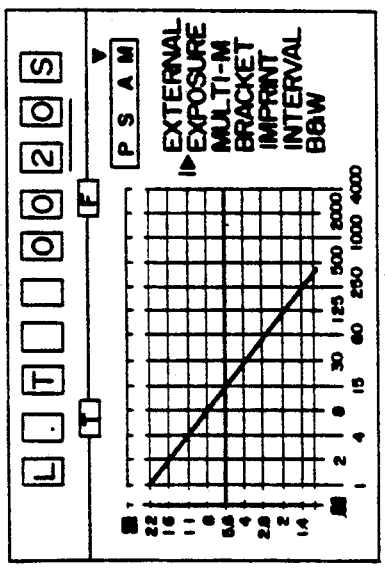

Next, the long time mode of exposure function is described. If the long time mode is selected (with "M MODE/L.T" displayed on the character display portion 16), display is made as shown in FIG. 30. The camera will become ready to be operated by means of OPE key 8. If the display is changed to the "OUTPUT display", the display becomes as shown in FIG. 31. The underline is placed at the aperture value display part 17 indicating that the aperture value can be changed. Cursor key 13 is, however, invalid, and the shutter speed value (long time) cannot be changed under the "OUTPUT display". Nevertheless, if the display is changed to the "INPUT display" by operation of ADJ key 10, as shown in FIG. 32, the shutter speed value becomes ready to be set. The shutter speed value (long time) setting range is from 10 sec to 9990 sec, and can be set in 10-sec units. The underline (cursor) is first set at the 1000 digit, and subsequently shifts to the 100 digit, 10 digit and one digit, and then to the 1000 digit again. All numerical value changes are performed by means of UP key 11 or DOWN key 12 (FIGS. 33 and 34). When the shutter speed value (long time) setting has completed, the display is changed to the "OUTPUT display" again by means of ADJ key 10. The camera control values are then displayed on the character display portion 16 (FIG. 35).

Figure 36:
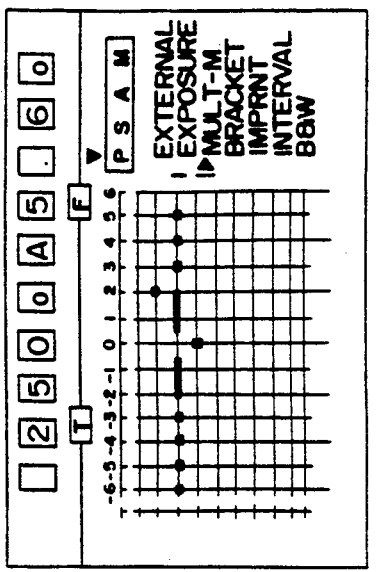
FIGS. 36, 37, 38, 39, 40, and 41 are diagrams showing relationships between key manipulations and indications under multiaction average mode.
Figure 37:
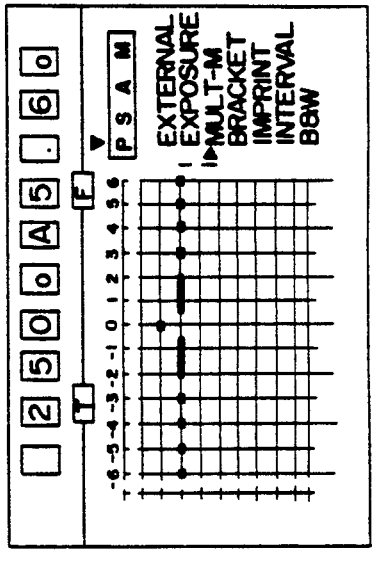
Figure 38:
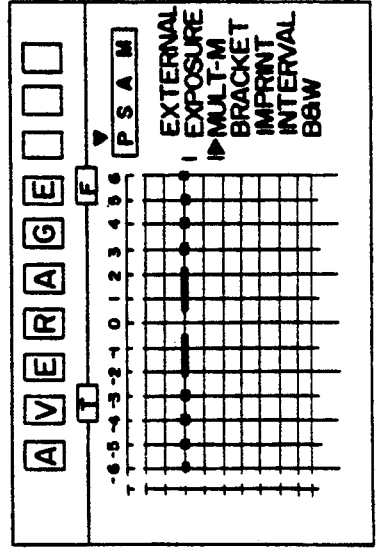
Figure 39:
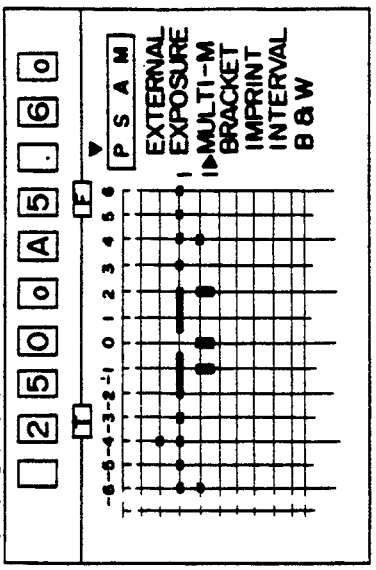
Figure 40:
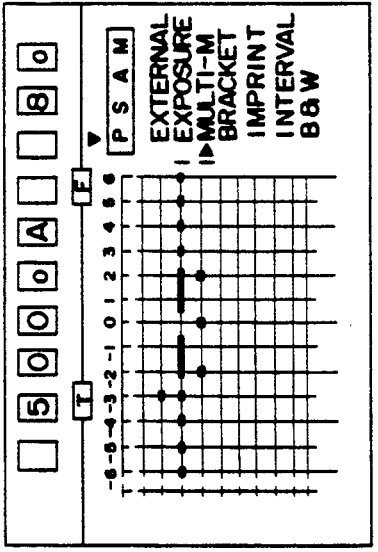
Figure 41:
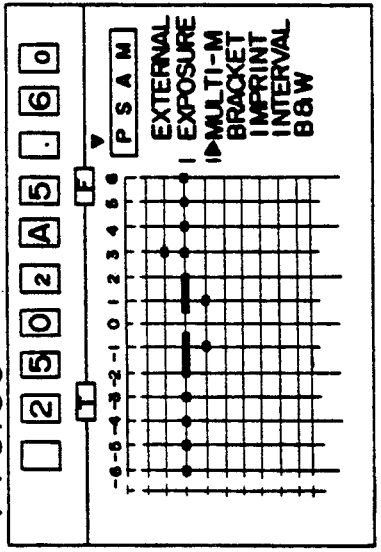
Figure 42:
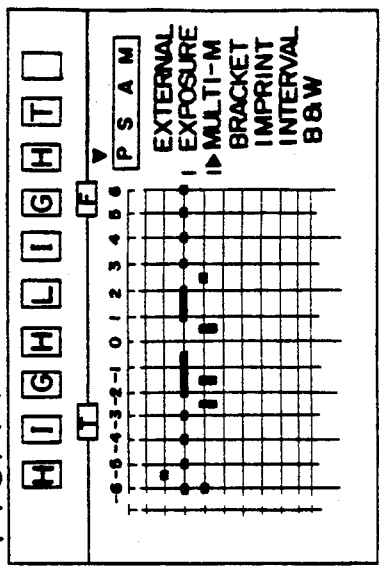
FIGS. 42 and 43 are diagrams showing relationships between key operations and indications under multifunction center mode.
Figure 43:
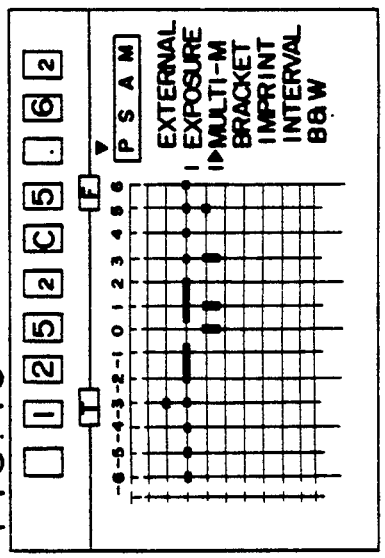
Figure 44:
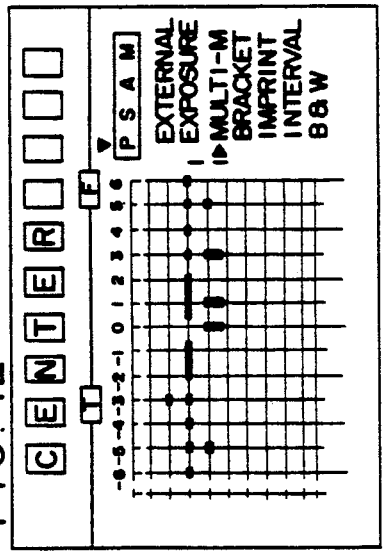
FIGS. 44 and 45 are diagrams showing relationships between key operations and indications under multifunction highlight mode.
Figure 45:
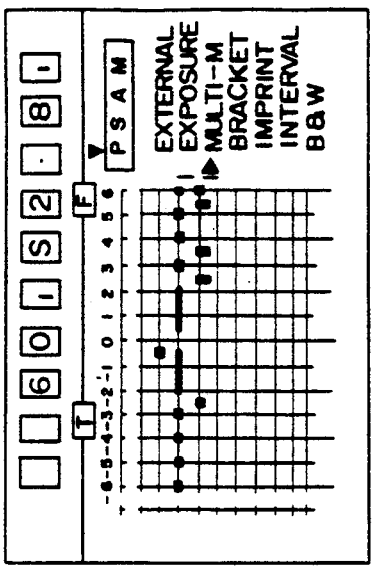
Figure 46:
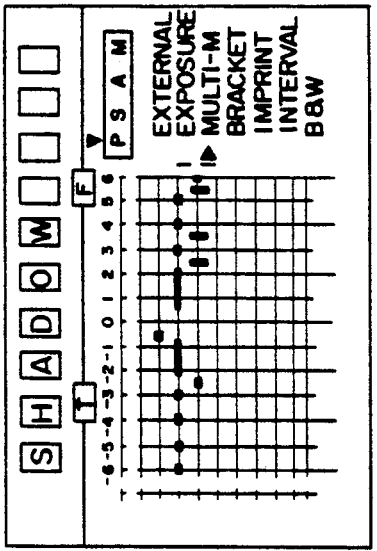
FIGS. 46 and 47 are diagrams showing relationships between key manipualtions and indications under multifunction shadow mode.
Figure 47:
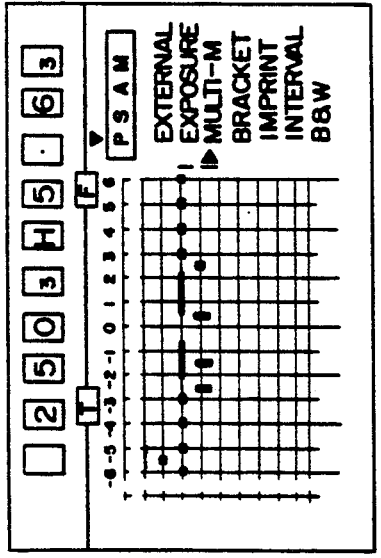
Figure 48:
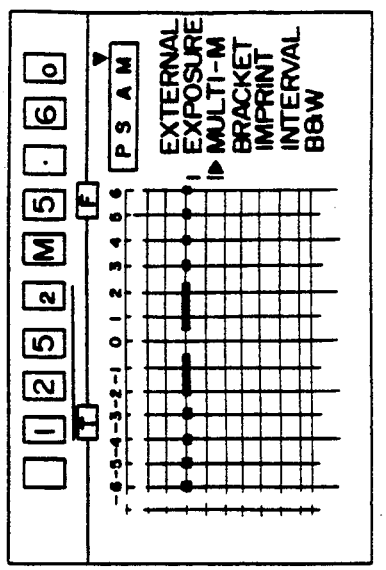
FIG. 48 is a diagram showing relationships between key manipulation and indication when the system has returned to average mode.

Next, the average mode that performs the average calculation of MULTI.M (multi-metering) function is described. This MULTI.M function can be set by means of FUNC key 6 when exposure function is being executed. While the exposure function is being executed, MULTI.M function can be selected by means of FUNC key 6, and the average mode is set with the mode name "AVERAGE" displayed as shown in FIG. 36 on the character display portion 16. Here, the P mode is indicated by the mode display 18 as the mode of exposure function. Exposure function is ready to be operated by means of OPE key 8, and the light measuring value is ready to be taken in by means of M key 14. On the upper part of the graphic display 24, an index is displayed on the LCD that indicates the controllable range: −6(EV) to 6(EV). Also on the graphic display section 24, index marks (" ■■ ■■ ") which show the deviation width of highlight calculation and shadow calculation are displayed, and other index marks ("■■■■") which indicate the controllable range are displayed on the left side and right side respectively. As shown in FIG. 37, the one-point index mark ("■") at a stage higher than the other indices, is displayed for indicating a first light-measuring point, and it is normally located at the center (0 position). When the "OUTPUT display" is activated by means of ENT key 9, the shutter speed value and the aperture value computed in the P mode (for example, the P2 mode) will be displayed on character display portion 16 with respect to the aforementioned first light-measuring point (FIG. 37). At this time, an "A" for AVERAGE is displayed in the middle of character display portion 16, thereby showing that the calculation is under the average mode. Next, if the M key is manipulated, the value of the first light measuring point that is displayed one stage higher than the aforementioned indices is taken in. The one-point display ("■") is then shifted to one stage below the aforementioned indices. At a same time, the second light measuring point will appear one stage above the aforementioned indices based on the first light measuring point as shown in FIG. 38. At this time, the value of the first light measuring point is memorized (AE lock), and the shutter speed value and aperture value computed under the mode (in this example, the P2 mode is used) selected by means of exposure function are displayed on the character display portion 16. If M key 14 is manipulated again, the value of the second light measuring point will be taken in, the first and second light-measuring index marks will move to a state where they are balanced with each other, centering on the 0 position. As shown in FIG. 39, the average operation of the first and second light measuring point values is performed and the shutter speed value and the aperture values are computed for display on the character display portion 16. At this time, a third light measuring point marker has also appeared on a position higher than the aforementioned indices. Up to eight light measuring values can be taken in for display through the sequential manipulation of M key 14. At the ninth entry point, the system will return to the first point thereby performing computations using the light measuring values of the latest eight points. FIG. 40 shows a display state in which three light measuring points are taken. FIG. 41 shows a state in which 8 light measuring points are taken. Here, if mode key 7 is operated, character display portion 16 alters as shown in FIG. 42 from the "OUTPUT display" to the mode name display, indicating "CENTER". Under the "CENTER" mode, the average of the maximum value and minimum value of the measured values is calculated. In the graphic display section 24, the marker points that indicate the maximum value and minimum value of the light-measuring points taken in and displayed below the aforementioned indices based on the zero position, move where they are balanced. Next, when the "OUTPUT display" will be activated by means of ENT key 9, a "C" for the "CENTER" mode is displayed between the shutter speed value and aperture value computed in the character display portion 16 (FIG. 43). The mode can be altered to the highlight mode by means of mode key 7, and the mode name display of "HIGHLIGHT" is displayed in the character display portion 165, as shown in FIG. 44. Simultaneously, the marker point that shows the maximum value of the light measuring points taken in shifts to the position of +2.3 EV. And the rest of the markers of the light measuring points that were taken in are shifted based on the point display showing this maximum value. At this time, the number of light measuring points that overflowed the −6 EV is displayed at the −6 EV position. When, the "OUTPUT display" is activated by means of ENT key 9, the "H" of the "HIGHLIGHT" mode is displayed on the character display section 16 between the shutter speed value and aperture value on the basis of highlight calculation (FIG. 45). The mode can be changed again to the shadow mode by means of mode key 7, and the mode name of "SHADOW" will be displayed on the character display portion 16. At the same time, the marker point showing the minimum value of the light measuring points taken in is shifted to the −2.7 EV position, and the rest of the markers of the light measuring points taken in are shifted based on the point display showing the minimum value (FIG. 46). At this time, the number of light measuring points that overflowed the +6 EV are displayed at the +6 EV position. When, the "OUTPUT display" is activated by means of ENT key 9, the "S" of the "SHADOW" mode is displayed as shown in FIG. 47 on the character display portion 16 between the shutter speed value and aperture value computed in accordance with the shadow calculation. When mode key 7 is manipulated again, the mode is returned to the average mode repeating the above sequence as displayed in FIG. 48. MULTI.M function also includes another mode besides those explained above.

Figure 49:
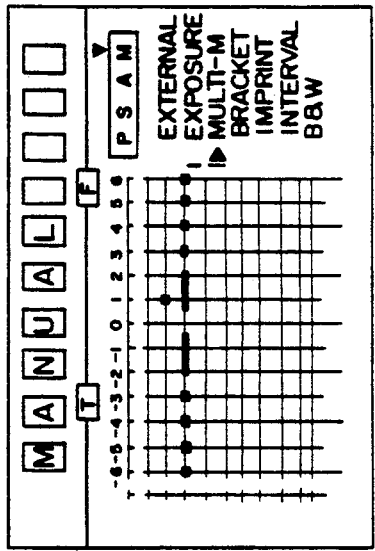
Figure 50:
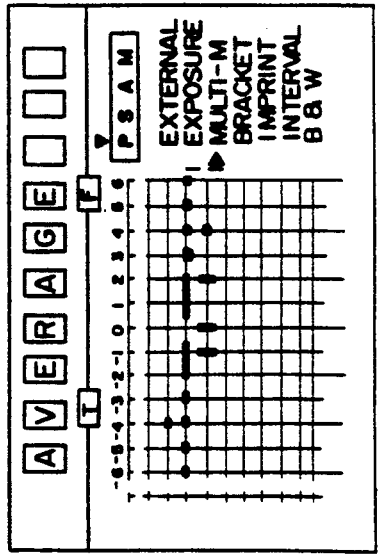

When the exposure function is under the M (manual) mode, the MULTI.M function may become manual mode without generating other mode and mode key 7 is invalid. In the manual mode, the control value is strictly the set value of exposure function under the M mode, and the zero position of the aforementioned index display is its value. Therefore, the light measuring value from the camera will be located at a position in deviation from the said set value as shown in FIG. 49. The "OUTPUT display" is again set by ENT key 9. The character display portion 16 indicates the set shutter speed and set aperture value, and "M" is indicated between them (FIG. 50). Since it is in running state by a OPE key, the photometric light measuring point is taken in with each operation of M key in the same manner as of the said other modes. FIG. 51, FIG. 52 and FIG. 53 show the display states of taking in one point, two points and eight points in respectively, in which the character display section 16 remains to display the said set values. The measuring light distribution on an object is graphically displayed to permit judgement at a glance as shown in FIG. 53. It is possible to shift to the left and right the entire light measuring distribution diagram consisting of the said taken—in light measuring points by using UP key 11 or DOWN key 12. In FIG. 54, the shutter speed value shown in display portion 16 varies simultaneously with the movement of the light measuring distribution diagram through use of UP key 11 since the shutter speed value indication part is underlined. Thus, this function enables exposure control in accordance with the measured brightness distribution on the object and further can be used to change the highlight mode exposure standard and shadow mode exposure standard which is fixed to +2.3 EV and −2.7 EV respectively. Also, the aperture value is changeable if the underline is moved to the aperture value by the cursor key 13. In these ways, the point which is judged to be optimal in the said light measuring distribution diagram is moved to zero position in the said display by changing the shutter speed value or aperture value using UP key 11 or DOWN key 12, thereby proper values for the object can be set using the photographer's own judgement. Thus, MANUAL mode in the MULTI.M function can be said to be a kind of manual metering. The BRACKET function will now be described. This function is to take a set of photographs, shifting the; and exposure value of each photograph on the basis of the collected light measuring data. It is possible to take a maximum of nine photographs with shifting exposure value. The start value, shifting width and number of photographing frames can be set. This function is also designed so that it is skipped and cannot be selected if the EXPOSURE function is not in running state. FIG. 55 shows a state indicating mode name. It indicates the P mode is selected in the EXPOSURE function and an indicator of the start value and shifting amount is displayed on the upper section of the graphic display portion 24. This indicator is common to one indicating a light measuring range for MULTI-M function, but another non-common indicator may be separately provided. The graphic display section 24 indicates, in FIG. 55, an indicator showing the shifting range. Also, the BRACKET function is in non-running state. The "OUTPUT display" is set by ENT key 9 as shown in FIG. 56. The character display portion 16 indicates the shifting amount from the reference value and a number of remaining frames. Also, the BRACKET function is now in running state through activation of OPE key 8 and thereby a new display for operation of the BRACKET function appears within the same shifting range under the said indicator on the graphic display section 24.

Figure 57:
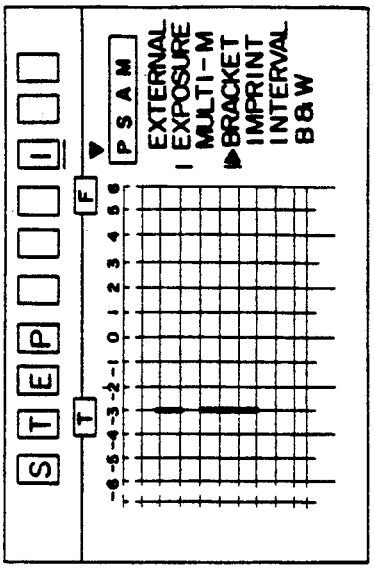
Figure 58:
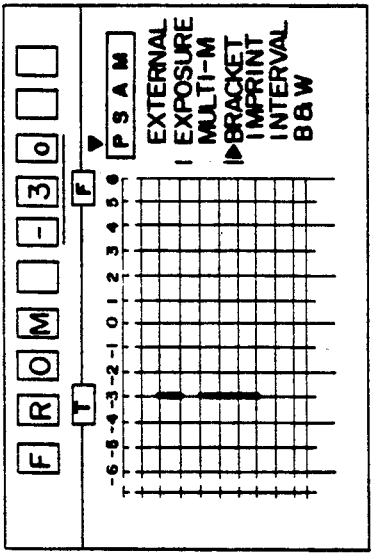
Figure 59:
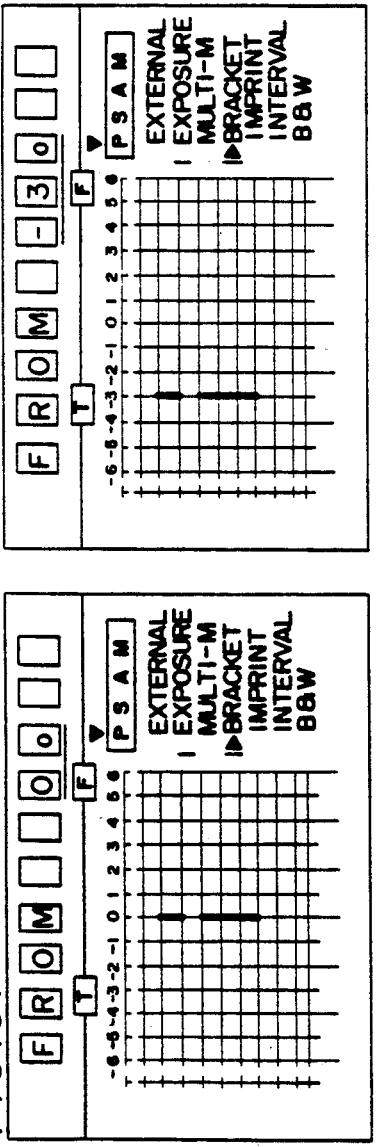
Figure 60:
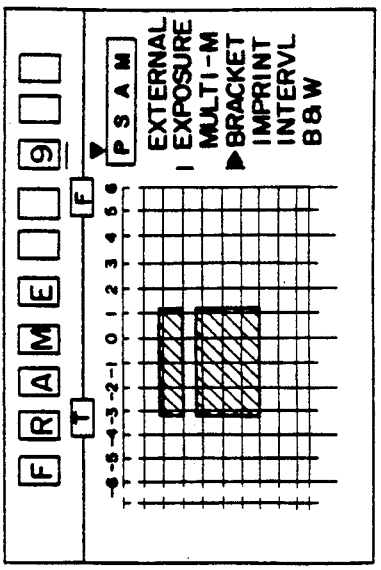
Figure 61:
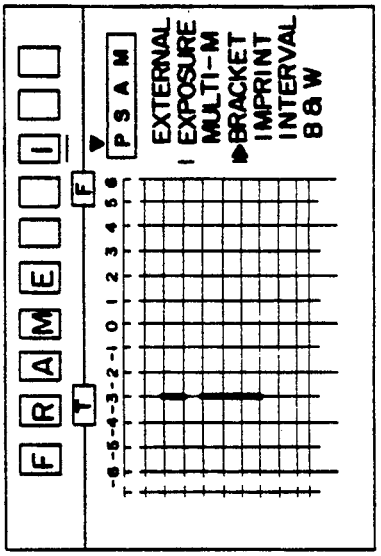
Figure 62:
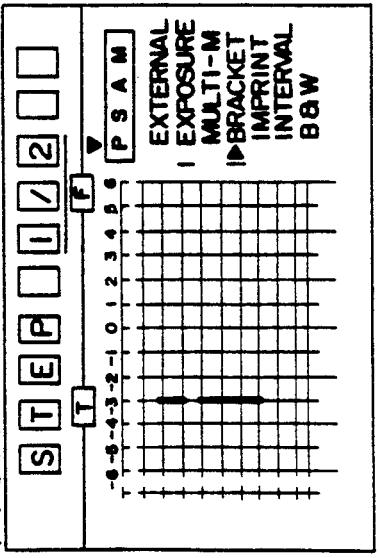
Figure 63:
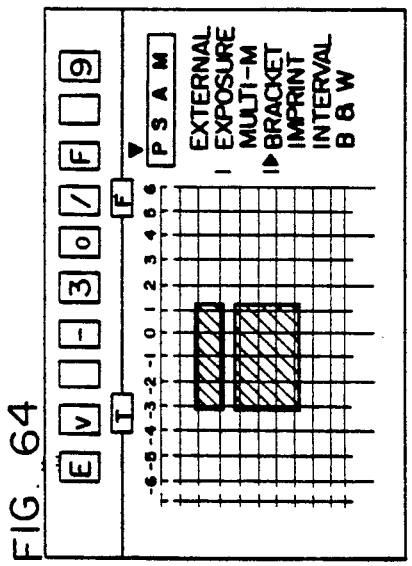

When the "OUTPUT display" is changed into the "INPUT display" using ADJ key 10, a message "FROM" first appears on the character display portion 16 as shown in FIG. 57 to show the setting of the start value. When the underline numeric value is changed to a desired value using UP key 11 or DOWN key 12, the said indicator and the said display move together with key input as shown in FIG. 58. Then a message "STEP" to set the shifting width appears on the character display section 16 through use of ENT key 9 as shown in FIG. 59. The shifting width can be selected among four types: ¼ EV, ½ EV, 1 EV and 2 EV, and the underlined numeric values are changed through UP key 11 or DOWN key 12 for setting as shown in FIG. 60. Then, a message "FRAME" appears on the character display section 16 through use of ENT key 12 to set a number of photographing frames as shown in FIG. 61. When the underlined numeric value is changed using UP key 11 or DOWN key 12 for setting a number of frames, the said indicator and the said operation display width indicate a shifting range from the start value to the final value continuously on the graphic indication section (FIG. 62).

Figure 64:
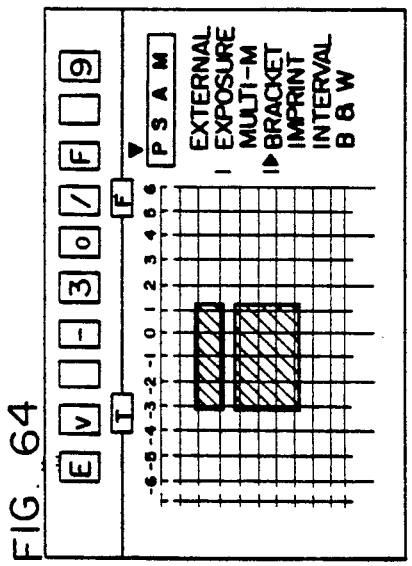
Figure 65:
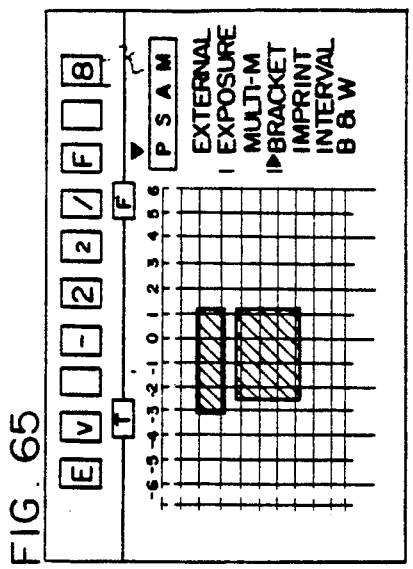

Then, a message "COMPLETED" is displayed on the character display section 16 through use of ENT key 12, notifying that setting is completed. Operating ENT key 12 here returns to "FROM" again and repeats each setting display. The "INPUT display" changes into the "OUTPUT display" through ADJ key 10 and the character display section 16 indicates the shifting amount from the reference value and a number of the remaining frames as shown in FIG. 64. When the camera shutter release operation is started, the light measuring value at the time is memorized, and the exposure value for each frame is shifted on the basis of such light measuring value and is converted to the shutter speed value and the aperture value by calculation based on the selected mode in EXPOSURE function for example based on P mode (any of P1, P2 and P3 modes) to control the camera. FIG. 65 shows a state when the camera shutter has been released once, and the shifted amount from the reference exposure value to be used by the next shutter release and the number of remaining frames are shown on the character display section 16. The said operation indication on the graphic display section 24 varies to indicate a range from the next control (exposure) value to the final (exposure) value.

Figure 66:
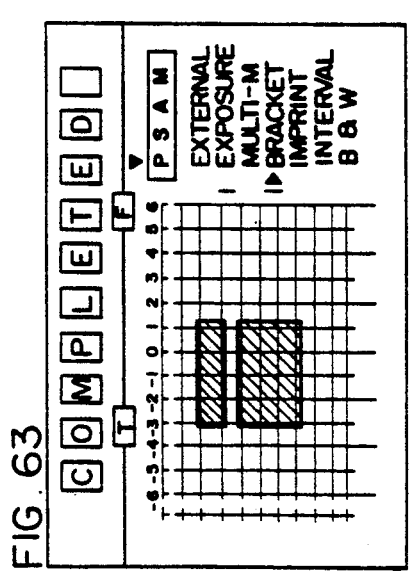
Figure 67:
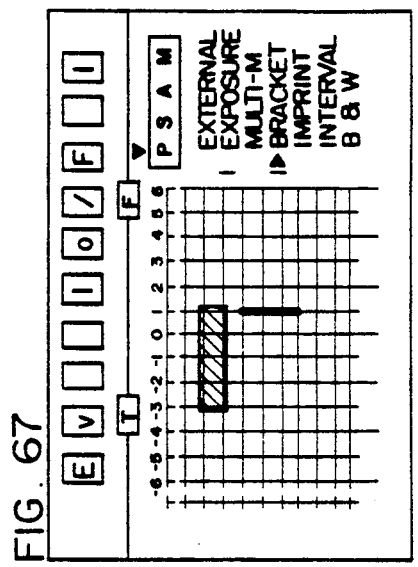
Figure 68:
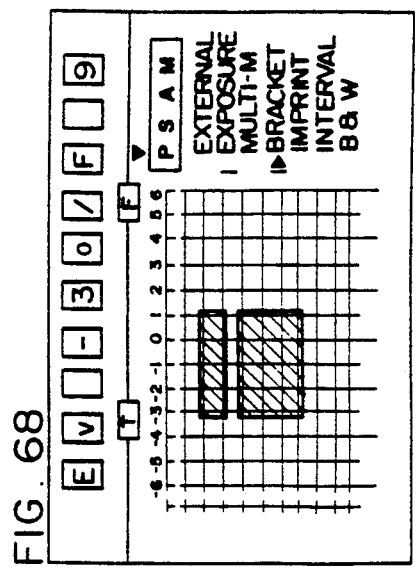

FIG. 66 shows a state when the camera shutter has been released twice and FIG. 67 shows that the camera has been released eight times. The character display section 16 shows "1" for the number of remaining frames, which means that 1 frame is left. The graphic display section 24 indicates only operation of the final value. When the camera is released to photograph the final frame, the character display section 16 and graphic display section 24 are reset to the values which have been set at the beginning. Both indication sections change into a state in which new light measuring values can be collected again as shown in FIG. 68, and show the same indication state as in FIG. 64. The camera can be repeatedly controlled this way.

In the case when indication on the external display section 2 has been changed to the EXPOSURE function while the BRACKET function is in running state, EV line is designed to move in parallel on the program line 26 in the graphic display section 24 when the BRACKET function is executed and one of P, S and A modes is selected in the EXPOSURE function. And when M mode is selected, the aperture value line is designed to move in parallel. Therefore, it can be easily confirmed that the BRACKET function is being executed.

Figure 70:
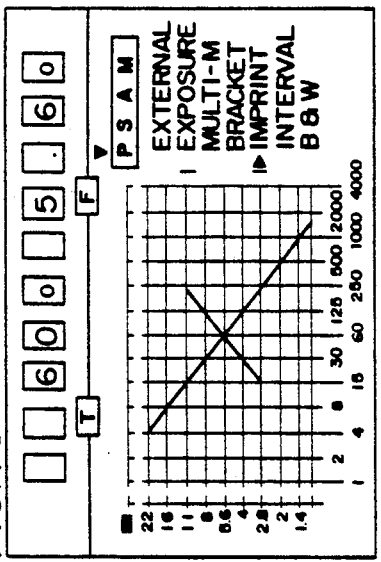
FIGS. 69 and 70 are diagrams showing relationships between key manipulations and indications under exposure control data mode through the imprint function.
Figure 69:
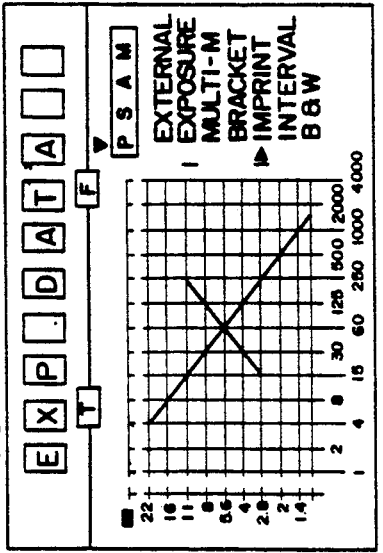

The printing function will be described. Selecting the printing function by the operation of FUNC key 6 turns the mode into printing mode for printing exposure control data and it becomes operable by operating OPE key 8. If the exposure function is selected at this time, a chart and EV line at that time are indicated as shown in FIG. 69. By pressing ENT key 9, control value (control value for camera) which has been computed by the back circuit BCKC at that time is indicated as shown in FIG. 70 and this data will be printed on the film. On the other hand, if the exposure function is not selected, by pressing ENT key 9, the data which has been sent from the camera main body BD is indicated as a data to be printed. In this case, the graphic display is not performed.

Figure 71:
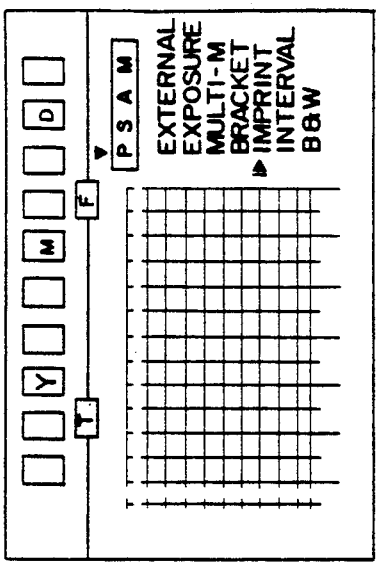
FIGS. 71, 72, 73, 74 and 75 are diagrams showing relationships between key manipulations and indications under year, month, and day mode.
Figure 74:
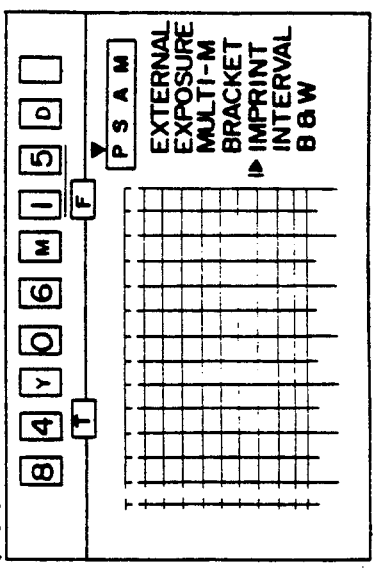
Figure 73:
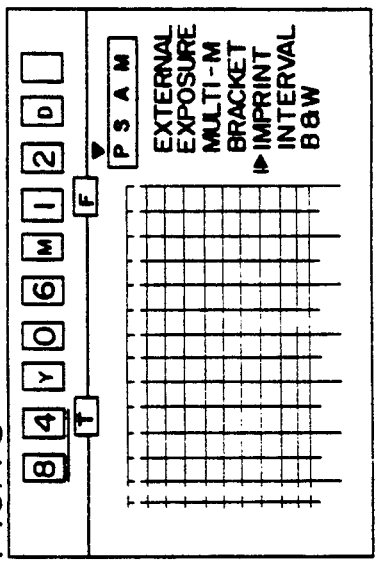
Figure 72:
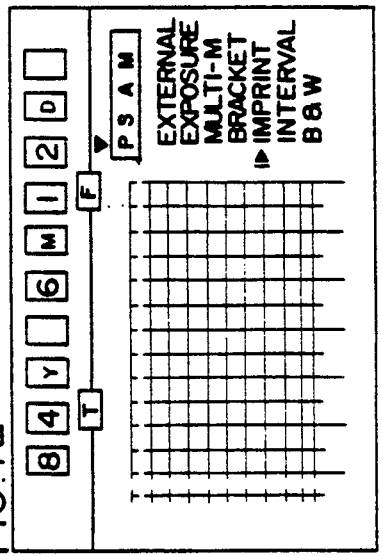
Figure 75:
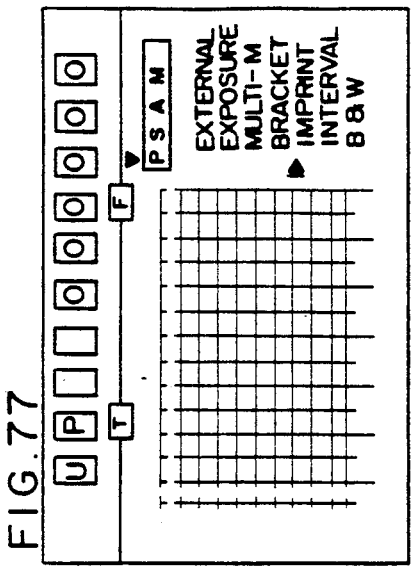
Figure 78:
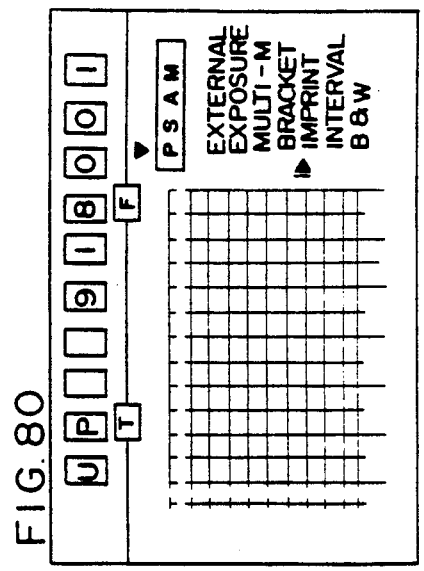
FIGS. 76, 77, 78, 79, and 80 are diagrams showing relationships between key manipulations and indications under the upcount mode.
Figure 76:
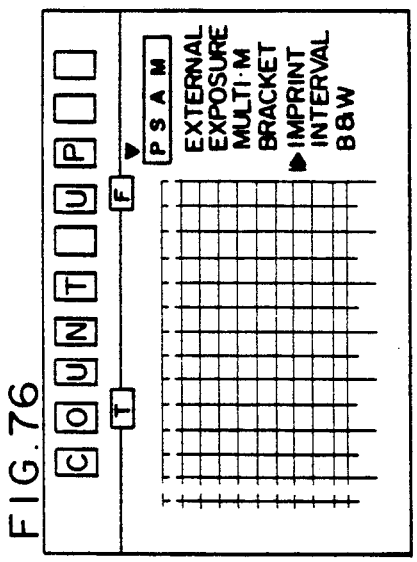
Figure 79:
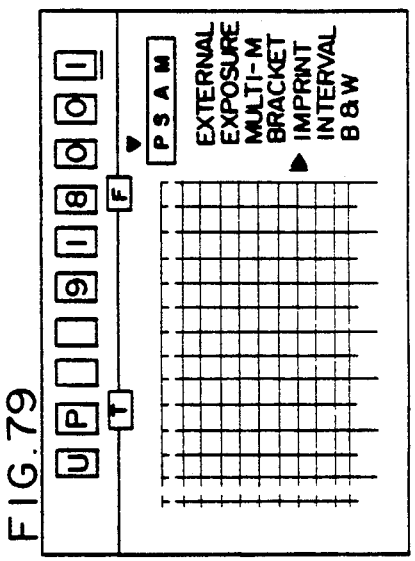
Figure 77:
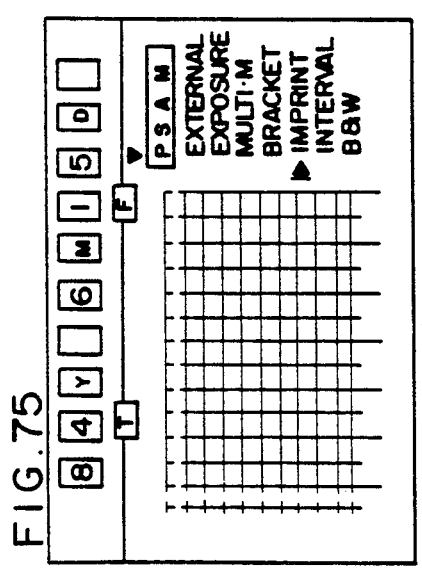
Figure 80:
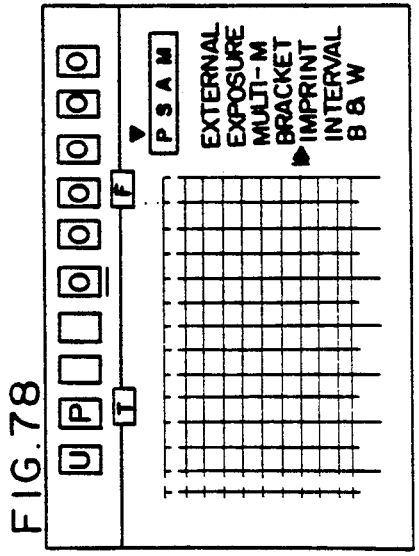
Figure 82:
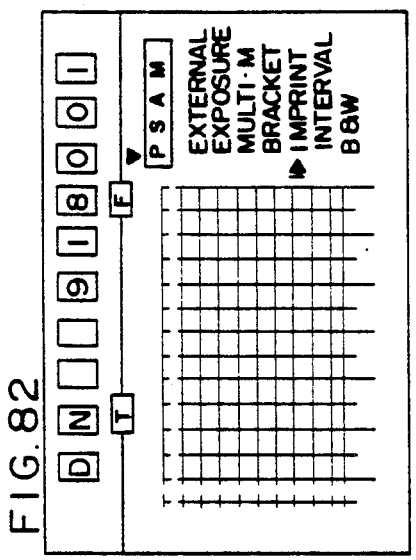
FIGS. 81 and 82 are diagrams showing relationships between key manipulations and indications under the downcount mode.
Figure 81:
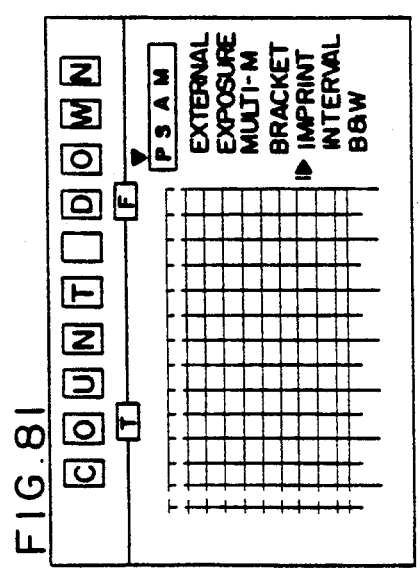

When pressing MODE key 7, year/month/day printing mode is set and mode name is indicated on the character display section 16 as shown in FIG. 71. Then, by pressing ENT key 9 data from calendar microcomputer CAMC is indicated as shown in FIG. 72. If an object is photographed in this state, the data displayed on the character display section 16 will be printed. When pressing ADJ key 10 in the state shown in FIG. 72, the data can be changed and a cursor is indicated on the year data display part (FIG. 73). Pressing the cursor key 13 twice moves the cursor under the day data display part. FIG. 74 shows a state in which the day data has been changed from 12th to 15th by pressing UP key 11 three times. Pressing ADJ key 10 under this state produces a display as shown in FIG. 75 and this data will be printed. Also, printing can be performed even under such indication state as shown in FIG. 73 and FIG. 74. In addition, as the data from calendar microcomputer CAMC changes, the indicated data is also changed. Whenever MODE key 7 is pressed under this state, printing mode is changed in the order shown in Table 1 until hour/minute/second printing mode is selected. Pressing MODE key 7 further turns into up-count mode. FIG. 76 shows an indication state of mode name for this up-count mode. Pressing ENT key 9 under this state indicates as shown in FIG. 77. Pressing the ADJ key 10 permits the cursor to appear as shown in FIG. 78 and it is designed so that data corresponding to the position of the cursor can be changed using UP key 11 or DOWN key 12. Pressing the UP key 11 varies in the order of 0→1→ ... →9→—→(blank)→0, while pressing the DOWN key 12 varies in the reverse order. FIG. 79 shows a state when data change is thus complete. Pressing ADJ key under this state removes the cursor as shown in FIG. 80. If photographing is done under this state, printing data are successively increased by adding "1" at a time. In this case, there is no carry to "—" (blank) digit. Pressing MODE key 7 in up-count mode turns into down-count mode and indicates mode name as shown in FIG. 81. When initial data is set using the same procedure as up-count mode, indication when setting is complete is as shown in FIG. 82. For both modes, data to be printed are changed successively with each shutter release and are indicated on the character display section 16.

Figure 83:
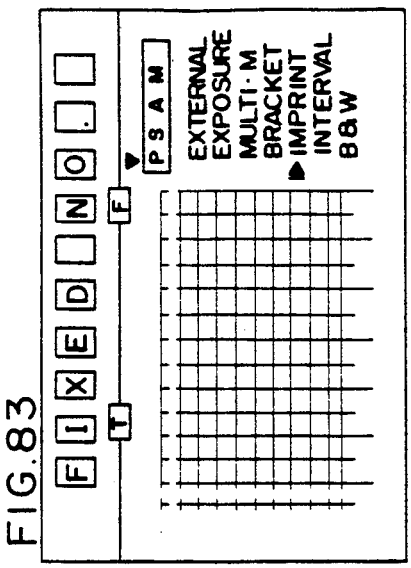
FIGS. 83, 84, 85, 86, 87, and 88 are diagrams showing relationships between key manipulations and indications under fixed data mode.
Figure 86:
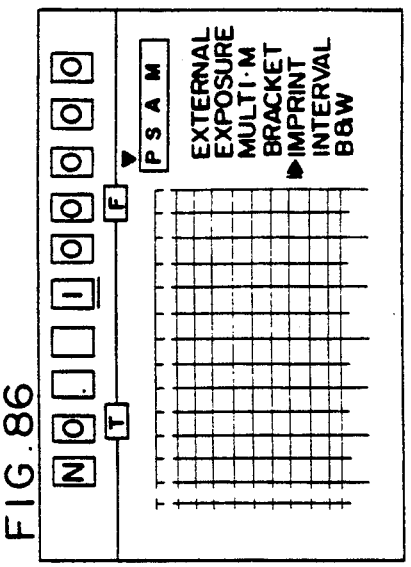
Figure 85:
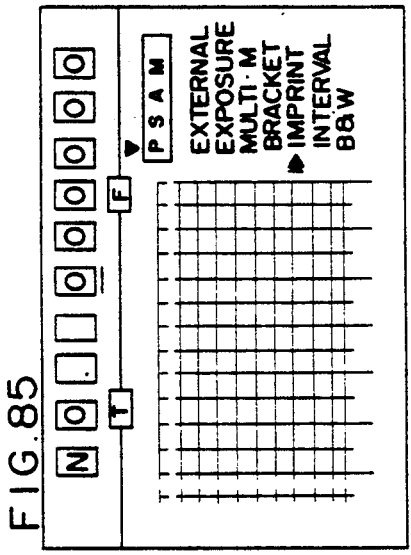
Figure 84:
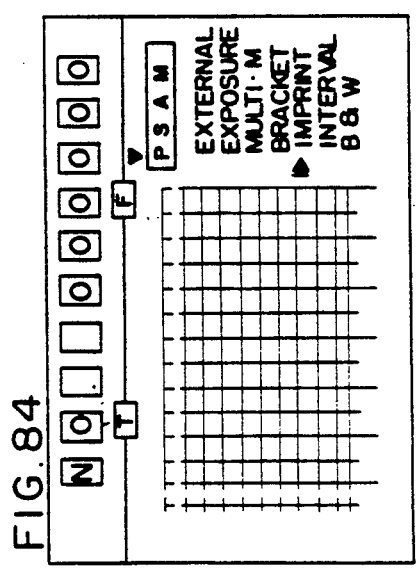
Figure 87:
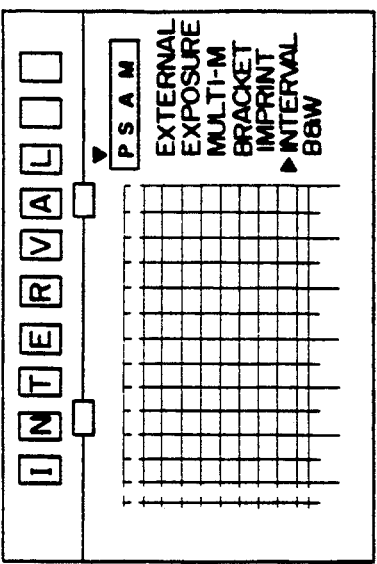
Figure 88:
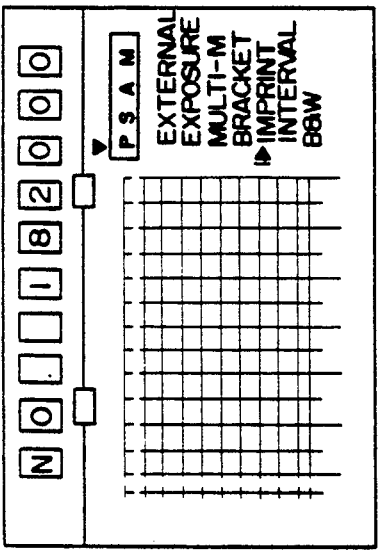

When the MODE key 7 is pressed in the down-count mode, it enters the fixed data photographing mode as shown in FIG. 83. When the ENT key 9 is pressed, the status shown in FIG. 84 is indicated, and when the ADJ key 10 is pressed, the status shown in FIG. 85 is indicated. After changing data using the combination of the cursor key 13, up key 11, and down key 12 as shown in FIGS. 86 and 87, the status shown in FIG. 88 is indicated when the ENT key 9 is pressed. Unless the OPE key 8 and MODE key 7 are operated, the set fixed data is printing in this mode.

When the B & W function is selected by pressing the FUNC key 6, the printing time for monochrome film is selected. Mode selection is not possible by this function and the status set by the printing function is maintained. When this function is selected, the printing function for monochrome film is valid, and when the B & W function is not selected, the printing function for color film is valid. When the B & W function is selected, the printing function may be made invalid and the same operation as the printing function may be provided. When the B & W function is selected, the time needed to print is longer.

Next, the INTERNAL function is described. In this function, automatic sequential shooting by operating the camera at the predetermined interval of time, is enabled. It is possible in the INTERVAL function to set interval time, number of frames during photography at each interval (hereafter referred to as the number of frames), number of the interval repetition (hereafter referred to as the number of groups), and the first release starting time for interval photography (hereafter referred to as the start time).

Figure 89:
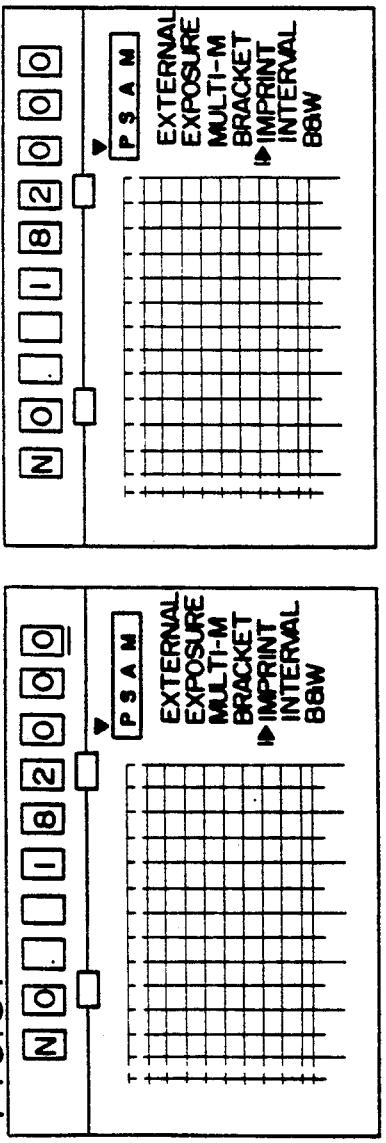
Figure 90:
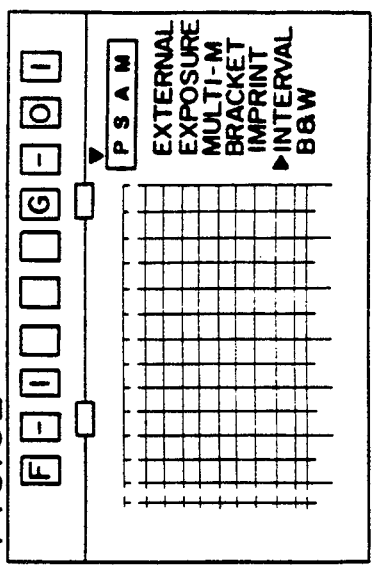
Figure 91:
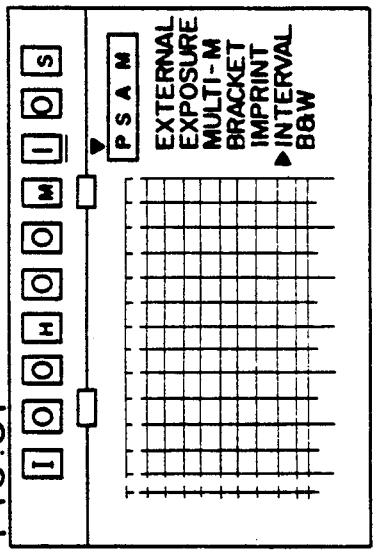
Figure 92:
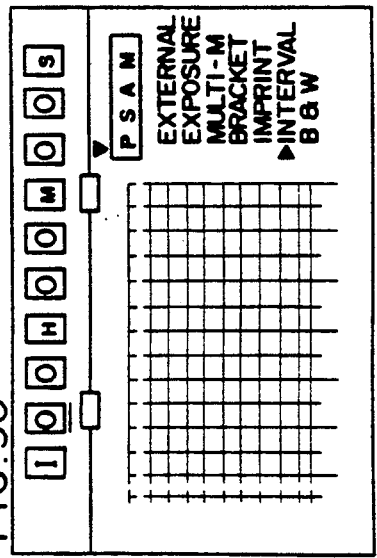

FIG. 89 shows the mode name indication of the interval function. It is in the non-executable status and the ENT key 9 is invalid. Also, this function makes the graphic display section 24 non-display. When set to the execution status by pressing the OPE key 8, execution becomes ready for the start time. To execute the first release of the interval function at once, the start time is cancelled by performing the camera release after setting to the execution status by pressing the OPE key 8 so that execution can be started immediately. Next, the "OUTPUT display" is switched into the "INPUT display" by pressing the ADJ key 10, and the display status in which the interval time can be set is created as shown in FIG. 90. In the character display section 16, "I" of the INTERVAL time is displayed, and "H (Hour)", "M (Minute)", "S (Second)", the characters which are the time units are displayed together with numerical values. It also displays the underline which is indicated under the numerical value which can be changed. The numerical values are changed by pressing the UP key 11 or the DOWN key 12, and the place of the numerical value to be changed is changed by pressing the cursor key 13 in order to set the interval time (FIG. 91). The interval time can be set from 0 second to 99 hours 59 minutes 59 seconds. Next, when the ENT key 9 is pressed, the number of frames ("F") and the number of groups ("G") are displayed for setting them as shown in FIG. 92. The underlined numerical values are changed by pressing the UP key 11 or the DOWN key 12, and the place of the numerical value to be changed is changed by pressing the cursor key 13 so that the number of frames and the number of groups are set (FIG. 93). Up to nine frames can be set, and the number of groups according to the BRACKET function has priority when the above BRACKET function is in the execution status. A maximum of 99 groups can be set. Next, when the ENT key 9 is pressed, the set start time is displayed as shown in FIG. 94. The start time can be set under day, hour, and minute. In the character display portion 16, "S" which indicates the START time is displayed, and "D (Date), H (Hour), M (Minute)", the characters which indicate the time units, are displayed together with numerical values. The underlined numerical value is changed by pressing the UP key 11 or the DOWN key 12, and the cursor key 13 is used for moving from the place to be changed to the new place in order to set the start time. Then, when the ENT key 9 is pressed, the character display portion 16 displays "COMPLETED" which indicates the completion of setting (the figure is hereby omitted). Next, when the ADJ key 10 is pressed, the display is changed from a "INPUT display" to the mode name again (FIG. 95). Thus, to start the interval function, set to the execution status by pressing the OPE key 8 and the "OUTPUT display" by pressing the ENT key 9. Then, the start time is displayed in the character display portion 16 as shown in FIG. 96. And, after the first release of the interval function is executed, the remaining time until the next release is displayed under "H (hour), M (minute), and S (second)" in the character display portion 16 (FIG. 97).

Figure 98:
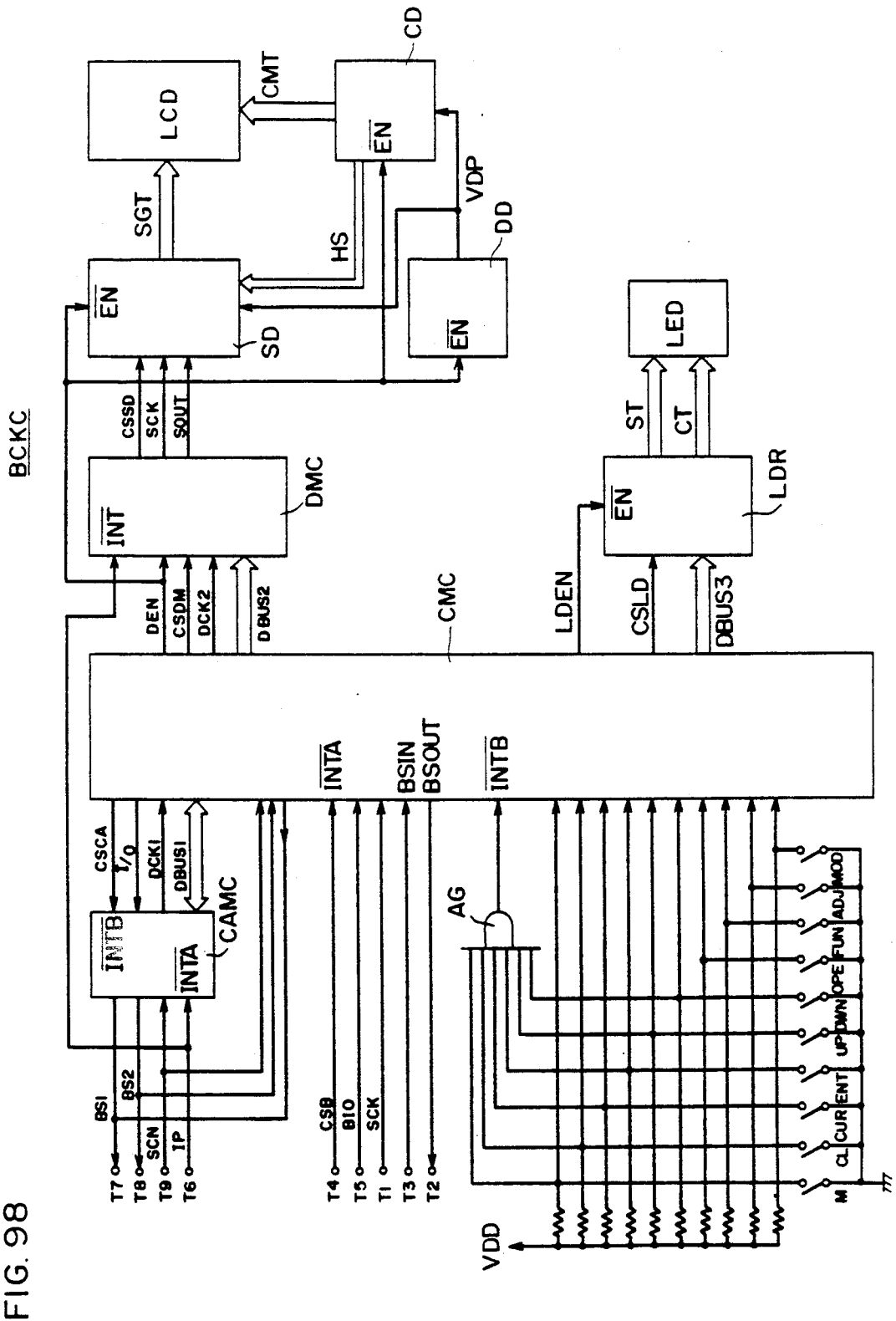
FIG. 98 is a block diagram showing the overall back circuit BCKC.

FIG. 98 shows the block diagram of the back circuit BCKC in detail. The CMC is a control microcomputer (hereinafter called "control micon"), which controls the function, mode, data setting, exposure computation, preparation of the data for display, preparation of the data for printing, and printing operation, through keys. Further, it controls the display sections DMC, SD, DD, and CD which will be described later, exchanges data with a calender microcomputer CAMC, and exchanges data with the camera main body BD. The CAMC is a calendar microcomputer which controls the calendar data for printing, interval, and exposure time over a long period of time (long time). M is a switch which is turned ON by pressing the memory key 14 in FIG. 5, CL is a switch which is turned ON by manipulating the memory clear key 15, CUR is a switch which is turned ON by manipulating the cursor key 13, ENT is a switch which is turned ON by manipulating the enter key 9, UP is a switch which is turned ON by manipulating the up key 11, and DWN is a switch which is turned ON by manipulating the down key 12. These six switches are connected to each input port of the microcomputer CMC and further to the interrupt terminal INTB through the AND circuit AG. Accordingly, even when the control micon CMC stops its operation, it starts its operation when any switch is turned ON. Also, the switch OPE is turned ON in conjunction with the manipulation of the OPE key 8. FUN is a switch which is turned ON in conjunction with the manipulation of the FUNC key 6, ADJ is a switch which is turned ON in conjunction with the ADJ key 10, and MOD is a switch which is turned ON in conjunction with the manipulation of the MODE key 7. Since these four switches are connected only to the input ports of the control micon CMC, the control micon CMC cannot be activated even when these switches are turned ON.

Next, the operation of the control micon CMC is described with reference to the flow chart of the control micon CMC in FIG. 99. First, when the signal line CSB from the camera main body BD becomes LOW, the operation starts from No. 0 step by the interrupt terminal INTA. At No. 0 step, the signal line BS1 is set to High, and the interruption becomes enable by the interrupt terminal (INTA) and then distinguishing at what timing the interrupt signal is input from the camera main body BD. In No. 2 step, it distinguishes whether there is a wait state for data input or not. When the data input wait state is ready, it distinguishes whether the printing data (Tv, Av) or the computation data will be input or not in No. 3 step. As previously described, it can be distinguished because the signal line BIO becomes High when the computation data will be input and Low when the printing data will be input. When it is distinguished that the printing data will be input, the control micon CMC reads the data sent at No. 4 step, and distinguishes whether the printing function is selected or not in No. 5 step. When it is found that the printing function is not selected in No. 5 step, it moves to No. 15 step without performing printing operation. On the other hand, when the printing function is selected, it moves to No. 6 step and sends the data which corresponds to the selected printing mode to the LED drive circuit LDR. This operation is carried out by sending synchronizing signals to the signal line CSLD to send 4-bit data sequentially. When the LED drive circuit LDR operates for display while the signal line (LDEN) is Low, LEDs in each segment are dynamic-driven based on the printing data to start the printing operation at No. 7 step. And the control micon CMC start to count the time by a timer in accordance with the film sensitivity which is read from the camera main body at No. 8 step. Under the B & W function, it counts the different time, though the film sensitivity indicated shows the same data as that of the printing function. When counting is completed at No. 9 step, the control micon CMC renders the signal line LDEN High and stops the display of the LED drive circuit LDR at No. 10 step. When the second shutter curtain starts to travel in the camera main body BD, Low pulse is output to the signal line CSB. Then, an interrupt signal is also input into the interrupt terminal INTA at this time. Then it moves to No. 11 step because there is no data input wait state. And, when it is found that printing operation is being carried out in No. 11 step, it moves to No. 10 step, renders the signal line LDEN High and stops the printing operation forcibly, thereby prohibiting the printing operation during film winding operation.

In No. 15 step, it distinguishes whether the camera main body's switch SCN is ON or not. When the switch SCN is ON, it moves to No. 40 step without performing the operations in Nos. 16 to 21 steps. On the other hand, when the switch SCN is OFF, it distinguishes whether it is in the count-up mode or not at No. 16 step. And, if in the count-up mode, it moves to No. 40 step after adding "1" to the register CR in which the printing data is stored at No. 17 step. If not in the count-up mode, it distinguishes whether it is in the count-down mode or not at No. 18 step. If in the count-down mode, it moves to No. 40 step after subtracting "1" from the content of the register CR at No. 19 step. If not in the count-down mode, it distinguishes whether it is the BRACKET function or not at No. 20 step. It moves to No. 40 step after subtracting "1" from the register BR in which the number of frames of the BRACKET function is stored at No. 21 step in case of the BRACKET function, or moves directly to No. 40 step in the absence of the BRACKET function. Although data printing can be carried out even when the switch SCN is ON, it can be arranged to immediately move to No. 40 step when the switch SCN is ON by installing a switch distinguishing function between steps No. 4 and No. 5.

When, at the No. 3 step, it judges that it is not a printing data input mode (the signal line BIO is HIGH), the No. 25 step is taken to read out data from the camera body BD. When the EXPOSURE function is selected at No. 26 step, the No. 27 step is taken to wait for the signal line BIO to be LOW. When the signal line BIO becomes LOW, the back ICP ("80H") is output. When this back ICP is input to the camera body, the camera body converts signal line BIO to HIGH while maintaining signal line CSB to LOW. The camera body waits for the computation in control micon CMC to be completed and after a passage of sufficient time, the signal line BIO is converted to LOW. The control micro computer CMC outputs back ICP on No. 28 step and executes subroutine for exposure calculation at step 29. When the exposure calculation is completed, the control micon CMC waits for the signal line BIO to go LOW at No. 30 step. When it becomes LOW, the control micon CMC send control data (Tv, Av) previously mentioned, exposure control mode data, over predetermined exposure control range data, and release possibility/impossibility data at No. 31 step. After that, the No. 40 step is taken.

The flow is started from No. 40 step, in the condition when the control micon CMC is activated by pulse from the signal line CSB at the time when the camera body BD start its operation, in the condition, when the printing function is not selected or is completed, and in the condition when a pulse generated in accordance with the start of the second shutter curtain is input. If an interruption signal is input to the interruption terminal INTB when one of the switches M, Cl, CUR, ENT, UP, and DWN is turned ON or the interrupting operation of the interruption terminal INTA is finished, the operation from No. 40 step starts.

On No. 40 step, the register TIR for the timer (for counting operation time) is reset and the flag 10F to determine whether data is input from the calendar micro computer CAMC is set to 1. After that, No. 42 step is taken. On No. 42 step, it is judged whether or not the flag 10F is 0. If the flag is 1, data from the calendar micon CAMC is read out at No. 45 step and the flag 10F is reset to 0 at No. 46 step. After that, No. 47 step is taken. On the other hand, if it is judged that the flag 10F is 0 on No. 42 step, data is sent to the calendar micon CAMC at No. 43 step and the flag 10F is set to 1 at No. 44 step. After that, No. 47 step is taken. To perform data giving and receiving, the signal line CSCA is converted to LOW. The signal line I/O is converted to LOW when outputting data, and is converted to HIGH when inputting data. When the signal line CSCA is converted to LOW, the calendar micro computer CAMC is interrupted so that the calendar micro computer CAMC generates a pulse to synchronize data giving and receiving. Synchronized with this pulse, 4-bit data is given and received successively through the data bus DBUSI. Data sent from the calendar micro computer CAMC to the control micro computer CMC include the present year, month, day, hour, minute, and second data, and hour, minute and second data required until the start of the next shooting for the interval photographing. In addition, it includes data indicating whether the interval photographing is activated and whether the interval photographing is finished. The control micro computer CMC produces printing data in accordance with these data and additionally produces data indicating the remaining time up to the start of the next shooting when the "INTERVAL function" is activated. The "INTERVAL function" is reset by receiving the interval end signal. Data sent from the control micro computer CMC to the calendar micro computer CAMC includes the day, hour, and minute data of the start of the interval photographing, data (hour, minute, and second) indicating the interval of the interval photographing, number of groups of the interval photographing, number of frames of the interval photographing, and the exposure time set in the M/LT mode. Additionally, it includes data indicating whether the interval function is selected and whether the M/LT mode is selected.

Figure 103:
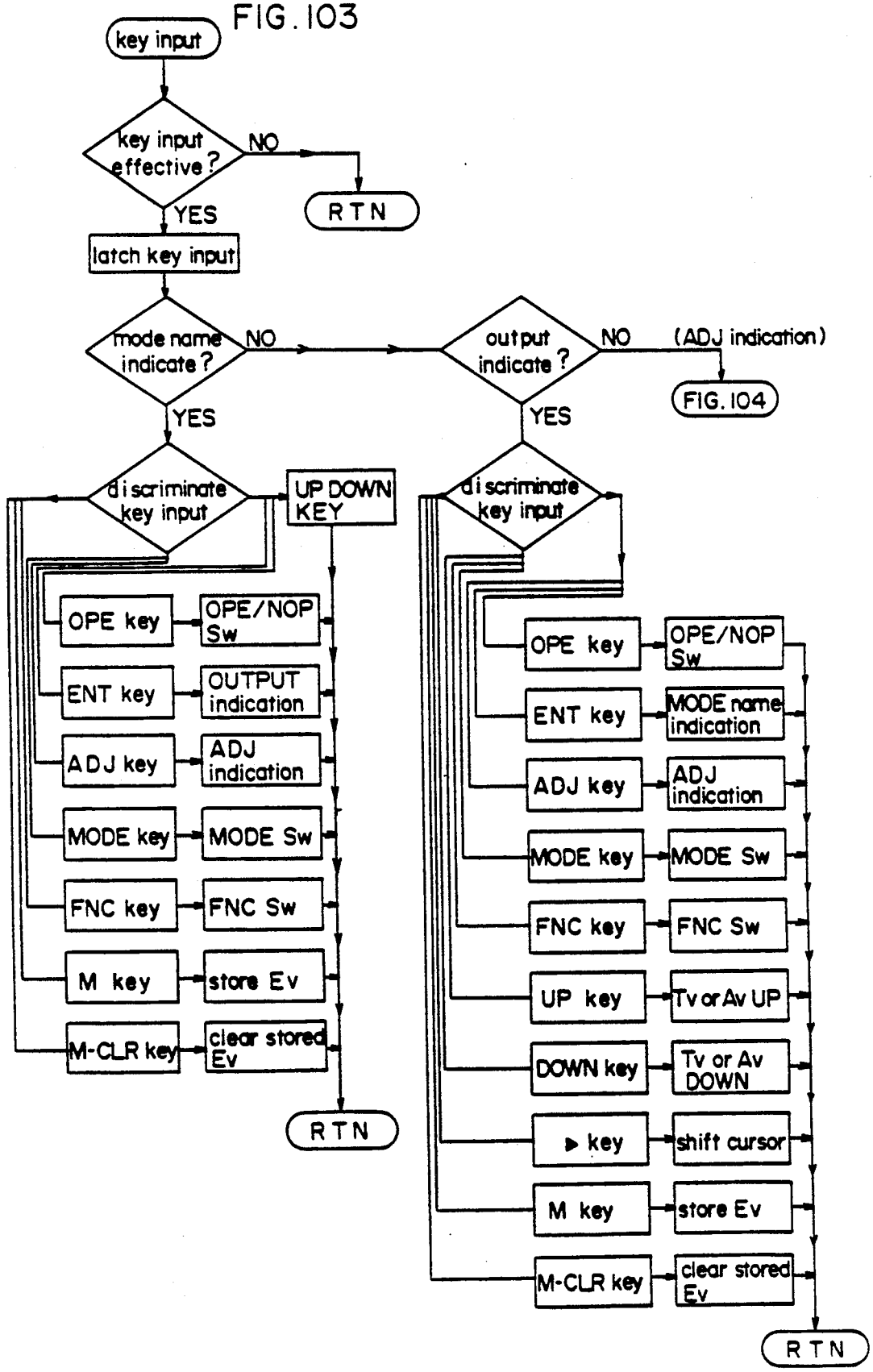
FIGS. 103 and 104 are flow charts showing the operations of subroutine for key input.
Figure 104:
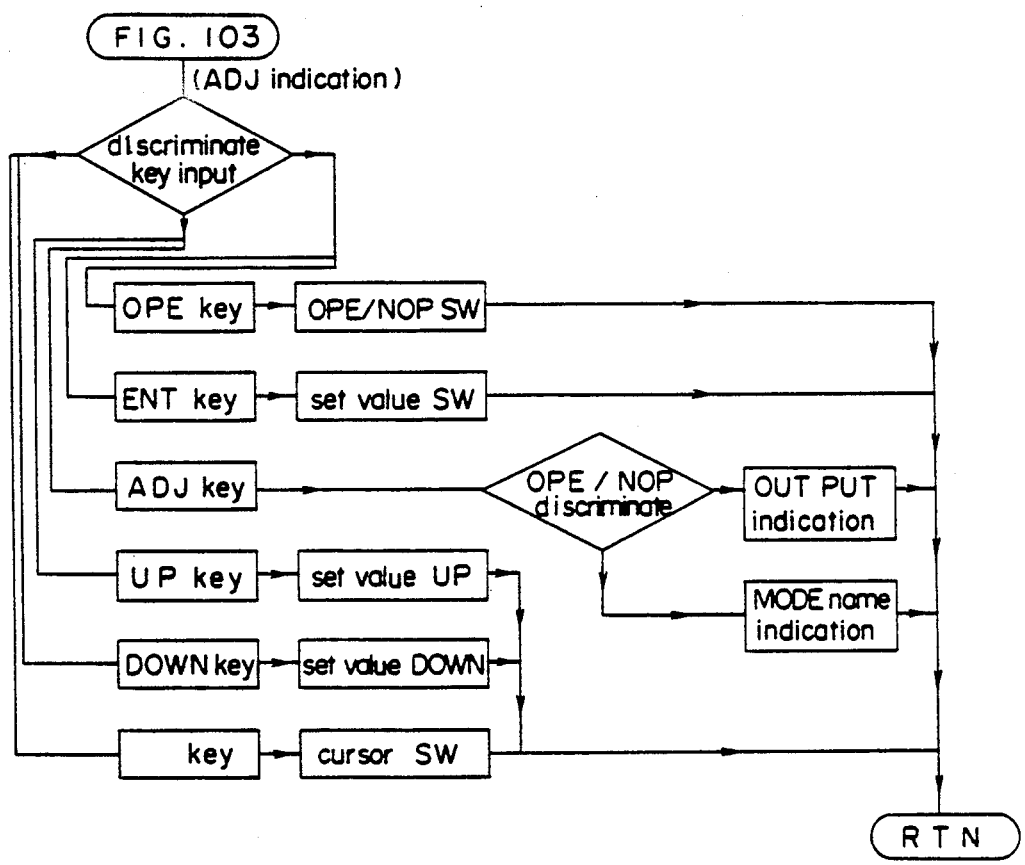

On No. 47 step, it is descriminated whether key operation is performed or not by checking the condition of the switches M through MOD. When key operation is not performed, No. 50 step is taken. On the other hand, when key operation is performed, operation according to the condition of switches and to the condition of control micro computer CMC is performed at No. 48 step, and after that, the signal line BS1 is brought to LOW at No. 49 step. FIGS. 103 and 104 show the subroutine of the No. 48 of the main routine, and the relationship between the operation of the each key, set data, and indication was already mentioned. Therefore, these matters are not mentioned again here. When the execution of the subroutine on No. 48 step and of No. 49 step is completed, the reception of the interruption signal by the interruption terminal INTA is enabled at No. 50 step so that the display data is sent to the display micro computer DMC. For this operation, the signal line DEN is converted to LOW for activating the display units DMC, SD, DD, and CD. Next, the signal line CSDM is converted to LOW to show that data is to be output to the display micro computer DMC. Synchronization pulses are output from the signal line to send data by 4 bits each. The relationship between data and indication to be sent according to the function and mode will be mentioned later in accordance with the operation of the display micro computer DMC. Although an enable terminal is used as shown in FIG. 98, the display units DMC, SD, CD, and DD are supplied with power by converting the signal line DEN to LOW.

When transmission of data is completed, it is judged which of the switches M to MOD is turned ON on No. 52 step. If any of the switches is turned ON, the register TIR is reset at No. 54 step. If no switch is turned ON, "1" is added to the content of the register TIR at No. 53 step. After that, No. 55 step is taken. On No. 55 step, it is judged whether the content of the register TIR reaches a specified value K. If it does not reach K, No. 42 step is taken to repeat the same operation. If it is judged that the content of the register TIR reaches K at No. 55 step, it means that a predetermined time has passed with no key operation and with no data giving and receiving operation with camera body. At this time, the signal line DEN is converted to HIGH to stop the operation of the display unit at No. 56 step, and the operation by interruption signal to the interruption terminal INTB is enabled at No. 57 step. As a result, the sequence of the operation mentioned above is finished.

Figure 99:
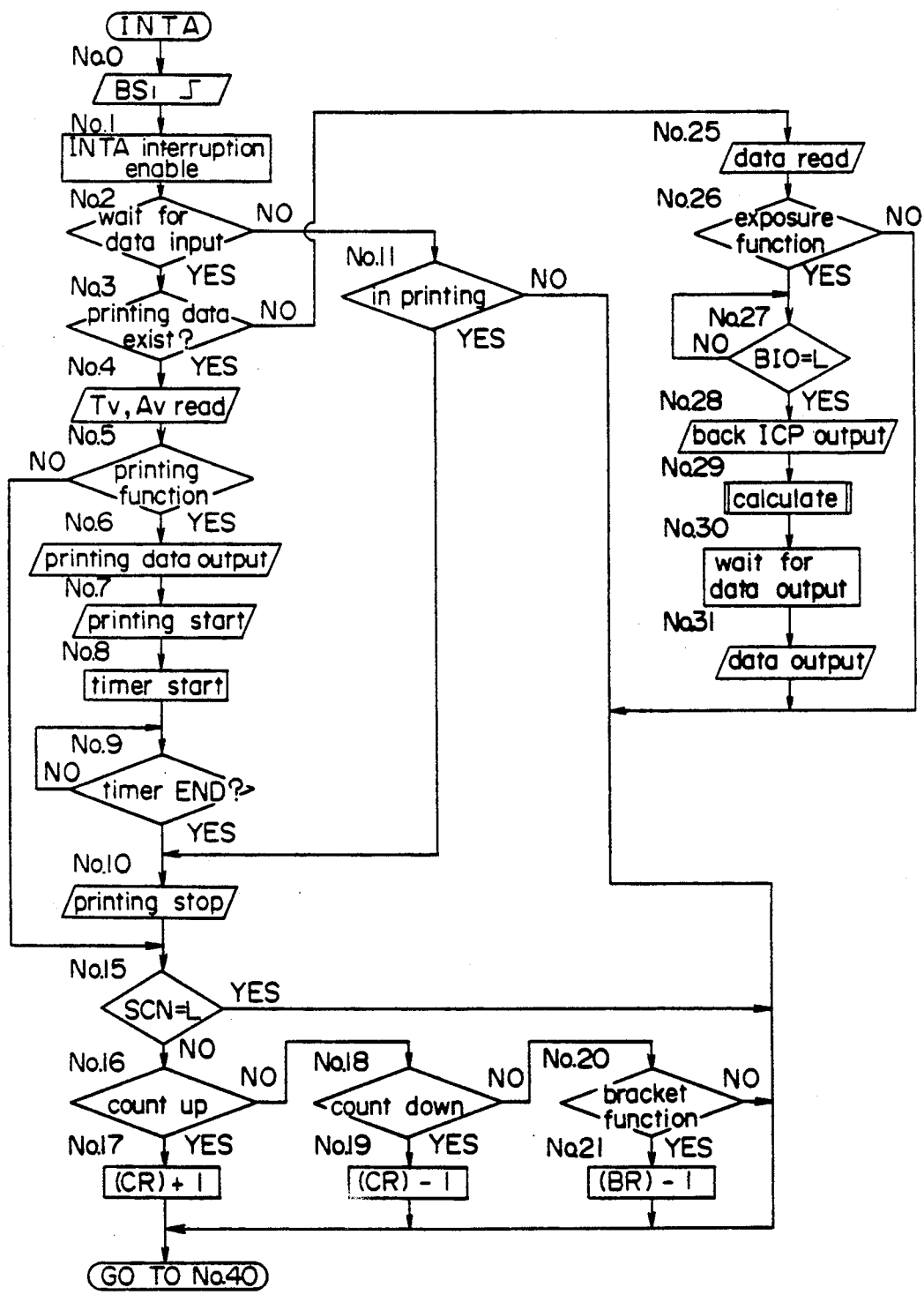
FIGS. 99(a) and 99(b) are flow charts showing the operations of the control microcomputer CMC.
Figure 99B:
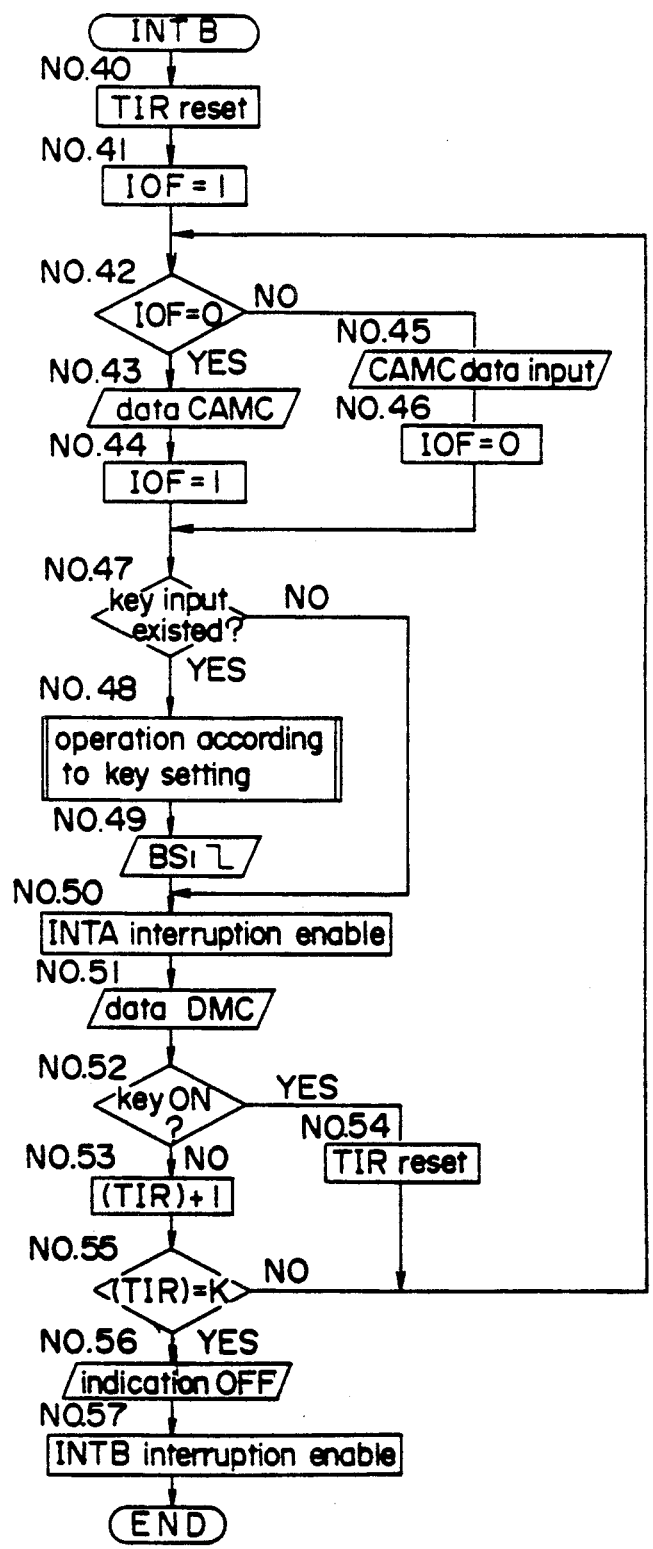
Figure 100:
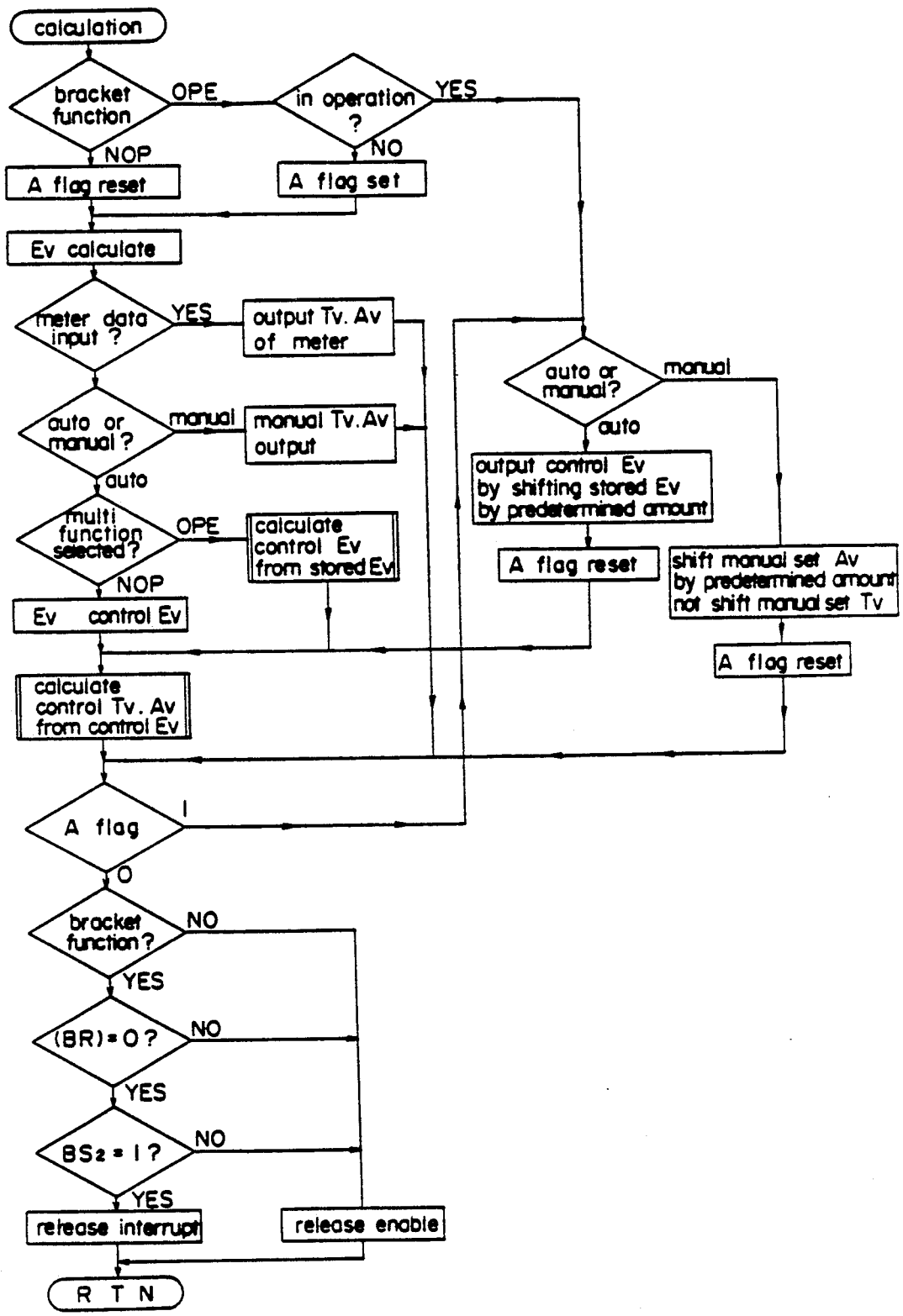
FIG. 100 is a flow chart showing the operations of the arithmetic subroutine.

FIG. 100 is a flow chart showing an example of computation subroutine of step No. 29 of the main routine shown on FIG. 99. At first, it is judged whether the bracket function is selected. Unless it is selected, the A flag is reset. If it is selected, it is judged whether operation of the bracket function is carried out. If the bracket function is not executed, the A flag is set. After the A flag is reset or set, the EV value is calculated on the basis of data from the camera body BD. On the other hand, the Ev value obtained at the start of operation is not changed if the bracket function is being executed, and computation by the bracket begins.

After the present Ev value is determined, it is judged whether data from the meter MET is fetched. If it is fetched, the EXTERNAL function is set and data from the meter MET serves as control value. If the controllable limit is exceeded, the limit value is used as control value for computation in the camera body. If no data is provided from the meter MET, it is judged whether the present mode is M or M/LT mode. If either of these modes is provided, the Tv and Av manually set are output. On the other hand, unless the M or M/LT mode is provided, it is judged whether multi function is selected. If the multi function is selected, control value Ev is calculated on the basis of a stored Ev value.

FIG. 122 shows a modification of FIG. 100, wherein the charge completion signal is detected in the back circuit BCKC from the data of the flash device that have been input via the camera body, the back circuit will not perform the above computational displays, but TV and AV from camera body BD are displayed, and these data will be used as the control data. This is because a mechanism with fairly advanced functions is used for the computations for flash photography (#53 step) in the camera body as shown in U.S. Pat. Nos. 4,509,842 and 4,550,996; no specific computations for flash photography in the back circuit BCKC are necessary.

Figure 102:
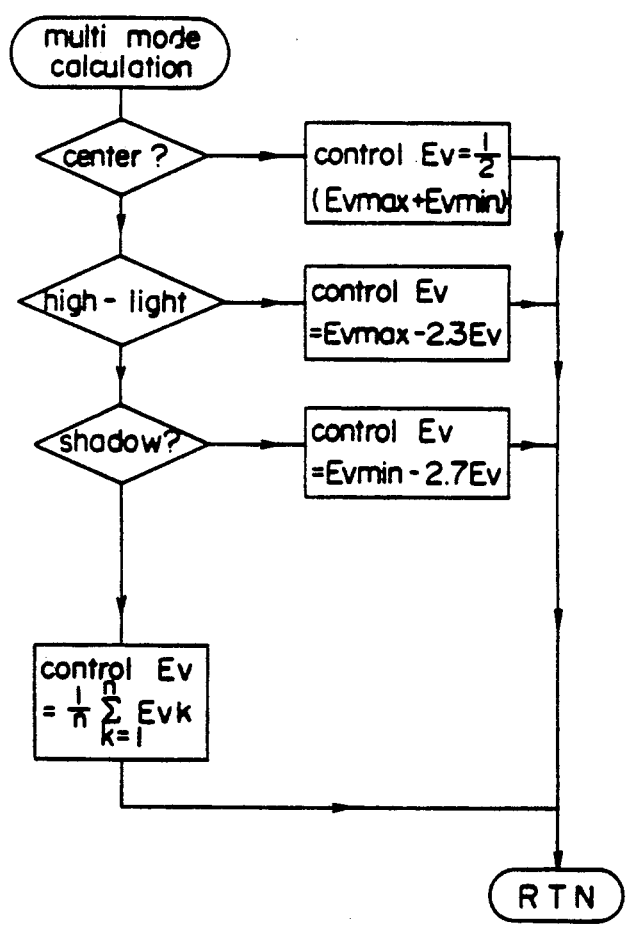
FIG. 102 is a flow chart showing the operations of the arithemetic subroutine for multifunction.

FIG. 102 shows the subroutine used for computation in this multi function. If the center mode is provided, maximum Ev value and minimum Ev value are obtained. (Ev max + Ev min)/2 is executed to obtain control Ev. If the center mode is not provided, it is judged whether high light mode is provided instead. If the high light mode is provided, Ev max − 2.3 is executed using the maximum stored value Ev max to obtain control Ev. If the high light mode is not provided, it is judged whether shadow mode is provided instead. If the shadow mode is provided, Ev min + 2.7 is executed using the minimum value Ev min to obtain control Ev. If the shadow mode is not provided, the present mode is average mode. At this time, $$\sum_{k=1}^{n} Evk/n$$

(n: stored number)

is executed to obtain control Ev.

Figure 101:
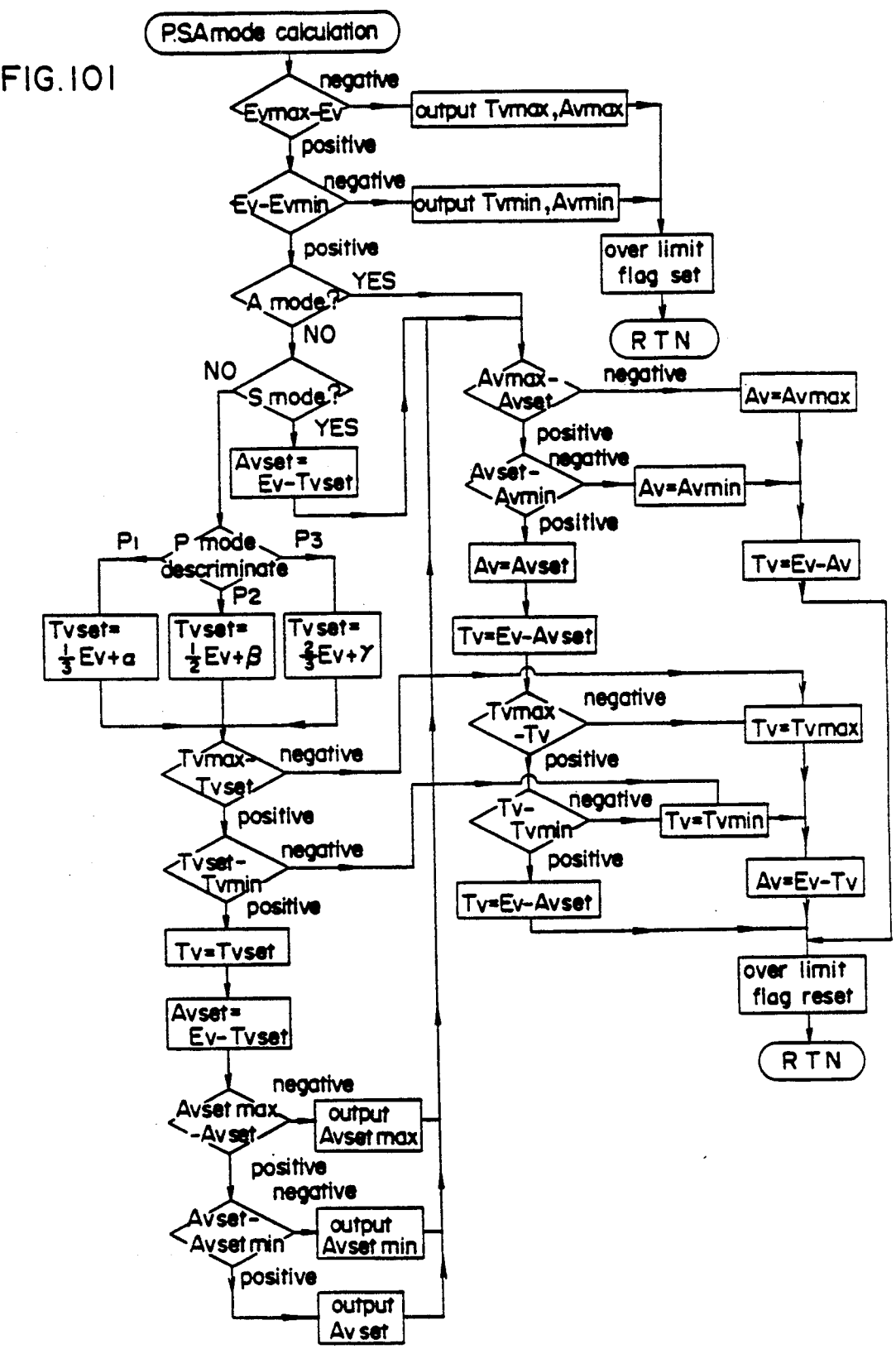
FIG. 101 is a flow chart showing arithmetic subroutine under P.S.A. subroutine.

Unless multi function is selected in FIG. 100, the Ev from the camera body serves for control Ev. In accordance with a determined control Ev, computation is performed in accordance with a selected mode from P1, P2, P3, A, and S modes. FIG. 101 shows an example of the subroutine used for this computation. In the condition where $$Ev\ max\ (=Tv\ max+Av\ max)<Ev,\ or$$

$$Ev\ min\ (=Tv\ min+Av\ min)>Ev$$

is satisfied, the exposure value is beyond the controllable range. In this case, the limit value is used for the control value and the limit flag is set to "1", so that the main routine is regained. On the other hand, if the exposure value is within the controllable range, steps of operation shown in the flow chart are performed to calculate control value and reset the limit flag. After that, the main routine (shown in FIG. 100) is regained. If a computation value calculated in the camera body BD exceeds the controllable range, the limit value is used for the computation value and a set value is output without changing. However, in the back circuit, the limit value is used for the set value and computation is performed again using the Ev and limit value to change the set value. On program mode, the limit aperture value (not maximum aperture value or minimum aperture value) can be set.

If the control Tv and Av are determined, it is judged in FIG. 100 whether the A flag is set to "1". If it is set to "1", the bracket function is selected while computation is not completed. Then, computation for the bracket function begins. Computation for the bracket function for the next shooting begins also when the bracket function is being executed. At first, it is judged whether the present mode is M or M/LT mode. If either of the M or M/LT mode is provided, the aperture value is changed by the number of frame (number of the next shootings) to reset the A flag.

On the other hand, on P1, P2, P3, A, or S mode, the Ev value is changed by the number of the frame to reset the A flag. After that, the subroutine for computation of the Tv and Av is taken. After the Tv and Av are calculated, it is judged whether the signal line BS2 is LOW. If the signal line B52 is LOW, the release impossibility signal is set to prevent photographing operation. If the above condition is not secured, the release impossibility signal is reset. After that, the main routine is regained.

Figure 105A:
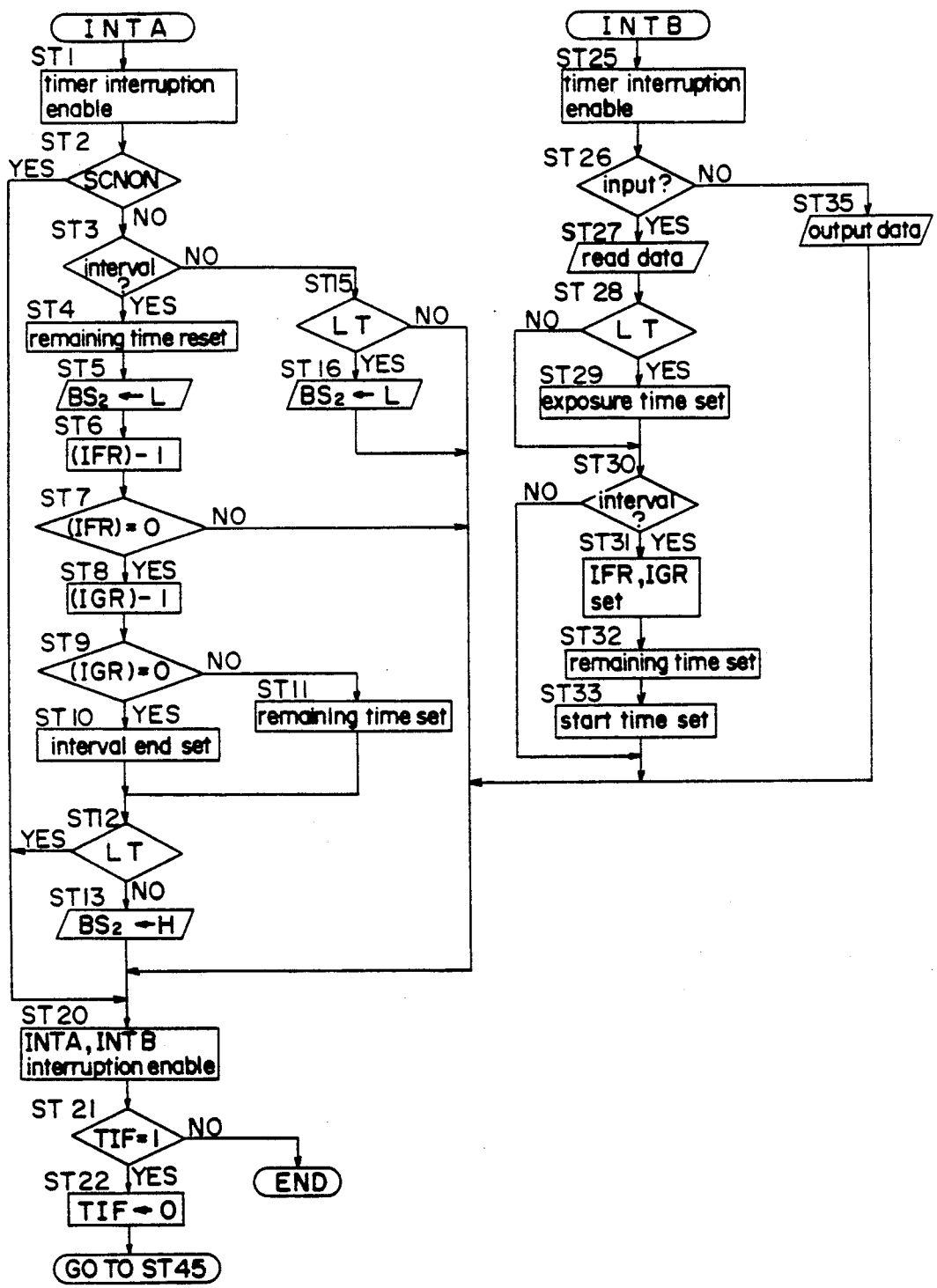
FIGS. 105(a) and 105(b) flow charts showing the operations of the calender microcomputer CAMC.
Figure 105B:
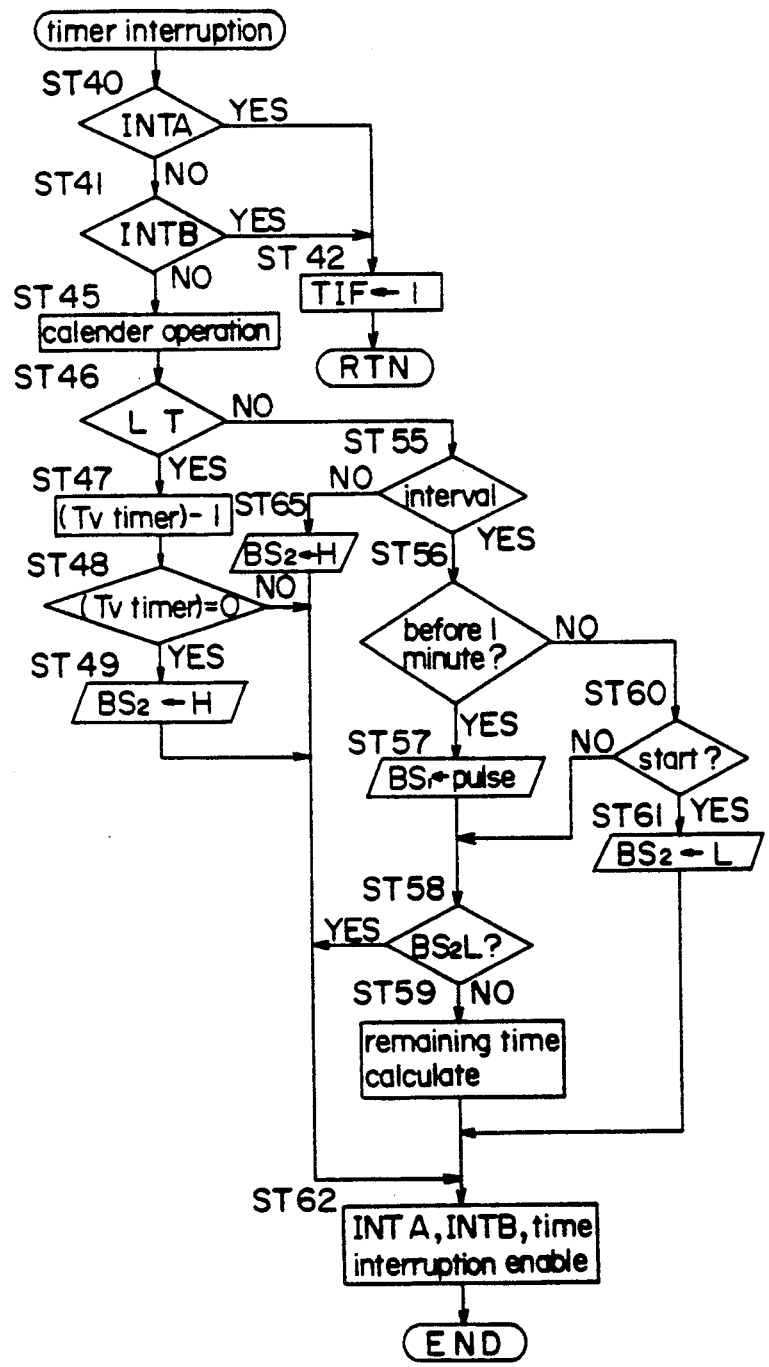

FIG. 105 is the flow chart showing the operation of the calendar microcomputer CAMC. First, where the signal line IP is set to Low by starting of the exposure operation in the camera body BD, the interrupt operation starts from the interrupt terminal INTA. Then, the timer interruption (interrupt made every second) is enabled in step ST1 and the procedure moves to step ST2. In the ST2, it is judged whether or not the switch (SCN) is ON. If it is ON, the operations of interval function and M/LT mode are not made and the procedure jumps to step ST20. If the switch SCN is OFF, it is judged whether or not the interval photographing is selected at step ST3. If the interval photographing is not selected, then it is judged whether or not the status is in the M/LT mode at step ST15. If the status is in the M/LT mode, the CAMC sets the signal line BS2 to Low. If not, the procedure jumps to the step ST20.

When the interval photographing is judged in the step ST3, the CAMC resets the remaining time until the interval photographing starts at step ST4 and sets the signal line BS2 to Low at step ST5. Then, at step ST6, the number "1" is subtracted from the register IFR to which the number of frames is set, and the procedure jumps to the step ST20 unless the content of the register IFR is "0" at step ST7. If the content of the register IFR is "0", at step ST8, the number "1" is subtracted from the register IGR to which the number of groups is set and it is judged whether or not the content is "0" at step ST9. If the content is "0", the interval end signal is set at step ST10. If not, the remaining time is set at step ST11, and it is judged whether or not the status is in the M/LT mode at step ST12. If the status is not in the M/LT mode, the signal line BS2 is set to HIGH at step ST13. If it is in the M/LT mode, the procedure jumps to step ST20 with the signal line BS2 kept LOW. And the interruption to the interrupt terminals INTA and INTB is enabled at step ST20 and it is judged whether or not the flag TIF is set to "1" at step ST21. If the flag TIF is "1", it means that the timer interruption is made during the operation. So the TIF is reset to "0" at step ST22 and the operation continues with the step ST45. If the flag TIF is "0", the operation ends.

When the control microcomputer CMC sets the signal line CSCA to LOW in order to transfer data, the calendar microcomputer CAMC performs the operation starting with step ST25 with the interrupt terminal INTB. In step ST25, the CAMC enables the timer interruption and then judges the status of signal line I/O to determine whether to output or input the data at step ST26. If the status is in the data input mode, the CAMC reads the data transferred from the control microcomputer CMC in step ST27. Then it is judged whether the M/LT mode is selected or not at step ST28. If the operation is in the M/LT mode, the exposure time is set at step ST29. When the M/LT mode is not selected or counting is made in the M/LT mode, the procedure moves to step ST30. In the step ST30, it is judged whether or not the interval function is selected and the operation is ready. When the interval function is not selected or the operation is made, the procedure jumps to the step ST20. While the interval function is selected but no operation is started, the number of frames is set to the register IFR, and the number of groups is set to the IGR, interval between groups (remaining time) and start time are set; then the procedure moves to the step ST20. When it is judged in the step ST26 that the status is in the data output, the CAMC transfers the data previously mentioned to the control microcomputer CMC and the procedure moves to the step ST20.

When the timer interruption is made every second, the operation is started with steps ST40 and ST41. If the operation is being made with the interruption terminals INTA and INTB, the flag TIF is set to "1" at step ST42 and the procedure returns to the original operation flow. If the above operation is not performed or those with the INTA and INTB are ended, the operation is started with step ST45. In the step ST45, the calendar is written with the 1-sec increment. Then it is judged whether or not the operation is made in the M/LT mode at step ST46. If the operation is being made in the M/LT mode, the number "1" is subtracted from the set second (Tv timer) and it is judged whether or not the Tv timer is set to "0" at step ST47. If it is not set to "0", the procedure jumps to the step ST62, the interruption by the INTA, INTB, and timer are enabled, and the operation ends. If the content of the Tv timer is "0" in the step ST48, the signal line BS2 is set to HIGH, the second shutter curtain traveling is started in the camera body, and the procedure moves to the step ST62.

When it is judged that no operation is made in the M/LT mode in the step ST46, it is then judged whether or not the interval photographing is being operated. If the interval photographing is not being operated, the signal line BS2 is set to HIGH and the procedure moves to the step ST62. This may cause the non-operation status (operation stop) because the operation key (8) is pressed during the operation of the M/LT mode and interval function. In this case, the exposure control operation of the camera is stopped by setting the signal line BS2 to HIGH in order to stop the M/LT and interval operations.

When it is judged that the interval function is selected in the step ST55, the procedure moves to the step ST56 and it is judged whether or not the status is more than one minute before a group photographing starts. If the status is more than one minute before it starts, the LOW pulse is output to the signal line BS1 at step ST57, the camera body BD is actuated, and the charge-up operation of the flash device FL is started. In this case, since the HIGH pulse is output to the signal line BS2, operation proceeds from step ST58 to ST59 where the time until the start is calculated and the procedure moves to the step ST62. If it is judged in step ST56 that the status is not more than one minute before a group photographing starts, then it is judged whether or not it is the time when a group photographing starts. If it is the time, the signal line BS2 is set to LOW and the procedure moves to the step ST62. If it is the time before or after the photographing starts, it is judged whether or not the LOW pulse is output to the signal line BS2 at step ST58. If the LOW pulse is output, the procedure immediately moves to the step ST62 because it means that a group photographing is being operated. If the HIGH is output to the signal line BS2, the status is before the interval photographing starts or between groups. So the remaining time until the start is calculated at step ST59 and the procedure moves to the step ST62.

Figure 106:
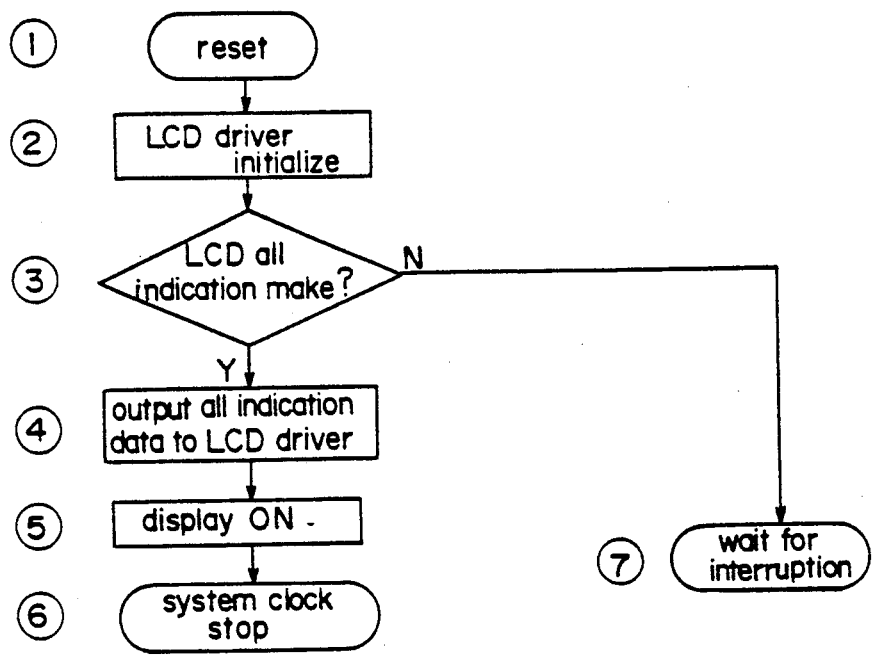
FIG. 106 is a flow chart showing the reset routine of the display microcomputer DMC.

The following is the description of the display microcomputer DMC, LCD segment driver SD, LCD common driver CD, power source DD for driving LCD, and graphic display block consisting of the liquid crystal display LCD shown in FIG. 98. First, the data (4 bits) shown in Table 2 is transferred from the control microcomputer CMC to the display microcomputer DMC through the data bus DBUS2, according to the transfer clock DCK2, converted into the graphic displaying data, and serially transferred to the LCD segment driver SD. The LCD segment driver SD has the LCD displaying RAM of which 1-bit data corresponds to the turn-on/off of 1 dot on the liquid crystal display LCD. After the graphic display data is transferred to the LCD segment driver SD, it is stored in the LCD displaying RAM, and the LCD segment driving signal SGT corresponding to the contents of LCD displaying RAM is given to the liquid crystal display LCD by the LCD segment driver (SD). The LCD common driver CD generates the timing signal necessary for display with the built-in oscillator and outputs the LCD common scanning signal CMT to the liquid crystal display LCD, which automatically scans the common signal of the liquid crystal display LCD according to the display duty. The LCD segment driving signal SGT is synchronized with the LCD common scanning signal CMT by the synchronizing signal HS which is supplied from the LCD common driver CD to the LCD segment driver SD. The liquid crystal display LCD displays the dot matrix graphic with these two signals: the LCD segment driving signal SGT and the LCD common scanning signal CMT. The reference power source DD for driving the LCD supplies the stable power VDP for driving the liquid crystal display LCD to the LCD segment driver SD and the LCD common driver CD. The above mentioned is the outline of operation in which the graphic pattern is displayed on the liquid crystal display LCD by the data transferred from the control microcomputer CMC. The following is more detailed description of the operation according to the flow chart of the display microcomputer DMC: First, the display microcomputer DMC is turned ON by the signal line DEN from the control microcomputer CMC to the display microcomputer DMC and starts the reset routine shown in FIG. 106 (step 1). In the step 2, the LCD segment driver SD is initialized and the liquid crystal display LCD is turned OFF (all-bit turn-OFF). It is judged whether or not the status is in the all-bit turn-ON mode in the step 3, then the interruption waiting state is normally set in the step 7. The judgement of the all-bit turn-ON mode is used for the disconnection test at the factory. In the all-bit turn-ON mode, the all-bit turn-ON data is output to the LCD segment driver SD (step 4), the liquid crystal display LCD is turned on in the step 5, and the system clock is stopped in the step 6. When the status is not in the all-bit turn-ON mode (this is the normal status), the interruption waiting state is set in the step 7 and the control waits for the interrupt to come from the control microcomputer CMC.

Figure 107:
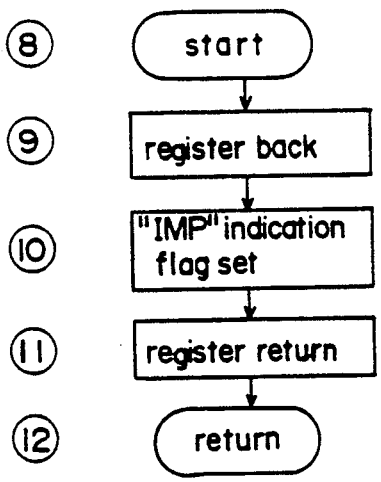
FIG. 107 is a flow-chart showing the imprint routine of the display microcomputer DMC.

The in-print routine shown in FIG. 107 is used for setting the flag to show the fixed-time in-printing display "IMP" during printing, which is started by the in-print signal IP from the camera (step 9), performs the register save in the step 9, sets the "IMP" displaying flag, before resetting the register in the step 11 and returning to the original main routine in the step 12.

Figure 108:
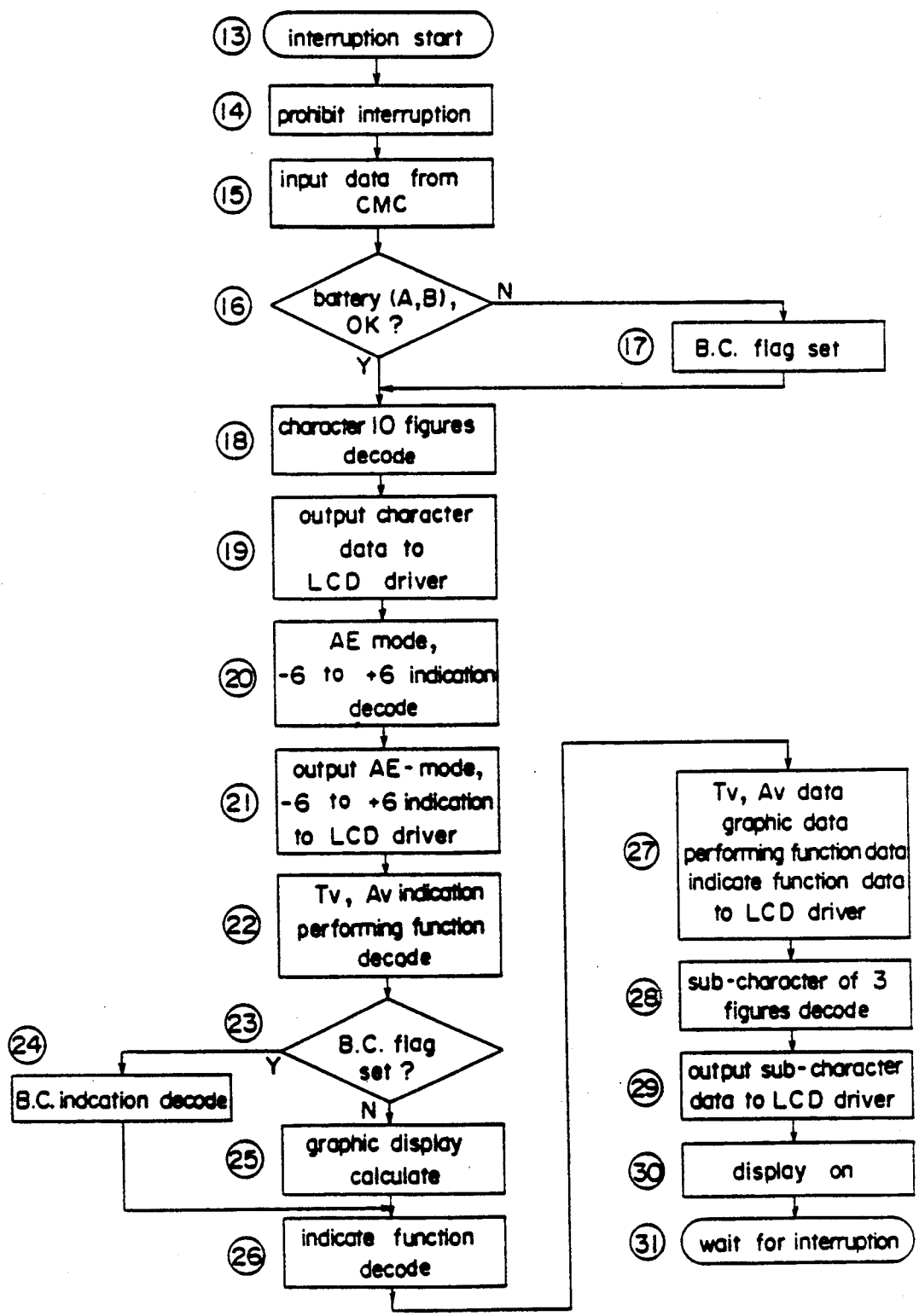
FIG. 108 is a flow chart showing the main routine of the display microcomputer DMC.

The main routine shown in FIG. 108 is started by the signal CSDM transferred from the control microcomputer CMC to the display microcomputer DMC in the step 13, prohibits the restart of the main routine until overall processing is completed in the display microcomputer DMC in the step 14. The data transferred from the control microcomputer CMC shown in Table 2 is input in the step 15, and the supply voltage is checked in the step 16. The supply voltage check flag (B. C. flag) is set in the step 17 if the supply voltage is lower than the specified value. In the step 18 through step 29, the data transferred from the control microcomputer CMC is decoded to the graphic displaying data.

This decoding is performed for the data on character display section 16 in FIG. 6 beginning at step 18. The data is converted into graphic display data by referring to the tables for mode name indication, INPUT display and OUTPUT display, then delivered to the LCD segment driver SD, where the data is written in the LCD display RAM (step 19). Next, the indicator denoting the controllable range and the data on mode-selected display 18 in FIG. 6 are decoded (step 20), then delivered to the LCD segment driver SD (step 21). The objects of the next decoding of graphics display data are the indicator denoting the shutter speed and the aperture, the symbols denoting whether or not the individual functions are being performed. At step 23, the B. C. flag which was determined at step 16 is checked. If the flag is set, the battery check (B. C.) display appears (step 24); if not, an operation corresponding to the function selected through the external display is performed at step 25. In addition, the selected function itself is decoded (step 26). The graphic display data obtained at steps 22–26 is delivered to the LCD segment driver SD at step 27. The operation corresponding to the function selected through the external display at step 25 is described below in detail.

Figure 109:
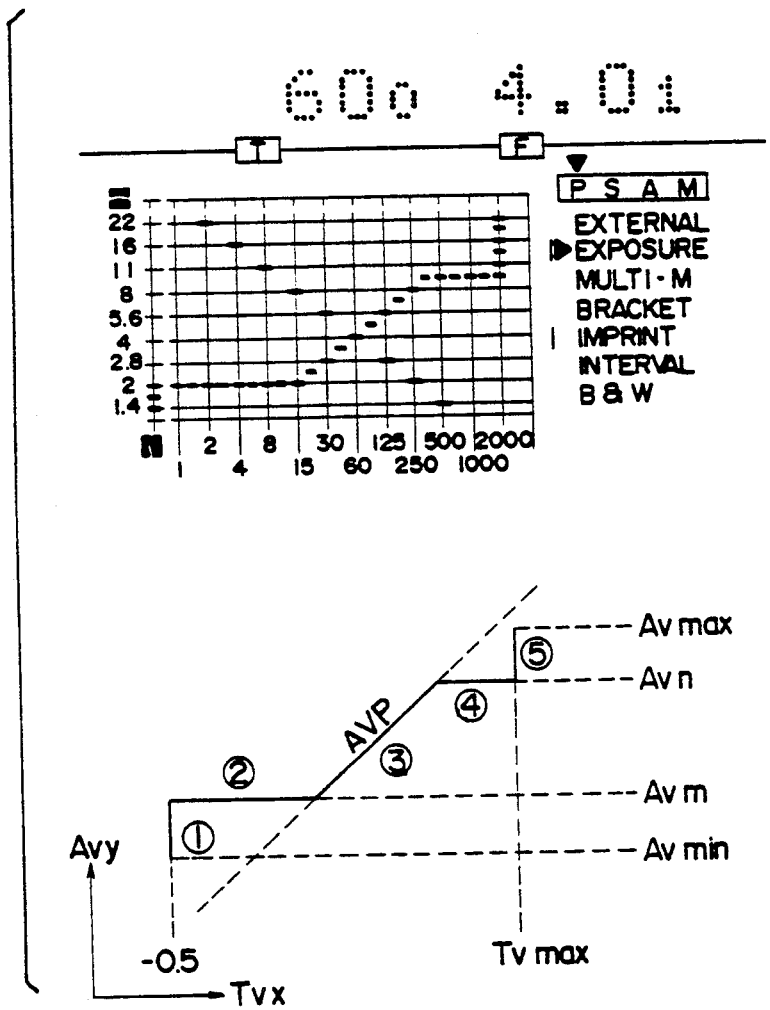
FIG. 109 is a diagram describing how the program lines are displayed under P mode.
Figure 110:
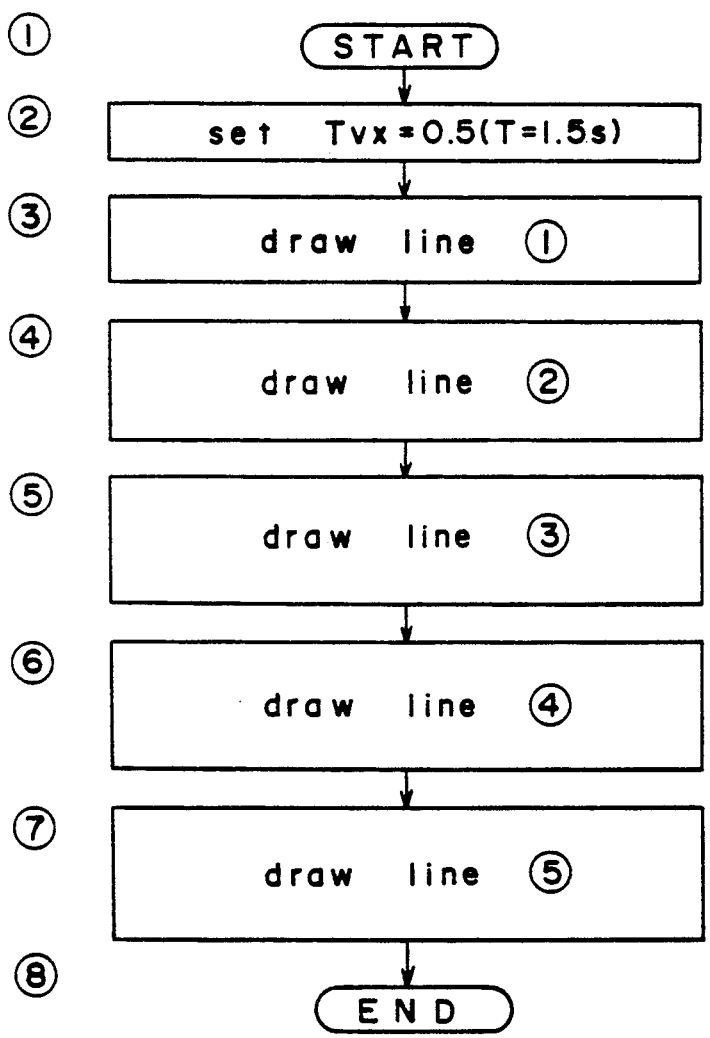
FIG. 110 is a flow chart describing how the program lines are displayed under P mode.
Figure 112:
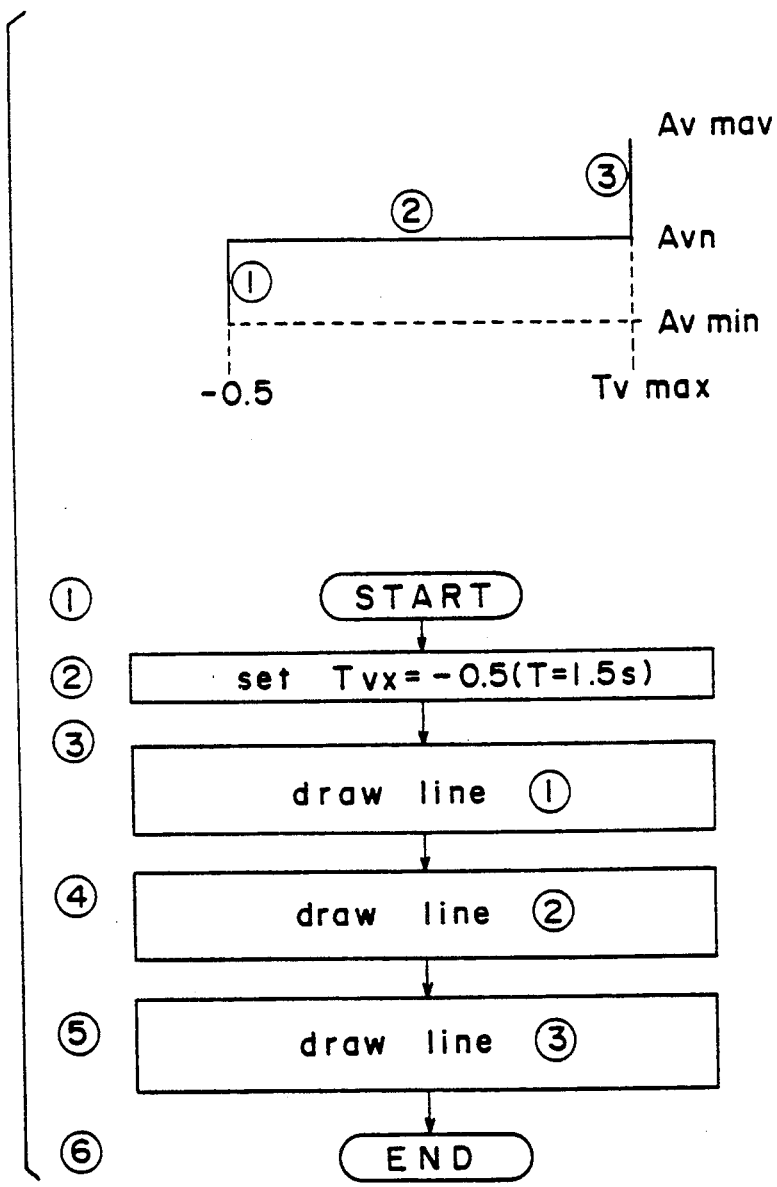
FIG. 112 is a flow chart showing how the program lines are displayed under A mode.
Figure 113:
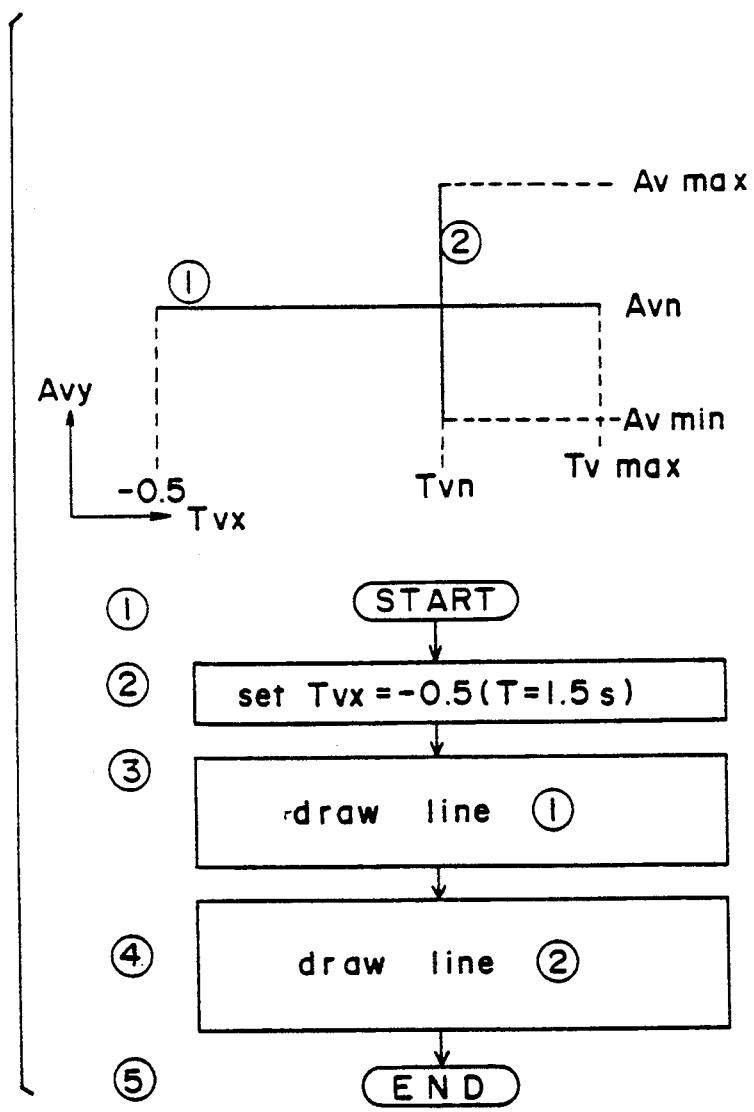
FIG. 113 is a flow chart showing how the program lines are displayed under M mode.
Figure 114:
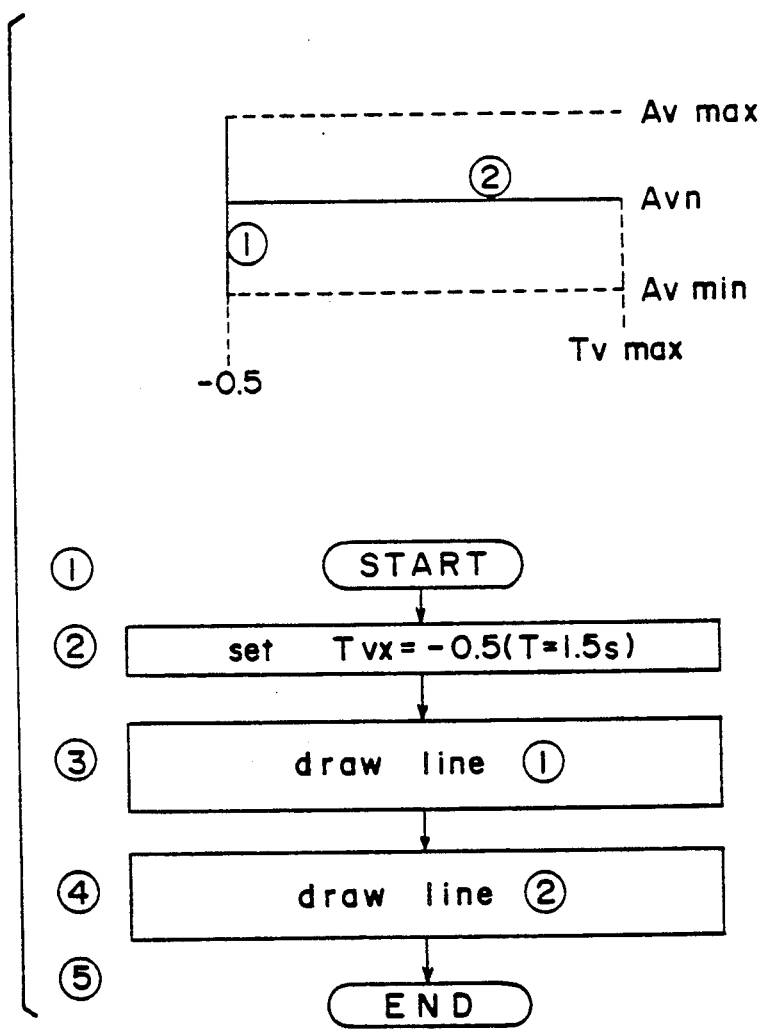
FIG. 114 is a flow chart showing how the program lines are displayed under M/LT mode.

If the EXPOSURE function is selected, aperture values appropriate to the each shutter speed are obtained while shifting the shutter speed in succession to draw Ev line 25 in FIG. 6. Next, the programmed line 26 corresponding to the selected exposure mode (P1, P2, P3, S, A, M, M/LT) is drawn (like 26 in FIG. 6) with the procedure shown in FIGS. 109–114. Suppose that the P1, P2, or P3 mode is selected, in FIG. 109, let Av max be the minimum aperture value of the lens, Av min the maximum aperture value of the lens, Avn the set limit for the minimum aperture side. Avm the set limit for the maximum aperture side, and Avp the selected gradient. With the procedure shown in FIG. 110, Avy is drawn while changing Tvx as outline below: At step ②, Tvx= −0.5 is assumed. At step 3, segment ① is drawn. While Tvx is increased in increments, segments ②–④ are drawn (steps ④–⑥). Finally, line ⑤ is drawn with Tvx=Tv max (step ⑦). The operation for program line 26 in FIG. 6 corresponding to the P1, P2, or P3 mode is described above. In the P1 or P3 mode, the gradients of the Avp line and are 2:1 and 1:2, respectively. This means that, if these lines are drawn as in the P2 mode, they show a step-like form because of their gradients, so raise difficulty in further operation. To avoid this problem which occurs in the P1 or P3 mode, a technique is adopted to align straight the points (Tvx, Avy) obtained through computation (see FIGS. 6 and 8). FIG. 111 shows how to draw the program line in the S mode, Tvn denoting the set shutter speed. At step ②-③, the line for Avy=Av min (segment ①) is drawn while increasing Tvx in increments; next, the lines for Tvx=Tvn (segment ②) are drawn (step ④); finally, the line for Avy=Av max (segment ③) is drawn while increasing Tvx in increments again (step ⑤). FIG. 112 shows how to draw the program line in the A mode, Avn denoting the set aperture value. At steps ②-③, segment ① is drawn with Tvx=−0.5; at step ④, the line for Avy=Avn (segment ②) is drawn while increasing Tvx in increments; at step ⑤, segment ③ is drawn with Tvx=Tv max. FIG. 113 shows how to draw the program line in the M mode. At steps ②-③, the line for Avy=Avn (segment ①) is drawn while increasing Tvx in increments; at step ④, the line from Avy=Av min to Avy=Av max (segment ②) is drawn with Tvx=Tvn, where Avn and Tvn denote the set aperture and set shutter speed, respectively. FIG. 114 shows how to draw the program line in the M/LT mode. At steps ②-③, the line from Avy=Av min to Avy=Av max (segment ①) is drawn with Tvx=−0.5; at step ④, the line for Avy=Avn (segment ②) is drawn while increasing Tvx in increments. It is also possible to draw the program line in the M/LT mode with the same procedure as in the M mode. Described above are the operations performed for graphics displays when the exposure function is selected.

Figure 115:
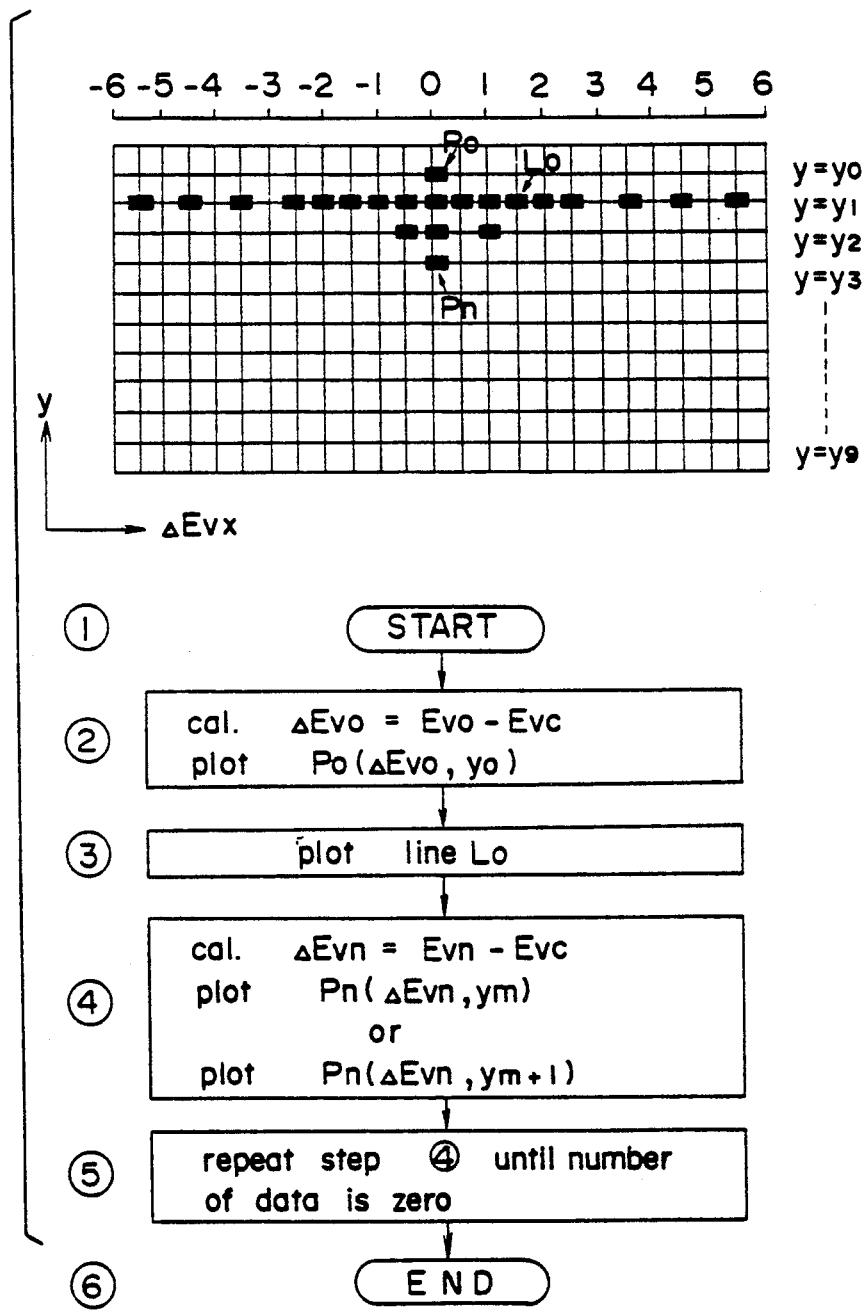
FIG. 115 is a flow chart showing how displays are made through multifunction.

The calculation at the graphic display section when the multifunction is selected on the external display will hereinbelow be described. At this time, the −6 to +6 indicator (hereinafter abbreviated as ΔEvx) representing the controllable range has already been decoded so that the liquid crystal display device LCD indicates it at the step ⑳ in FIG. 108. Also, the indicator representing the shutter speed value (22 in FIG. 6) and the indicator representing the aperture value (23 in FIG. 6) have already been decoded, but the liquid crystal display device is set not to indicate them. When the Ev value controlled in the automatically controlled mode is Evc, the Ev value at present light measurement is Evo, and the number of data stored is n, the point Po (ΔEvo, yo) presently under light measurement is plotted at the step ② in FIG. 115, and then the line Lo is plotted (step ③). At the step 4, the point Pn (ΔEvn, ym) is plotted (however, $1 \leq n \leq 8$, $2 \leq m \leq 9$). This operation is shown by the flowchart of FIG. 115. In this manner, calculation is performed at the graphic display section when the multifunction is selected.

Figure 116:
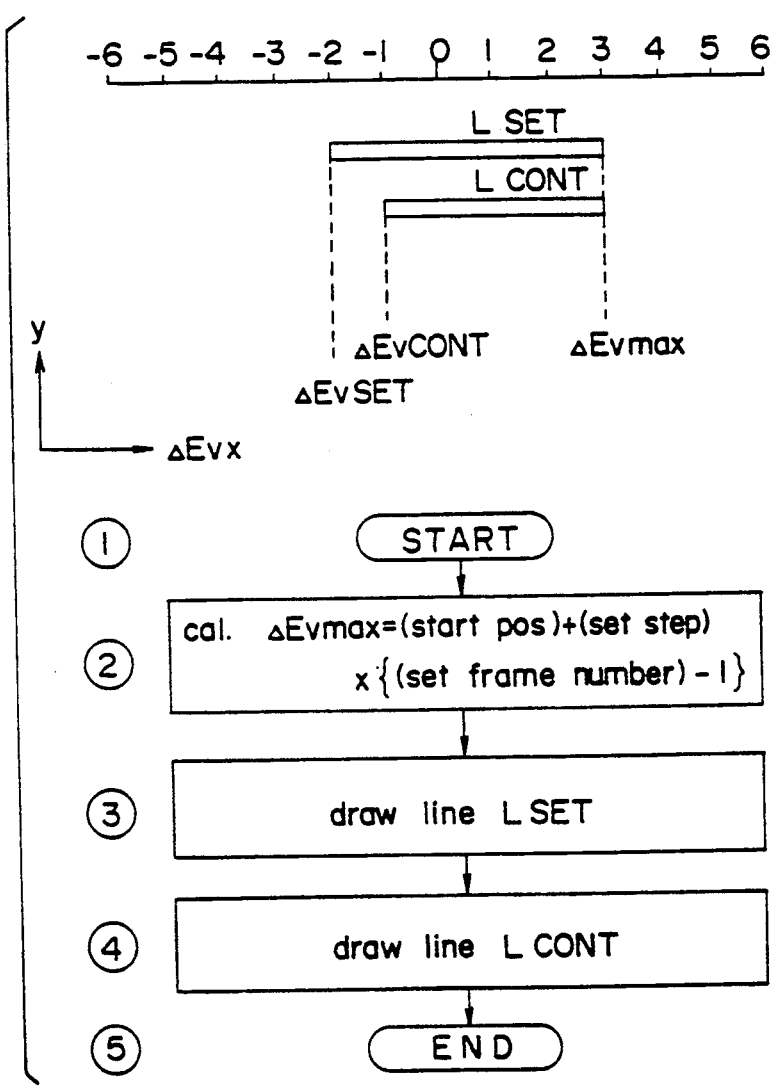
FIG. 116 is a flow chart showing how displays are made through bracket function.

The calculation at the graphic display section when the bracket function is selected at the external display will now be described below as shown in FIG. 116. The indicator −6 to +6 representing the deviation amount from the correct exposure has already been decoded at the step of FIG. 108 so that the liquid crystal display device LCD indicates it as in the case of the multifunction. When the present point is ΔEvCONT and the setting start point is ΔEvSET, ΔEv max is calculated at the step ② in FIG. 116, the line LSET from ΔEvx=ΔEvSET to ΔEvx=ΔEv max is drawn at the step ③, and the line LCONT from ΔEvx=ΔEvCONT to ΔEvx=ΔEv max is drawn at the step ④. In this manner, calculation is conducted at the graphic display section when the bracket function is selected. When the calculation at the graphic display section is finished as described above, the sequence advaces to the step in FIG. 108. Then, the symbol (20 in FIG. 6) representing the function selected at the external display is decoded. The decoding result at the steps and is output to the LCD segment driver SD the step together with the calculation result at from step . At the steps and , the "IMP" flag representing that printing is being performed is tested. When it is set, IMP is decoded to the sub-character and output to the LCD segment driver SD.

When all of the graphic display data items are decode-calculated and serial-transmitted to the LCD segment driver SD, the liquid crystal display device LCD is turned ON (step 30), and the process-1 loop of the display micon DMC is finished. Then at the step 31, the system waits for the interrupt signal CSDM sent from the control micon CMC. When the interrupt signal CSDM is sent, the display micon DMC again starts the main routine, and the processing for the next graphic display is started from the step 13 in FIG. 108. In the manner described above, the graphic pattern is indicated on the liquid crystal display device LCD in accordance with the data sent from the control micon CMC to the display micon DMC.

Figure 117:
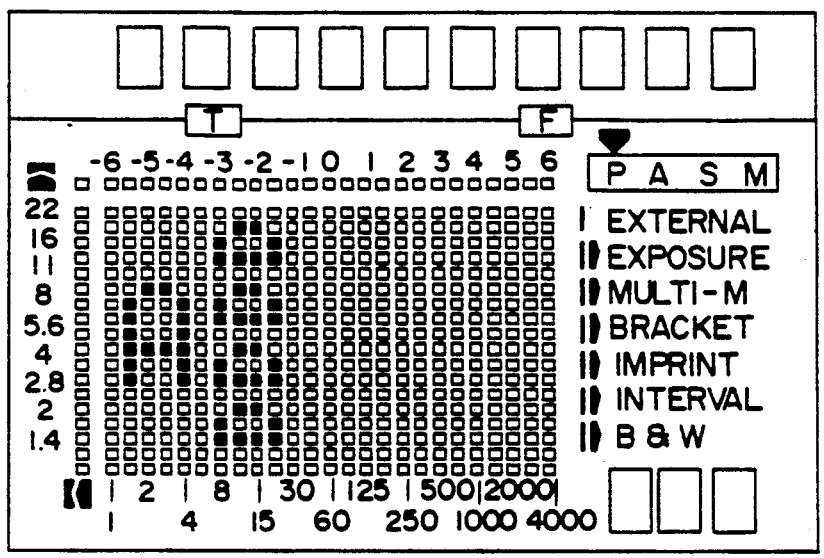
FIGS. 117 and 118 are diagrams showing the examples of displays when the power of the power source battery has declined.
Figure 118:
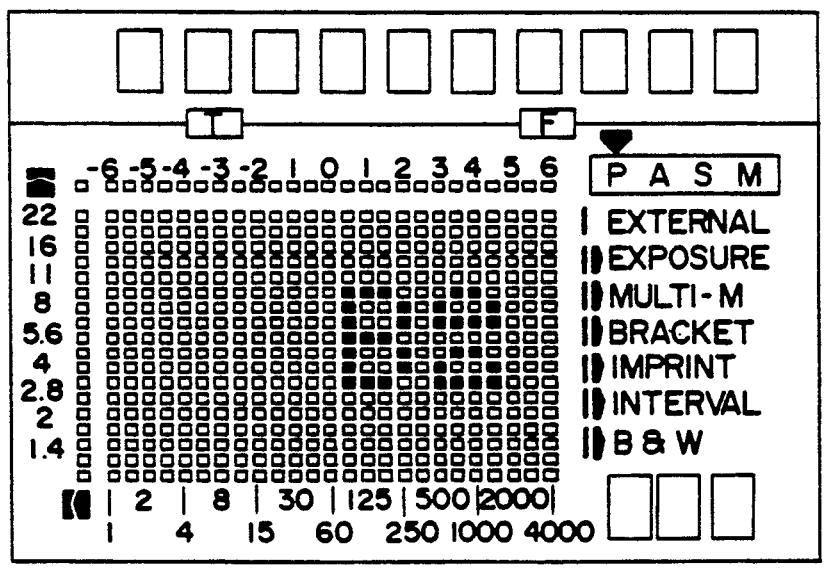

In back circuit BCKC of FIG. 98, 3-volt power is fed from a combination of two power supply batteries (B) (not shown) to the calendar micon CAMC, and 6-volt power is fed to the control micon CMC and the display micon DMC by a combination of four power supply batteries (A). In the battery check by the display micon DMC, the power supply batteries (A) and (B) are checked. When the power supply batteries (A) are inoperable, the symbol (A) and shape of four batteries are indicated at the graphic display section 24 as shown in FIG. 117. When the power supply batteries (B) are inoperable, the symbol (B) and shape of the two batteries are indicated as shown in FIG. 118.

Figure 119:
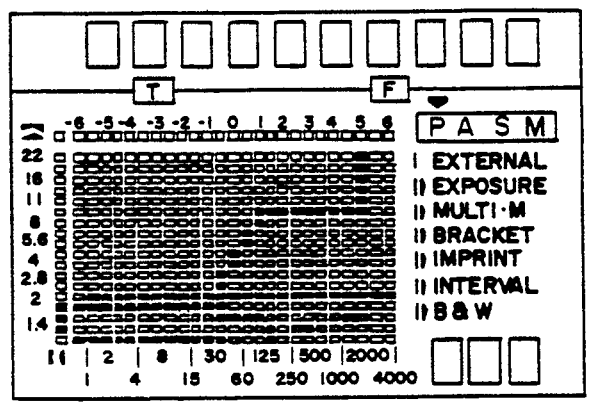
FIGS. 119(a), 119(b) and 119(c) are diagrams showing an example under P1 mode.
Figure 119:
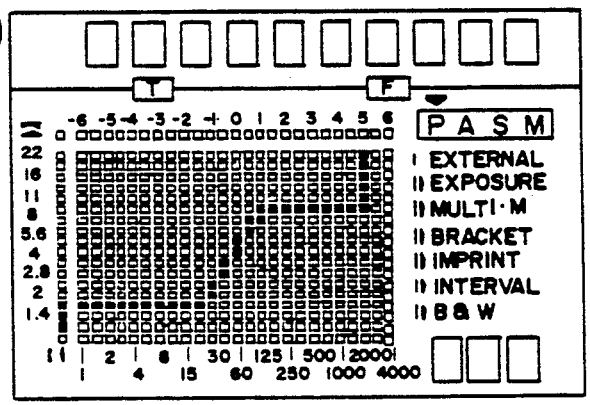
Figure 119:
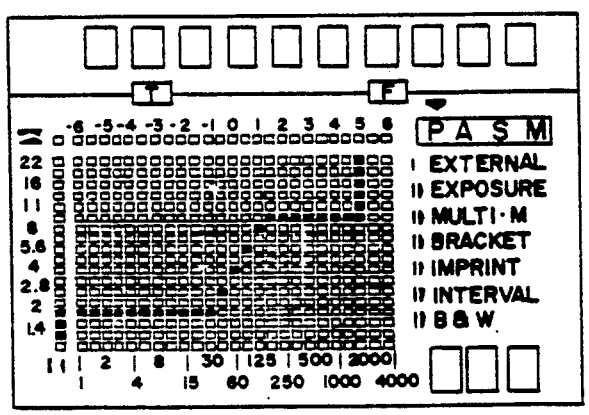

The manner of drawing the line Avp (in FIG. 109) having the inclination in the P1 mode will hereinbelow be described. The line having the inclination of shutter speed: aperture value=1:2 may be drawn in three ways, i.e. (a), (b) and (c) as shown in FIG. 119. Specifically, in this embodiment, the minimum display step at the liquid crystal display device LCD is 0.5 Ev step in both the shutter speed direction and the aperture value direction. Therefore, when the point is displayed for each of the 0.5 Ev step of the aperture value, the line can be displayed as in (a) or (b) of FIG. 119. The methods (a) and (b) in FIG. 119 are different from each other in the manner of conversion of the shutter speed value and the aperture value at the time of displaying. When the line is displayed in this manner, it is not easy to discern the slope of shutter speed value: aperture value of 1:2 in the P1 mode. Therefore, in this embodiment, as shown at (c) in FIG. 119, only the point for each of 1 Ev step of the aperture value is displayed, and the intermediate points are not displayed, so that the inclination of the aperture value with respect to the shutter speed value is made clear. Also in the P3 mode, the line is displayed as shown in FIG. 8 for the same reason as described above.

Figure 120:
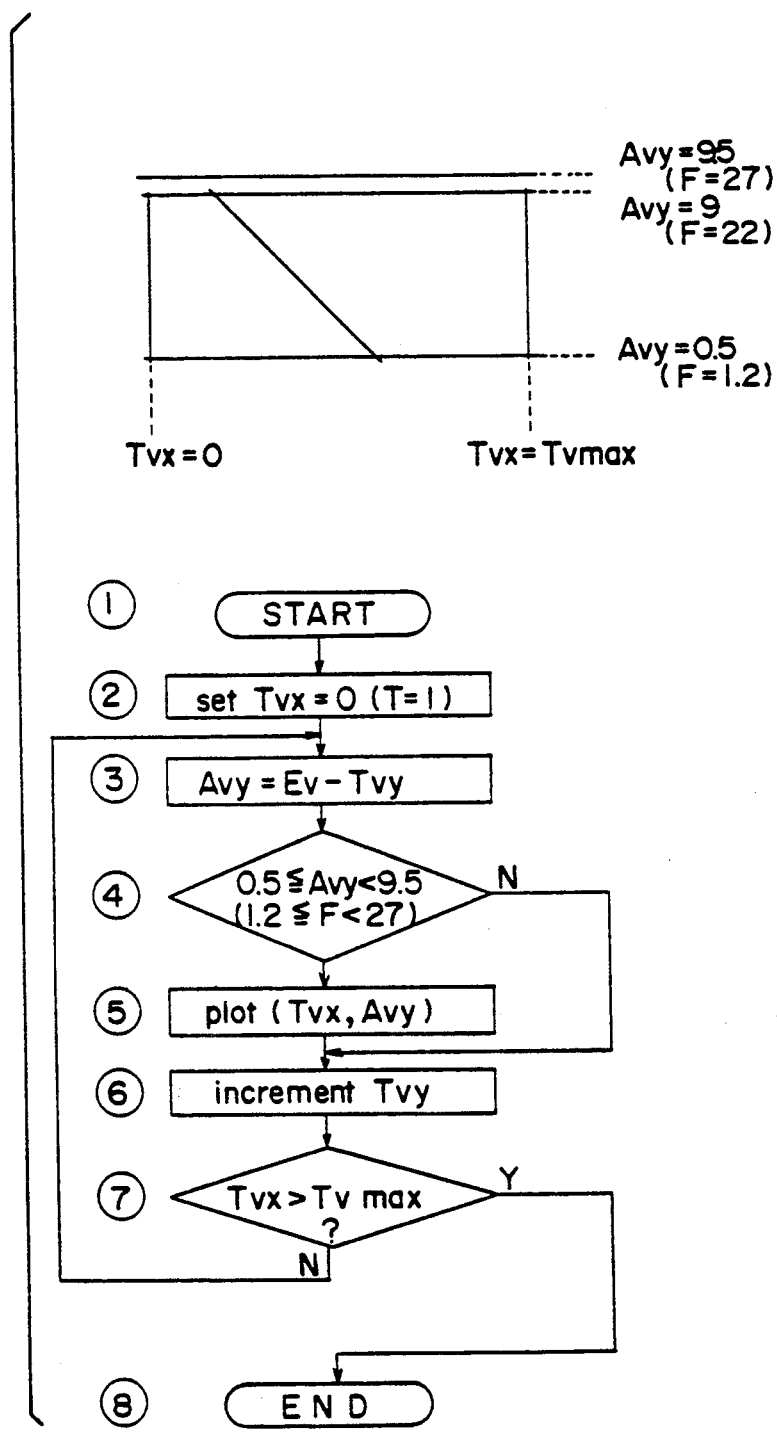
FIG. 120 is a diagram showing the displays of the EV line.

The manner of drawing the Ev line 25 (in FIG. 6) will be described below. In this embodiment, the display range of the liquid crystal display device LCD is limited to $Tv \leq 1$ for the shutter speed value and $Av \geq 0.5$ for the aperture value. However, the scales are not complete since they are represented by indicators "◁" and "△" in the range of Tv≦−0.5 and Av≧9.5. Therefore, the Ev line is not displayed in the range of Tv≦−0.5 and Av≧9.5 and is displayed only in the range of 11≧Tv≧0 and 0.5≦Av≦9.5. However, the programmed line 26 (in FIG. 6) is indicated in the range of Tv≦11 and Av≧0.5. In this case, the control point which is the intersection of the programmed line 26 (in FIG. 6) with the Ev line 25 (in FIG. 6) is displayed only within the accurate range of 11≧Tv≧0 for the shutter speed value and 0.5≦Av≦9.5 for the aperture value. The method of drawing the Ev line is shown in detail in FIG. 120. In FIG. 120, Tvx=0 (1 sec.) is initially set at the step ②, and Avy=Ev−Tvx is calculated at the step 3. Ev is the Ev value controlled in the auto mode as listed at data No. 14~15 in Table 2 and is the value sent from the control micon CMC. At the step ④, whether 0.5≦Avy<9.5 (1.2≦F<27) or not is checked. When this condition is satisfied, the point (Tvx, Avy) is plotted (Step ⑤). When it is not satisfied, the point is not plotted. Tvx is incremented by 1Ev intervals at the step ⑥, and Tvx>Tv max (Tv=11) is judged at the step ⑦. When the condition is not satisfied in the judgment, the sequence returns to the step ③ and the steps ④ to ⑦ are repeated. When the condition Tvx>Tv max is satisfied, the sequence advances to the step ⑧ and the operation is finished. Tvx may also be incremented by 0.5 Ev intervals.

In the construction shown in FIG. 1, the control microcomputer BMC provided in the camera body BD sends to and receives from the other circuits including flash circuit FL, receiver REC, display section DSP, lens circuit LEC, automatic focusing circuit AFC, back circuit BCKC, and A-D/D-A conversion circuit ADA through serial output terminals SOU, SIN, and SCK. Therefore, it is possible to judge whether the system is correctly in operation, by comparing the operation of camera system with data monitored from the serial output terminals during system operation. Here, the serial output terminals are exposed to the external portion of the camera body in the terminals $T_1$, $T_2$ and $T_3$ for back circuit BCKC and in the terminals $T_{11}$, $T_{12}$ and $T_{13}$ for lens circuit LEC. Here, since the terminals $T_1$, $T_2$ and $T_3$ are connected to all of the serial output terminals, an operating checker may be mounted instead of back circuit BCKC for checking operation of the system. Then, if the signal line CSB is set to LOW by outputting, from the checker, LOW signal which has lower impedance than the HIGH signal from the micon BMC, data giving and receiving to the circuits other than back circuit BCKC can be checked. The check for back circuit BCKC is similarly possible by using the terminals $T_{12}$ and $T_{13}$ for lens circuit LEC.

Figure 121:
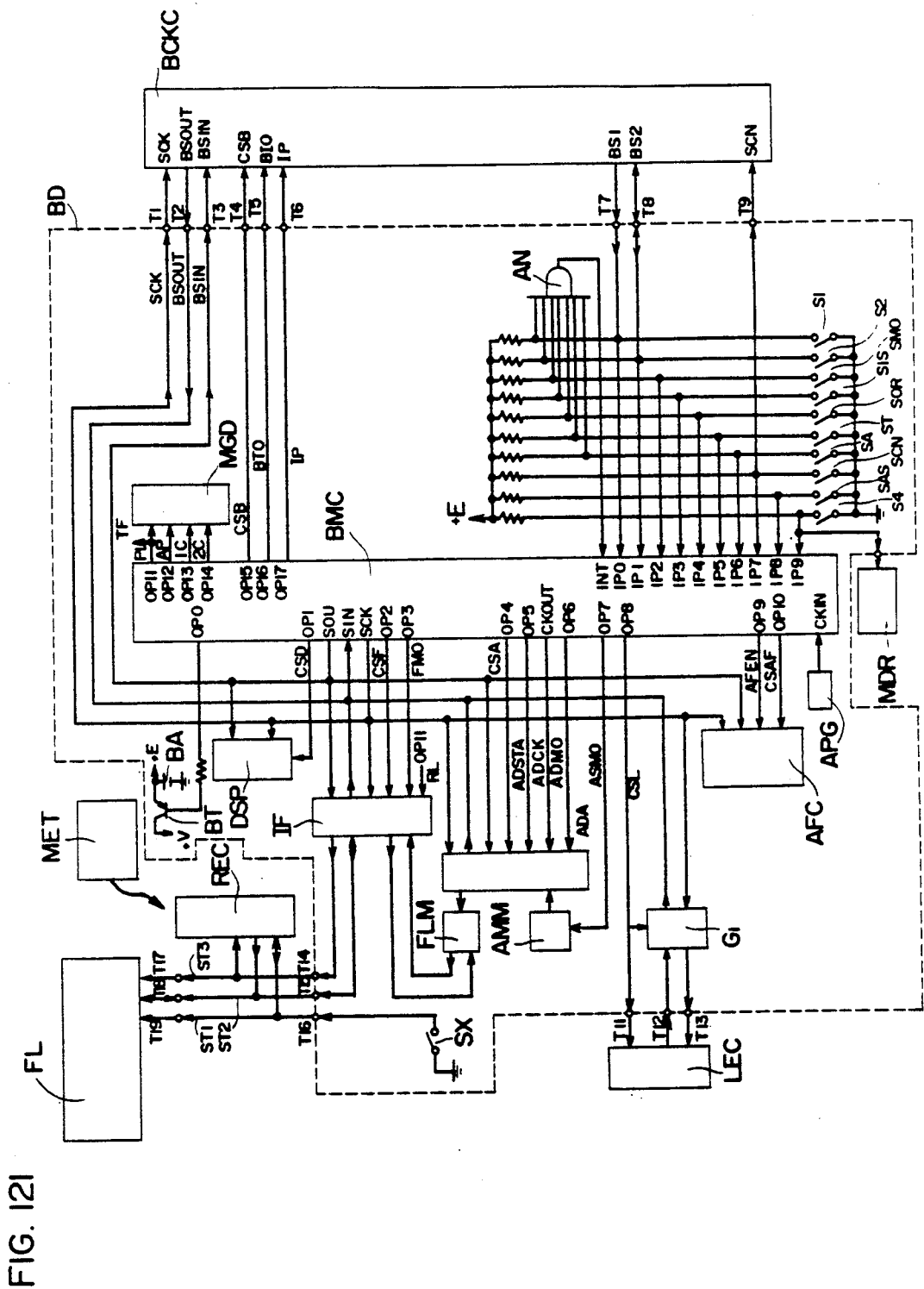
FIG. 121 is a block diagram showing an other preferred embodiment of the digital camera system according to the present invention.

Here, the terminals $T_1$, $T_2$ and $T_3$ are provided at a position which can be covered by the back BCK thus making it difficult to touch them. Therefore, the gate circuit G2 for protecting them is not necessary, and can be omitted as shown in FIG. 121. It is no problem to omit the gate circuit G2, because back circuit BCKC send or receives the data when signal line CSB is set to LOW. Furthermore, in such construction, it is not necessary to forcibly set the signal line CSB to LOW, even if the operating checker is mounted instead of back circuit BCKC.

It will be appreciated by those of ordinary skill in the art that the present invention can be embodied in other specific forms without departing from the spirit or the essential characteristics thereof. The presently disclosed embodiments are therefor considered in all respects to be illustrative and not restrictive. The scope of the invention is indicated by the appended claims rather than the foregoing description, and all changes that come within the meaning and range of equivalents thereof are intended to be embraced therein.

TABLE 1

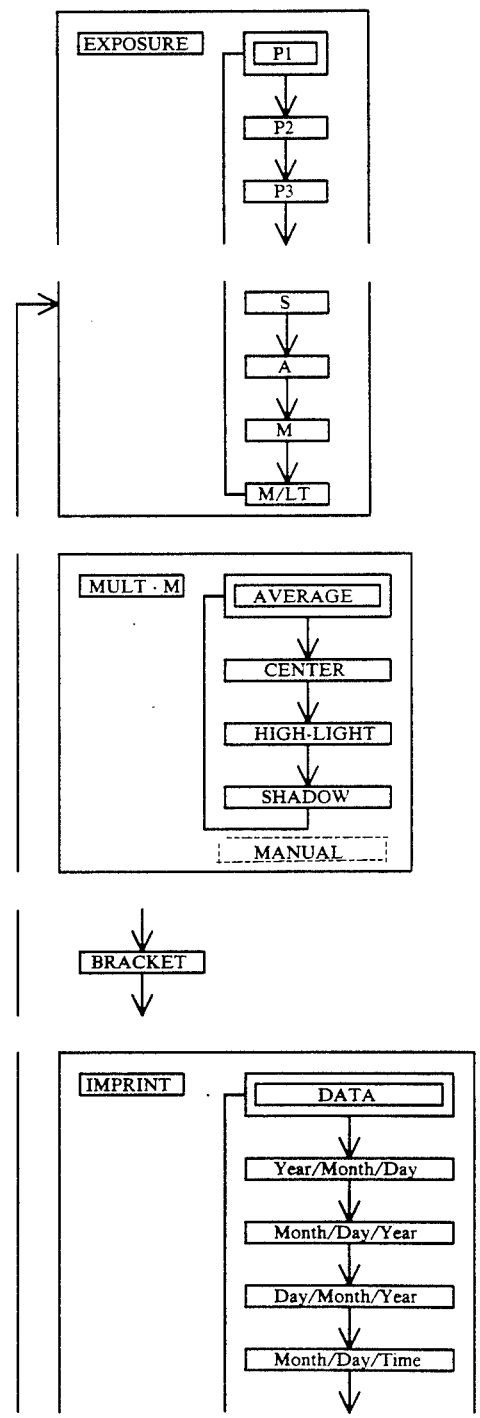

TABLE 1-continued
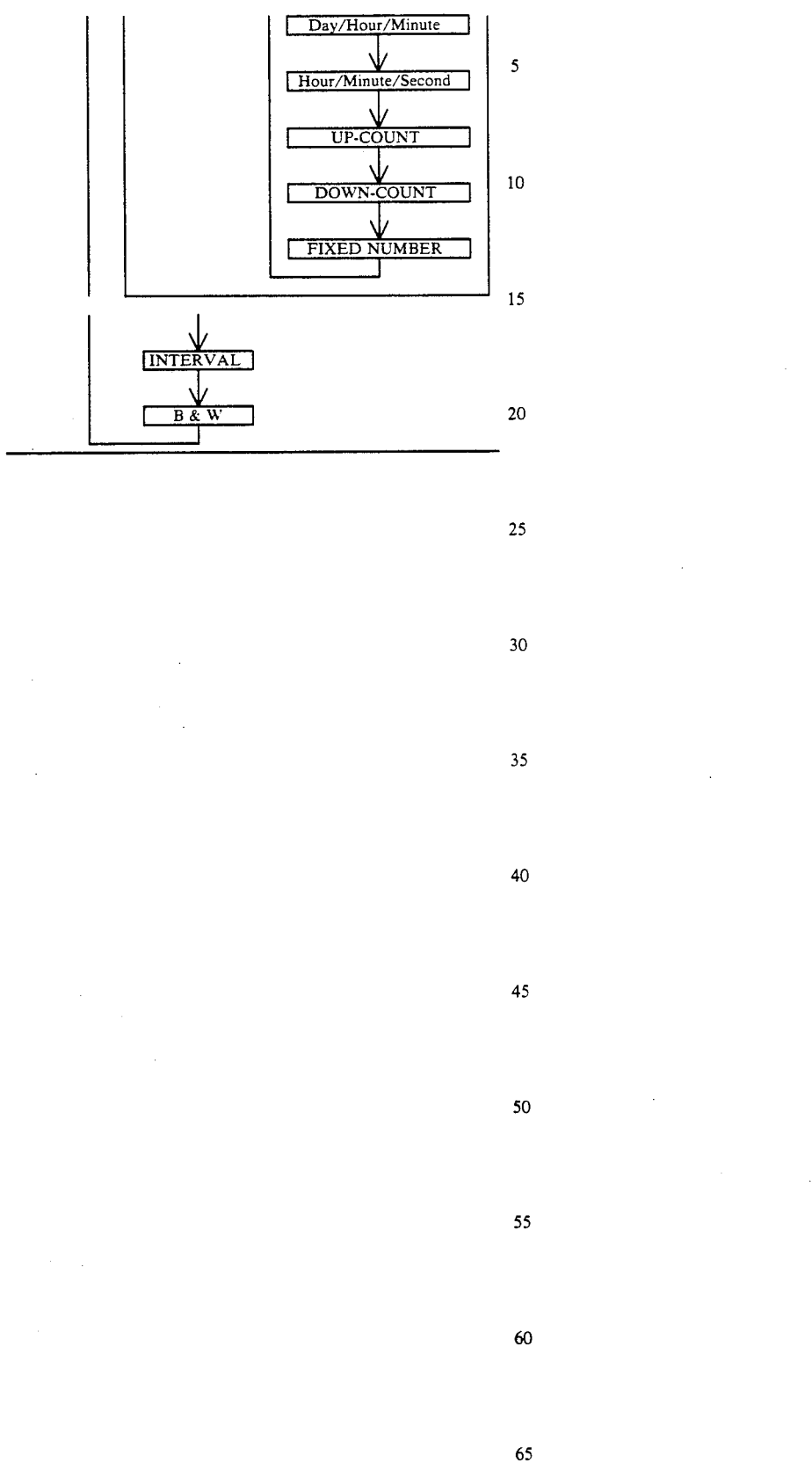

TABLE 2

| DATA NO. | CONTENTS | EXPOSURE FUNCTION & IMPRINT FUNCTION (EXP. DATA MODE) | | | MULT-M FUNCTION | BRACKET FUNCTION | IMPRINT FUNCTION | | INTERVAL FUNCTION | |
|---|---|---|---|---|---|---|---|---|---|---|
| | | $P_1, P_2, P_3$ MODE | S, A, M MODE | M/LT MODE | | | COUNT UP COUNT DOWN FIXED NO. MODE | CALENDAR NO. | START TIME, INTERVAL TIME MODE | FRAME NO./ GROUP NO./ DISPLAY MODE |
| 0~1 | EXECUTION FUNCTION | | | | | | | | | |
| 2~3 | DISPLAY FUNCTION | | | | | | | | | |
| 4~5 | MODE STATUS | | | | | | | | | |
| 6~7 | AE MODE, OTHERS | | | | | | | | | |
| 8~9 | SPARE | | | | | | | | | |
| 10~11 | (FOR CHARACTER) Tv CONTROL VALUE | | | | | | | | | |
| 12~13 | (FOR CHARACTER) Av CONTROL VALUE | | | | | | | | | |
| 14~15 | Ev VALUE CONTROLLED IN AUTO MODE | | | | | | | | | |
| 16 | * | | | Tv (1000S) | STORED $Ev_1$ | PRESENT POINT | 100,000's POSITION | (10) YEAR | (10) DAY (10) HOUR | FRAME NO. |
| 17 | * | | | | STORED $Ev_2$ | REMAINING FRAME NO. | 10,000's POSITION | (1) YEAR (10) MONTH | (1) DAY (1) HOUR | |
| 18 | | | | Tv (100S) | STORED $Ev_3$ | SET START POINT (FROM) | 1,000's POSITION | (10) MONTH (1) MONTH | (10) HOUR (10) MIN. | GROUP NO./(10) |
| 19 | Av max X | | | Tv (10S) | STORED $Ev_4$ | * | 100's POSITION | (1) MONTH (10) DAY | (1) HOUR (1) MIN. | GROUP NO./(1) |
| 20 | | | | * | | SET STEP | | (10) DAY (1) DAY | | |
| 21 | Av max SET | Tv SET (S MODE) | | | | | | | | |
| 22 | | | | * | STORED $Ev_5$ | * | 10's POSITION | (1) DAY (1) HOUR | (10) MIN. (10) SEC. | * |
| 23 | | (M MODE) | | | STORED $Ev_6$ | SET FRAME NO. | 1's POSITION DAY | (1) HOUR (1) MIN. | (1) MIN. (1) SEC. | * |
| 24 | Av min | | | | | | | | | |
| 25 | Av min SET | Av SET | | | | | | | | |
| 26 | (A MODE) | | | * | STORED $Ev_7$ | * | * | START TIME, INTERVAL TIME DISCRIMINATION | * | * |
| 27 | | | | | STORED $Ev_8$ | * | * | | | |
| 28 | | | | | | | | | | |
| 29 | LIMIT SHIFT AMOUNT | | Av max Z | | | | | | | |
| 30 | * | | | | | * | * | | | * |
| 31 | | | Av min Z | | | | | | | |
| 32 | * | | | * | Ev UNDER LIGHT MEASUREMENT | * | * | | | * |
| 33 | | | | | | | | | | |
| 34 | * | | | * | STORED DATA NO | * | * | | | * |
| 35 | | | | | | | | | | |

What is claimed is:

1. A camera to which a camera accessory, having a light source that is used for printing data on a film, is attachable, comprising;
   means for transmitting a film sensitivity signal indicating film sensitivity of a film loaded in the camera in order to control the amount of light emitted by the light source;
   means for producing a printing start signal in response to the start of an exposure control operation of the camera system in order to start a printing operation of the camera accessory; and
   means for producing a printing terminating signal in response to termination of the exposure control operation of the camera system in order to terminate the printing operation of the camera accessory.

2. A data printing device for a camera, comprising;
   means for receiving a printing signal from the camera;
   means for printing one of a series of numbers on every successive frame of a film in response to the printing signal;
   means for serially increasing or decreasing the number to be printed on the each frame in response to the printing signal;
   means for discriminating whether the film has been wound to a position where one of its regular photographing frames is positioned at a photographing position at which an image will be formed; and
   means for interrupting the operation of the increasing or decreasing means when one of the regular photographing frames is discriminated not to be positioned at the photographing position.

3. A data printing device for a camera, comprising;
   means for selecting a printing mode among a plurality of prepared printing modes;
   means for printing data determined in accordance with the selected printing mode, on a film;
   means for selectively indicting a name of the selected printing mode and data to be printed on the film; and
   means for switching the indication of the indicating means between a first condition in which the selected printing mode is indicated and a second condition in which the data to be printed is indicated.

4. A data recording device for a camera, comprising:
   means for receiving a recording signal from the camera;
   means for recording one number of a series on each successive frame of a film in response to the recording signal;
   means for serially increasing or decreasing the number to be recorded on a frame in response to the recording signal;
   means for discriminating whether the film has been wound to a position where one of the regular photographing frames is positioned at a photographing position at which an image will be formed; and
   means for interrupting the operation of the increasing or decreasing means when one of the regular photographing frames is discriminated not to be positioned at the photographing position.

5. A data recording device for a camera, comprising:
   means for selecting a recording mode from among a plurality of prepared recording modes;
   means for recording data determined in accordance with the selected recording mode on a film;
   means for selectively indicating a name of the selected recording mode and data to be recorded on the film; and
   means for switching the indication of the indicating means between a first condition in which the selected recorded mode is indicated and a second condition in which the data to be recorded is indicated.

6. A data printing device for use in a camera system including a camera body which is capable of automatically reading data indicating sensitivity of a film loaded in the camera body and outputting a signal indicating the film sensitivity, comprising:
   means for receiving the signal outputted by the camera body;
   means for receiving an exposure operation starting signal indicating the start of an exposure operation of the camera system;
   means for emitting light in order to print predetermined data on the film, said emitting means starting its light emission in response to receipt of the exposure operation starting signal; and
   means for controlling the amount of light emitted by the emitting means in accordance with the received signal.

7. A data printing device as claimed in claim 6, wherein the controlling means includes means for controlling a period of time during which the emitting means emits said light, in accordance with the film sensitivity signal.

8. A data printing device as claimed in claim 7, further comprising means for receiving an exposure operation terminating signal which is produced to terminate an exposure operation of the camera system, and means for interrupting the light emission of the emitting means in response to receipt of the exposure operation terminating signal when said light emitting time period has not terminated.

* * * * *